United States Patent
Cherian et al.

(10) Patent No.: US 8,252,891 B2
(45) Date of Patent: Aug. 28, 2012

(54) PURIFICATION OF POLYCARBONATES

(75) Inventors: Anna E. Cherian, Ithaca, NY (US);
Jeffrey R. Conuel, Ithaca, NY (US);
David E. Decker, Ithaca, NY (US);
Scott D. Allen, Ithaca, NY (US)

(73) Assignee: Novomer, Inc., Ithaca, NY (US)

( * ) Notice: Subject to any disclaimer, the term of this patent is extended or adjusted under 35 U.S.C. 154(b) by 0 days.

(21) Appl. No.: 13/119,408

(22) PCT Filed: Sep. 17, 2009

(86) PCT No.: PCT/US2009/057320
§ 371 (c)(1),
(2), (4) Date: Mar. 16, 2011

(87) PCT Pub. No.: WO2010/033703
PCT Pub. Date: Mar. 25, 2010

(65) Prior Publication Data
US 2011/0201779 A1 Aug. 18, 2011

Related U.S. Application Data

(60) Provisional application No. 61/097,725, filed on Sep. 17, 2008, provisional application No. 61/101,173, filed on Sep. 30, 2008.

(51) Int. Cl.
*B32B 27/06* (2006.01)
*C08G 65/00* (2006.01)
(52) U.S. Cl. ....................................... 528/480; 528/405
(58) Field of Classification Search .................. 528/405, 528/480
See application file for complete search history.

(56) References Cited

U.S. PATENT DOCUMENTS

| | | | | |
|---|---|---|---|---|
| 4,177,343 A * | 12/1979 | Pannell | | 528/482 |
| 5,294,356 A * | 3/1994 | Tanaka et al. | | 508/462 |
| 5,420,241 A * | 5/1995 | Fennhoff et al. | | 528/490 |
| 5,750,772 A | 5/1998 | Gridnev | | |
| 6,870,004 B1 * | 3/2005 | Nguyen et al. | | 525/88 |
| 2006/0089252 A1 * | 4/2006 | Coates et al. | | 502/150 |

FOREIGN PATENT DOCUMENTS

| | | |
|---|---|---|
| EP | 0 504 410 A1 | 9/1992 |
| JP | 2002284820 | 10/2002 |
| WO | WO2008/136591 A1 | 11/2008 |

OTHER PUBLICATIONS

Written Opinion mailed Mar. 22, 2011, for PCT/US2009/057320 (published as WO2010033703 on Mar. 25, 2010).
International Preliminary Report on Patentability mailed on Mar. 31, 2011 for PCT/US2009/057320 (published as WO2010033703 on Mar. 25, 2010).
International Search Report mailed on Dec. 15, 2009 for PCT/US2009/057320 (published as WO2010033703 on Mar. 25, 2010).
Sujith et al. "A Highly Active and Recyclable Catalytic System for $CO_2$/Propylene Oxide Copolymerization," Angew. Chem Int. Ed. 2008, 47, 1-5.
Hinchcliffe et al. "QuadraPure Cartridges for Removal of Trace Metal from Reaction Mixtures in Flow," Organic Process Research & Development 2007, 11, 477-481.
Third Party Observation against EP 2 342 258 A1 pursuant to Article 115 EPC, dated Apr. 23, 2012.

* cited by examiner

*Primary Examiner* — Terressa Boykin
(74) *Attorney, Agent, or Firm* — Choate, Hall & Stewart LLP; Charles E. Lyon; Danielle M. Nihan

(57) ABSTRACT

The present disclosure provides, in part, a method for removing a catalyst from a product of catalyzed aliphatic polycarbonate polymerization reaction.

58 Claims, 23 Drawing Sheets

PURIFICATION OF POLYCARBONATES

This application is a United States National Phase Application under 35 U.S.C. §371 of International PCT Application No. PCT/US09/57320, filed Sep. 17, 2009, which claims priority to U. S. Provisional Patent Application Ser. No. 61/101,173, filed Sep. 30, 2008 and U.S. Provisional Patent Application Ser. No. 61/097,725, filed Sep. 17, 2008. The entire content of each priority application is incorporated herein by reference.

BACKGROUND

Aliphatic polycarbonates ("APCs") are biocompatible and biodegradable materials with numerous uses ranging from high-performance applications in material science to use as biodegradable consumer packaging. Many applications of APCs require a colorless, metal free polymer that decomposes cleanly without leaving a residue. The common method of synthesizing APC typically results in a crude product containing reaction catalyst and discoloration. Currently a multi-step precipitation process is required to produce colorless, metal- and catalyst-free APCs. This process, however, is not suitable for large scale use due to expense and labor requirements.

Removing homogenous metal catalysts from polymer solutions has been performed successfully in the past. For instance, in 2002 Sakabe and co-workers detailed a method whereby a nickel 2-ethylhexanoate catalyst was removed from a norbornene and 5-hexyl-2-norbornene co-polymerization by extracting the crude non-polar reaction mixture with a solution of lactic acid in 2-propanol and water (Patent# JP 2002284820). In another approach, Gridnev successfully decolorizes a cobalt(III) borontrifluoride catalyzed synthesis of methacrylate homo- and co-polymers by acidification, catalyst complexation using the bidentate 1-(3-aminopropyl) imidazole, and filtration through a silica gel column (U.S. Pat. No. 5,750,772). However, methods specifically suited for the removal of homogenous cobalt catalysts from aliphatic polycarbonate solutions are not currently available.

SUMMARY

The present disclosure provides, in part, a method for removing a catalyst from a product of a catalyzed aliphatic polycarbonate polymerization reaction. In one aspect the catalyst is a metal-ligand complex. In one aspect the crude product contains poly(propylene carbonate) ("PPC"). While various aspects of the disclosure herein are illustrated through the use of PPC, it is an object of the present disclosure to extend the procedures and methods to a variety of aliphatic polycarbonates.

In various aspects, catalysts utilized in accordance with the present disclosure may comprise a metal-ligand complex. In various aspects, the ligand may comprise a salen or prophyrin ligand. While various aspects of the disclosure herein are illustrated through the use of cobalt salen catalysts, it is an object of the present disclosure to extend the synthetic procedures and related methodologies to catalytic systems utilizing various salen complexes of transition metals. For example, the metal may be chosen from transition metals, e.g., Group 6, Group 7, Group 9, Group 12, etc. Exemplary transition metals may include chromium (Cr), manganese (Mn), molybdenum (Mo), cadmium (Cd), or other transition metal catalysts. Various other metal-centered complexes as described herein would be known to those skilled in the art made aware of this disclosure. While such systems may not show optimal results with respect to any one synthetic pathway, it can be a matter of routine experimentation to achieve desired catalytic activities. Accordingly, as described more fully below, in the accompanying figures, examples and descriptions, a related object of this disclosure includes various transition metal-ligand complexes, the choice as to which can be determined as desirable for a specific application.

In various aspects, the polycarbonate polymerization reaction comprises a co-catalyst. In various embodiments, the co-catalyst is a Lewis base. In other embodiments, the co-catalyst is a salt. In various aspects, the salt is an ammonium, phosphonium or arsonium salt. In various aspects, the co-catalyst is N-methylimidazole ("N-MeIm"), dimethylaminopyridine ("DMAP") or 1,4-diazabicyclo[2.2.2]octane ("DABCO"). In various aspects, the co-catalyst is a quaternary ammonium salt. In some aspects the co-catalyst is a tetraalkyl ammonium salt. In various aspects, the co-catalyst is tetra-n-butylammonium chloride [(n-Bu)$_4$NCl], tetra-n-butylammonium bromide [(n-Bu)$_4$NBr], tetra-n-butylammonium azide [(n-Bu)$_4$NN$_3$]. In various aspects, the co-catalyst is a bis(triphenylphosphine) iminium (PPN) salt. In certain aspects the PPN salt is bis(triphenylphosphine)iminium chloride [[PPN]Cl], bis(triphenylphosphine) iminium bromide [[PPN]Br], bis(triphenylphosphine)iminium acetate [[PPN] OAc], bis(triphenylphosphine)iminium trifluoroacetate [[PPN]TFA], bis(triphenylphosphine) pentafluorobenzoate or bis(triphenylphosphine) iminium azide [[PPN]N$_3$].

In various aspects, the method of the present disclosure comprises contacting a solution of APC with a solid phase. In various aspects, the solid phase comprises polymers. In various aspects, the polymers may be polystyrene, divinylbenzene, polyvinylpyridine, polymethylmethacrylate, polyolefins, polytetrafluoroethylene, and combinations or derivatives thereof. In other aspects, the solid phase comprises an inorganic solid. In various aspects, the inorganic solid phase may be silica, alumina, zirconia, molecular sieves, zeolites, clays or derivatives and combinations thereof. In various aspects, the solid phase comprises a strong acid cation resin. In various aspects, a strong acid cation may be a sulfonic acid cation. In one aspect of the present disclosure the removal of the catalyst is accomplished by interaction between a solution of the crude reaction product and an ion exchange resin. In various aspects efficacy of catalyst removal is measured by colorimetry. In various aspects, the solid phase comprises beads of ion exchange resin. In various aspects, the solid phase may be a porous material. In various aspects, the contacting step is performed in a batch process. In various aspects, the contacting step is a continuous process. In various aspects, the contacting step is performed in a packed column. In one aspect the efficacy of catalyst removal is measured by UV and/or visible ("UV/Vis") light spectroscopy. In various aspects, the method of the present disclosure comprises contacting the solution with a second solid phase. In various aspects, the second solid phase comprises polymers. In various aspects, the polymers may be polystyrene, divinylbenzene, polyvinylpyridine, polymethylmethacrylate, polyolefins, polytetrafluoroethylene, and combinations or derivatives thereof. In other aspects, the second solid phase comprises an inorganic solid. In various aspects, the inorganic solid phase may be silica, alumina, zirconia, molecular sieves, zeolites, or clays. In various aspects, the second solid phase comprises an acid-absorbing resin. In various aspects, an acid absorbing resin may be a polymeric resin containing an immobilized base.

This application refers to various issued patents, published patent applications journal articles, and other publications all of which are incorporated herein by reference.

The details of one or more embodiments of the disclosure are set forth herein. Other features, objects, and advantages of the disclosure will be apparent from the description, the figures, the examples and the claims.

DEFINITIONS

Definitions of specific functional groups and chemical terms are described in more detail below. For purposes of this invention, the chemical elements are identified in accordance with the Periodic Table of the Elements, CAS version, Handbook of Chemistry and Physics, 75$^{th}$ Ed., inside cover, and specific functional groups are generally defined as described therein. Additionally, general principles of organic chemistry, as well as specific functional moieties and reactivity, are described in *Organic Chemistry*, Thomas Sorrell, University Science Books, Sausalito, 1999; Smith and March *March's Advanced Organic Chemistry*, 5$^{th}$ Edition, John Wiley & Sons, Inc., New York, 2001; Larock, *Comprehensive Organic Transformations*, VCH Publishers, Inc., New York, 1989; Carruthers, *Some Modern Methods of Organic Synthesis*, 3$^{rd}$ Edition, Cambridge University Press, Cambridge, 1987; the entire contents of each of which are incorporated herein by reference.

Certain compounds of the present invention can comprise one or more asymmetric centers, and thus can exist in various stereoisomeric forms, e.g., enantiomers and/or diastereomers. Thus, inventive compounds and compositions thereof may be in the form of an individual enantiomer, diastereomer or geometric isomer, or may be in the form of a mixture of stereoisomers. In certain embodiments, the compounds of the invention are enantiopure compounds. In certain other embodiments, mixtures of enantiomers or diastereomers are provided.

Furthermore, certain compounds, as described herein, may have one or more double bonds that can exist as either a Z or E isomer, unless otherwise indicated. The invention additionally encompasses the compounds as individual isomers substantially free of other isomers and alternatively, as mixtures of various isomers, e.g., racemic mixtures of enantiomers. In addition to the above-mentioned compounds per se, this invention also encompasses compositions comprising one or more compounds.

As used herein, the term "isomers" includes any and all geometric isomers and stereoisomers. For example, "isomers" include cis- and trans-isomers, E- and Z-isomers, R- and S-enantiomers, diastereomers, (D)-isomers, (L)-isomers, racemic mixtures thereof, and other mixtures thereof, as falling within the scope of the invention. For instance, a compound may, in some embodiments, be provided substantially free of one or more corresponding stereoisomers, and may also be referred to as "stereochemically enriched."

Where a particular enantiomer is preferred, it may, in some embodiments be provided substantially free of the opposite enantiomer, and may also be referred to as "optically enriched." "Optically enriched," as used herein, means that the compound is made up of a significantly greater proportion of one enantiomer. In certain embodiments the compound is made up of at least about 90% by weight of an enantiomer. In some embodiments the compound is made up of at least about 95%, 97%, 98%, 99%, 99.5%, 99.7%, 99.8%, or 99.9% by weight of an enantiomer. In some embodiments the enantiomeric excess of provided compounds is at least about 90%, 95%, 97%, 98%, 99%, 99.5%, 99.7%, 99.8%, or 99.9%. In some embodiments, enantiomers may be isolated from racemic mixtures by any method known to those skilled in the art, including chiral high pressure liquid chromatography (HPLC) and the formation and crystallization of chiral salts or prepared by asymmetric syntheses. See, for example, Jacques, et al., *Enantiomers, Racemates and Resolutions* (Wiley Interscience, New York, 1981); Wilen, S. H., et al., *Tetrahedron* 33:2725 (1977); Eliel, E. L. *Stereochemistry of Carbon Compounds* (McGraw-Hill, NY, 1962); Wilen, S. H. *Tables of Resolving Agents and Optical Resolutions* p. 268 (E. L. Eliel, Ed., Univ. of Notre Dame Press, Notre Dame, Ind. 1972).

The terms "halo" and "halogen" as used herein refer to an atom selected from fluorine (fluoro, —F), chlorine (chloro, —Cl), bromine (bromo, —Br), and iodine (iodo, —I).

The term "aliphatic" or "aliphatic group," as used herein, denotes a hydrocarbon moiety that may be straight-chain (i.e., unbranched), branched, or cyclic (including fused, bridging, and spiro-fused polycyclic) and may be completely saturated or may contain one or more units of unsaturation, but which is not aromatic. Unless otherwise specified, aliphatic groups contain 1-30 carbon atoms. In certain embodiments, aliphatic groups contain 1-12 carbon atoms. In certain embodiments, aliphatic groups contain 1-8 carbon atoms. In certain embodiments, aliphatic groups contain 1-6 carbon atoms. In some embodiments, aliphatic groups contain 1-5 carbon atoms, in some embodiments, aliphatic groups contain 1-4 carbon atoms, in yet other embodiments aliphatic groups contain 1-3 carbon atoms, and in yet other embodiments aliphatic groups contain 1-2 carbon atoms. Suitable aliphatic groups include, but are not limited to, linear or branched, alkyl, alkenyl, and alkynyl groups, and hybrids thereof such as (cycloalkyl)alkyl, (cycloalkenyl)alkyl or (cycloalkyl)alkenyl.

As used herein, the term "heteroaliphatic" means aliphatic groups wherein one or more carbon atoms are independently replaced by one or more of oxygen, sulfur, nitrogen, or phosphorus. In certain embodiments, one or two carbon atoms are independently replaced by one or more of oxygen, sulfur, nitrogen, or phosphorus. Heteroaliphatic groups may be substituted or unsubstituted, branched or unbranched, cyclic or acyclic, and include "heterocycle," "heterocyclyl," "heterocycloaliphatic," or "heterocyclic" groups.

The term "epoxide," as used herein, refers to a substituted or unsubstituted oxirane. Substituted oxiranes include monosubstituted oxiranes, disubstituted oxiranes, trisubstituted oxiranes, and tetrasubstituted oxiranes. Such epoxides may be further optionally substituted as defined herein. In certain embodiments, epoxides comprise a single oxirane moiety. In certain embodiments, epoxides comprise two or more oxirane moieties.

The term "polymer," as used herein, refers to a molecule of high relative molecular mass, the structure of which comprises the multiple repetition of units derived, actually or conceptually, from molecules of low relative molecular mass. In certain embodiments, a polymer is comprised of only one monomer species (e.g., polyethylene oxide). In certain embodiments, a polymer of the present invention is a copolymer, terpolymer, heteropolymer, block copolymer, or tapered heteropolymer of one or more epoxides.

The term "unsaturated," as used herein, means that a moiety has one or more double or triple bonds.

The term "cycloaliphatic," used alone or as part of a larger moiety, refer to saturated or partially unsaturated cyclic aliphatic monocyclic, bicyclic, or polycyclic ring systems, as described herein, having from 3 to 12 members, wherein the aliphatic ring system is optionally substituted as defined above and described herein. Cycloaliphatic groups include, without limitation, cyclopropyl, cyclobutyl, cyclopentyl, cyclopentenyl, cyclohexyl, cyclohexenyl, cycloheptyl, cycloheptenyl, cyclooctyl, cyclooctenyl, norbornyl, adamantyl, and cyclooctadienyl. In some embodiments, the cycloalkyl has 3-6 carbons. The terms "cycloaliphatic," may also include aliphatic rings that are fused to one or more aromatic or nonaromatic rings, such as decahydronaphthyl or tetrahydronaphthyl, where the radical or point of attachment is on the aliphatic ring. In some embodiments, a carbocyclic groups is bicyclic. In some embodiments, a carbocyclic group is tricyclic. In some embodiments, a carbocyclic group is polycyclic.

The term "alkyl," as used herein, refers to saturated, straight- or branched-chain hydrocarbon radicals derived from an aliphatic moiety containing between one and twelve carbon atoms by removal of a single hydrogen atom. Unless otherwise specified, alkyl groups contain 1-12 carbon atoms. In certain embodiments, alkyl groups contain 1-8 carbon atoms. In certain embodiments, alkyl groups contain 1-6 carbon atoms. In some embodiments, alkyl groups contain 1-5 carbon atoms, in some embodiments, alkyl groups contain 1-4 carbon atoms, in yet other embodiments alkyl groups contain 1-3 carbon atoms, and in yet other embodiments alkyl groups contain 1-2 carbon atoms. Examples of alkyl radicals include, but are not limited to, methyl, ethyl, n-propyl, iso-propyl, n-butyl, iso-butyl, sec-butyl, sec-pentyl, iso-pentyl, tert-butyl, n-pentyl, neopentyl, n-hexyl, sec-hexyl, n-heptyl, n-octyl, n-decyl, n-undecyl, dodecyl, and the like.

The term "alkenyl," as used herein, denotes a monovalent group derived from a straight or branched-chain aliphatic moiety having at least one carbon-carbon double bond. Unless otherwise specified, alkenyl groups contain 2-12 carbon atoms. In certain embodiments, alkenyl groups contain 2-8 carbon atoms. In certain embodiments, alkenyl groups contain 2-6 carbon atoms. In some embodiments, alkenyl groups contain 2-5 carbon atoms, in some embodiments, alkenyl groups contain 2-4 carbon atoms, in yet other embodiments alkenyl groups contain 2-3 carbon atoms, and in yet other embodiments alkenyl groups contain 2 carbon atoms. Alkenyl groups include, for example, ethenyl, propenyl, butenyl, 1-methyl-2-buten-1-yl, and the like.

The term "alkynyl," as used herein, refers to a monovalent group derived from a straight- or branched-chain aliphatic moiety having at least one carbon-carbon triple bond. Unless otherwise specified, alkynyl groups contain 2-12 carbon atoms. In certain embodiments, alkynyl groups contain 2-8 carbon atoms. In certain embodiments, alkynyl groups contain 2-6 carbon atoms. In some embodiments, alkynyl groups contain 2-5 carbon atoms, in some embodiments, alkynyl groups contain 2-4 carbon atoms, in yet other embodiments alkynyl groups contain 2-3 carbon atoms, and in yet other embodiments alkynyl groups contain 2 carbon atoms. Representative alkynyl groups include, but are not limited to, ethynyl, 2-propynyl (propargyl), 1-propynyl, and the like.

The term "carbocycle" and "carbocyclic ring" as used herein, refers to monocyclic and polycyclic moieties wherein the rings contain only carbon atoms. Unless otherwise specified, carbocycles may be saturated, partially unsaturated or aromatic, and contain 3 to 20 carbon atoms. In some embodiments, a carbocycle is aliphatic. Representative carbocyles include cyclopropane, cyclobutane, cyclopentane, cyclohexane, bicyclo[2.2.1]heptane, norbornene, phenyl, cyclohexene, naphthalene, and spiro[4.5]decane.

The term "aryl" used alone or as part of a larger moiety as in "aralkyl," "aralkoxy," or "aryloxyalkyl," refers to monocyclic and polycyclic ring systems having a total of five to 20 ring members, wherein at least one ring in the system is aromatic and wherein each ring in the system contains three to twelve ring members. The term "aryl" may be used interchangeably with the term "aryl ring." In certain embodiments of the present invention, "aryl" refers to an aromatic ring system which includes, but is not limited to, phenyl, biphenyl, naphthyl, anthracyl and the like, which may bear one or more substituents. Also included within the scope of the term "aryl," as it is used herein, is a group in which an aromatic ring is fused to one or more additional rings, such as benzofuranyl, indanyl, phthalimidyl, naphthimidyl, phenantriidinyl, or tetrahydronaphthyl, and the like.

The terms "heteroaryl" and "heteroar-," used alone or as part of a larger moiety, e.g., "heteroaralkyl" or "heteroaralkoxy," refer to groups having 5 to 14 ring atoms, preferably 5, 6, or 9 ring atoms; having 6, 10, or 14 π electrons shared in a cyclic array; and having, in addition to carbon atoms, from one to five heteroatoms. The term "heteroatom" refers to nitrogen, oxygen, or sulfur, and includes any oxidized form of nitrogen or sulfur, and any quaternized form of a basic nitrogen. Heteroaryl groups include, without limitation, thienyl, furanyl, pyrrolyl, imidazolyl, pyrazolyl, triazolyl, tetrazolyl, oxazolyl, isoxazolyl, oxadiazolyl, thiazolyl, isothiazolyl, thiadiazolyl, pyridyl, pyridazinyl, pyrimidinyl, pyrazinyl, indolizinyl, purinyl, naphthyridinyl, benzofuranyl and pteridinyl. The terms "heteroaryl" and "heteroar-", as used herein, also include groups in which a heteroaromatic ring is fused to one or more aryl, cycloaliphatic, or heterocyclyl rings, where the radical or point of attachment is on the heteroaromatic ring. Nonlimiting examples include indolyl, isoindolyl, benzothienyl, benzofuranyl, dibenzofuranyl, indazolyl, benzimidazolyl, benzthiazolyl, quinolyl, isoquinolyl, cinnolinyl, phthalazinyl, quinazolinyl, quinoxalinyl, 4H-quinolizinyl, carbazolyl, acridinyl, phenazinyl, phenothiazinyl, phenoxazinyl, tetrahydroquinolinyl, tetrahydroisoquinolinyl, and pyrido[2,3-b]-1,4-oxazin-3 (4H)-one. A heteroaryl group may be mono- or bicyclic. The term "heteroaryl" may be used interchangeably with the terms "heteroaryl ring," "heteroaryl group," or "heteroaromatic," any of which terms include rings that are optionally substituted. The term "heteroaralkyl" refers to an alkyl group substituted by a heteroaryl, wherein the alkyl and heteroaryl portions independently are optionally substituted.

As used herein, the terms "heterocycle," "heterocyclyl," "heterocyclic radical," and "heterocyclic ring" are used interchangeably and refer to a stable 5- to 7-membered monocyclic or 7-14-membered bicyclic heterocyclic moiety that is either saturated or partially unsaturated, and having, in addition to carbon atoms, one or more, preferably one to four, heteroatoms, as defined above. When used in reference to a ring atom of a heterocycle, the term "nitrogen" includes a substituted nitrogen. As an example, in a saturated or partially unsaturated ring having 0-3 heteroatoms selected from oxygen, sulfur or nitrogen, the nitrogen may be N (as in 3,4-dihydro-2H-pyrrolyl), NH (as in pyrrolidinyl), or $^+$NR (as in N-substituted pyrrolidinyl).

A heterocyclic ring can be attached to its pendant group at any heteroatom or carbon atom that results in a stable structure and any of the ring atoms can be optionally substituted. Examples of such saturated or partially unsaturated heterocyclic radicals include, without limitation, tetrahydrofuranyl, tetrahydrothienyl, pyrrolidinyl, pyrrolidonyl, piperidinyl, pyrrolinyl, tetrahydroquinolinyl, tetrahydroisoquinolinyl, decahydroquinolinyl, oxazolidinyl, piperazinyl, dioxanyl, dioxolanyl, diazepinyl, oxazepinyl, thiazepinyl, morpholinyl, and quinuclidinyl. The terms "heterocycle," "heterocyclyl," "heterocyclyl ring," "heterocyclic group," "heterocyclic moiety," and "heterocyclic radical" are used interchangeably herein, and also include groups in which a heterocyclyl ring is fused to one or more aryl, heteroaryl, or cycloaliphatic rings, such as indolinyl, 3H-indolyl, chromanyl, phenanthridinyl, or tetrahydroquinolinyl, where the radical or point of attachment is on the heterocyclyl ring. A heterocyclyl group may be mono- or bicyclic. The term "heterocyclylalkyl" refers to an alkyl group substituted by a heterocyclyl, wherein the alkyl and heterocyclyl portions independently are optionally substituted.

As used herein, the term "partially unsaturated" refers to a ring moiety that includes at least one double or triple bond. The term "partially unsaturated" is intended to encompass rings having multiple sites of unsaturation, but is not intended to include aryl or heteroaryl moieties, as herein defined.

As described herein, compounds of the invention may contain "optionally substituted" moieties. In general, the term "substituted," whether preceded by the term "optionally" or not, means that one or more hydrogens of the designated moiety are replaced with a suitable substituent. Unless otherwise indicated, an "optionally substituted" group may have a suitable substituent at each substitutable position of the group, and when more than one position in any given structure may be substituted with more than one substituent selected from a specified group, the substituent may be either the same or different at every position. Combinations of substituents envisioned by this invention are preferably those that result in the formation of stable or chemically feasible compounds. The term "stable," as used herein, refers to compounds that are not substantially altered when subjected to conditions to allow for their production, detection, and, in certain embodiments, their recovery, purification, and use for one or more of the purposes disclosed herein.

In some chemical structures herein, substituents are shown attached to a bond which crosses a bond in a ring of the depicted molecule. This means that one or more of the substituents may be attached to the ring at any available position (usually in place of a hydrogen atom of the parent structure). In cases where an atom of a ring so substituted has two substitutable positions, two groups may be present on the same ring atom. When more than one substituent is present, each is defined independently of the others, and each may have a different structure. In cases where the substituent shown crossing a bond of the ring is —R, this has the same meaning as if the ring were said to be "optionally substituted" as described in the preceding paragraph.

Suitable monovalent substituents on a substitutable carbon atom of an "optionally substituted" group are independently halogen; —(CH$_2$)$_{0-4}$R$^\circ$; —(CH$_2$)$_{0-4}$OR$^\circ$; —O—(CH$_2$)$_{0-4}$C(O)OR$^\circ$; —(CH$_2$)$_{0-4}$CH(OR$^\circ$)$_2$; —(CH$_2$)$_{0-4}$SR$^\circ$; —(CH$_2$)$_{0-4}$Ph, which may be substituted with R$^\circ$; —(CH$_2$)$_{0-4}$O(CH$_2$)$_{0-1}$Ph which may be substituted with R$^\circ$; —CH═CHPh, which may be substituted with R$^\circ$; —NO$_2$; —CN; —N$_3$; —(CH$_2$)$_{0-4}$N(R$^\circ$)$_2$; —(CH$_2$)$_{0-4}$N(R$^\circ$)C(O)R$^\circ$; —N(R$^\circ$)C(S)R$^\circ$; —(CH$_2$)$_{0-4}$N(R$^\circ$)C(O)NR$^\circ$$_2$; —N(R$^\circ$)C(S)NR$^\circ$$_2$; —(CH$_2$)$_{0-4}$N(R$^\circ$)C(O)OR$^\circ$; —N(R$^\circ$)N(R$^\circ$)C(O)R$^\circ$; —N(R$^\circ$)N(R$^\circ$)C(O)NR$^\circ$$_2$; —N(R$^\circ$)N(R$^\circ$)C(O)OR$^\circ$; —(CH$_2$)$_{0-4}$C(O)R$^\circ$; —C(S)R$^\circ$; —(CH$_2$)$_{0-4}$C(O)OR$^\circ$; —(CH$_2$)$_{0-4}$C(O)N(R$^\circ$)$_2$; —(CH$_2$)$_{0-4}$C(O)SR$^\circ$; —(CH$_2$)$_{0-4}$C(O)OSiR$^\circ$$_3$; —(CH$_2$)$_{0-4}$OC(O)R$^\circ$; —OC(O)(CH$_2$)$_{0-4}$SR—, SC(S)SR$^\circ$; —(CH$_2$)$_{0-4}$SC(O)R$^\circ$; —(CH$_2$)$_{0-4}$C(O)NR$^\circ$$_2$; —C(S)NR$^\circ$$_2$; —C(S)SR$^\circ$; —SC(S)SR$^\circ$, —(CH$_2$)$_{0-4}$OC(O)NR$^\circ$$_2$; —C(O)N(OR$^\circ$)R$^\circ$; —C(O)C(O)R$^\circ$; —C(O)CH$_2$C(O)R$^\circ$; —C(NOR$^\circ$)R$^\circ$; —(CH$_2$)$_{0-4}$SSR$^\circ$; —(CH$_2$)$_{0-4}$S(O)$_2$R$^\circ$; —(CH$_2$)$_{0-4}$S(O)$_2$OR$^\circ$; —(CH$_2$)$_{0-4}$OS(O)$_2$R$^\circ$; —S(O)$_2$NR$^\circ$$_2$; —(CH$_2$)$_{0-4}$S(O)R$^\circ$; —N(R$^\circ$)S(O)$_2$NR$^\circ$$_2$; —N(R$^\circ$)S(O)$_2$R$^\circ$; —N(OR$^\circ$)R$^\circ$; —C(NH)NR$^\circ$$_2$; —P(O)$_2$R$^\circ$; —P(O)R$^\circ$$_2$; —OP(O)R$^\circ$$_2$; —OP(O)(OR$^\circ$)$_2$; SiR$^\circ$$_3$; —(C$_{1-4}$ straight or branched alkylene)O—N(R$^\circ$)$_2$; or —(C$_{1-4}$ straight or branched)alkylene)C(O)O—N(R$^\circ$)$_2$, wherein each R$^\circ$ may be substituted as defined below and is independently hydrogen, C$_{1-8}$ aliphatic, —CH$_2$Ph, —O(CH$_2$)$_{0-1}$Ph, or a 5-6-membered saturated, partially unsaturated, or aryl ring having 0-4 heteroatoms independently selected from nitrogen, oxygen, or sulfur, or, notwithstanding the definition above, two independent occurrences of R$^\circ$, taken together with their intervening atom(s), form a 3-12-membered saturated, partially unsaturated, or aryl mono- or polycyclic ring having 0-4 heteroatoms independently selected from nitrogen, oxygen, or sulfur, which may be substituted as defined below.

Suitable monovalent substituents on R$^\circ$ (or the ring formed by taking two independent occurrences of R$^\circ$ together with their intervening atoms), are independently halogen, —(CH$_2$)$_{0-2}$R$^\bullet$, -(haloR$^\bullet$), —(CH$_2$)$_{0-2}$OH, —(CH$_2$)$_{0-2}$OR$^\bullet$, —(CH$_2$)$_{0-2}$CH(OR$^\bullet$)$_2$; —O(haloR$^\bullet$), —CN, —N$_3$, —(CH$_2$)$_{0-2}$C(O)R$^\bullet$, —(CH$_2$)$_{0-2}$C(O)OH, —(CH$_2$)$_{0-2}$C(O)OR$^\bullet$, —(CH$_2$)$_{0-4}$C(O)N(R$^\circ$)$_2$; —(CH$_2$)$_{0-2}$SR$^\bullet$, —(CH$_2$)$_{0-2}$SH, —(CH$_2$)$_{0-2}$NH$_2$, —(CH$_2$)$_{0-2}$NHR$^\bullet$, —(CH$_2$)$_{0-2}$NR$^\bullet$$_2$, —NO$_2$, —SiR$^\bullet$$_3$, —OSiR$^\bullet$$_3$, —C(O)SR$^\bullet$—(C$_{1-4}$ straight or branched alkylene)C(O)OR$^\bullet$, or —SSR$^\bullet$ wherein each R$^\bullet$ is unsubstituted or where preceded by "halo" is substituted only with one or more halogens, and is independently selected from C$_{1-4}$ aliphatic, —CH$_2$Ph, —O(CH$_2$)$_{0-1}$Ph, or a 5-6-membered saturated, partially unsaturated, or aryl ring having 0-4 heteroatoms independently selected from nitrogen, oxygen, or sulfur. Suitable divalent substituents on a saturated carbon atom of R$^\circ$ include ═O and ═S.

Suitable divalent substituents on a saturated carbon atom of an "optionally substituted" group include the following: ═O, ═S, ═NNR*$_2$, ═NNHC(O)R*, ═NNHC(O)OR*, ═NNHS(O)$_2$R*, ═NR*, ═NOR*, —O(C(R*$_2$))$_{2-3}$O—, or —S(C(R*$_2$))$_{2-3}$S—, wherein each independent occurrence of R* is selected from hydrogen, C$_{1-6}$ aliphatic which may be substituted as defined below, or an unsubstituted 5-6-membered saturated, partially unsaturated, or aryl ring having 0-4 heteroatoms independently selected from nitrogen, oxygen, or sulfur. Suitable divalent substituents that are bound to vicinal substitutable carbons of an "optionally substituted" group include: —O(CR*$_2$)$_{2-3}$O—; wherein each independent occurrence of R* is selected from hydrogen, C$_{1-6}$ aliphatic which may be substituted as defined below, or an unsubstituted 5-6-membered saturated, partially unsaturated, or aryl ring having 0-4 heteroatoms independently selected from nitrogen, oxygen, or sulfur.

Suitable substituents on the aliphatic group of R* include halogen, —R$^\bullet$, -(haloR$^\bullet$), —OH, —OR$^\bullet$, —O(haloR$^\bullet$), —CN, —C(O)OH, —C(O)OR$^\bullet$, —NH$_2$, —NHR$^\bullet$, —NR$^\bullet$$_2$, or —NO$_2$, wherein each R$^\bullet$ is unsubstituted or where preceded by "halo" is substituted only with one or more halogens, and is independently C$_{1-4}$ aliphatic, —CH$_2$Ph, —O(CH$_2$)$_{0-1}$Ph, or a 5-6-membered saturated, partially unsaturated, or aryl ring having 0-4 heteroatoms independently selected from nitrogen, oxygen, or sulfur.

Suitable substituents on a substitutable nitrogen of an "optionally substituted" group include —R$^\dagger$, —NR$^\dagger$$_2$, —C(O)R$^\dagger$, —C(O)OR$^\dagger$, —C(O)C(O)R$^\dagger$, —C(O)CH$_2$C(O)R$^\dagger$, —S(O)$_2$R$^\dagger$, —S(O)$_2$NR$^\dagger$$_2$, —C(S)NR$^\dagger$$_2$, —C(NH)NR$^\dagger$$_2$, or —N(R$^\dagger$)S(O)$_2$R$^\dagger$; wherein each R$^\dagger$ is independently hydrogen, C$_{1-6}$ aliphatic which may be substituted as defined below, unsubstituted —OPh, or an unsubstituted 5-6-membered saturated, partially unsaturated, or aryl ring having 0-4 heteroatoms independently selected from nitrogen, oxygen, or sulfur, or, notwithstanding the definition above, two independent occurrences of R$^\dagger$, taken together with their intervening atom(s) form an unsubstituted 3-12-membered saturated, partially unsaturated, or aryl mono- or bicyclic ring having 0-4 heteroatoms independently selected from nitrogen, oxygen, or sulfur.

Suitable substituents on the aliphatic group of $R^t$ are independently halogen, —R•, -(haloR•), —OH, —OR•, —O(haloR•), —CN, —C(O)OH, —C(O)OR•, —NH$_2$, —NHR•, —NR•$_2$, or —NO$_2$, wherein each R• is unsubstituted or where preceded by "halo" is substituted only with one or more halogens, and is independently $C_{1-4}$ aliphatic, —CH$_2$Ph, —O(CH$_2$)$_{0-1}$Ph, or a 5-6-membered saturated, partially unsaturated, or aryl ring having 0-4 heteroatoms independently selected from nitrogen, oxygen, or sulfur.

As used herein, the term "catalyst" refers to a substance the presence of which increases the rate of a chemical reaction, while not being consumed or undergoing a permanent chemical change itself.

"Tetradentate" refers to ligands having four sites capable of coordinating to a metal center.

As used herein, the term "anion exchanger" refers to an ion exchanger which contains positively charged functional groups and exchangeable anions.

As used herein, the term "cation exchanger" refers to an ion exchanger which contains negatively charged functional groups and exchangeable cations.

As used herein, the term "co-ion" refers to ionic species with the same charge sign as the functional groups.

As used herein, the term "counterions" refers to exchangeable ions carried by ion exchangers.

The term "dope" or "polymer dope" as used herein refers to a crude product of a polymerization reaction. It will be appreciated by one skilled in the art that such a dope can be stored or subjected to further processing such as catalyst removal, devolatilization, precipitation, etc.

As used herein, the term "exchangeable" refers to the ability of an ion to undergo ion exchange.

As used herein in the context of ion exchange resins, the term "functional groups" refers to charged acidic, basic, or chelating groups attached to the polymer matrix.

As used herein, the term "functional sites" refers to functional groups, attached groups, chargeable atoms incorporated in polymeric chains, and ion exchange units of crystalline structure of inorganic ion exchangers.

As used herein, the term "ion exchange" refers to an exchange of ions between two or more ionized species located in different phases, at least one of which is an ion exchanger. Ion exchange may include chelating, complexing, formation of coordination bonds, and weak ion exchange interactions.

As used herein, the term "ion exchanger" refers to a phase containing insoluble carrier of an electrical charge (matrix) resulting from reversibly fixed ions.

As used herein, the term "ion exchange polymer" or "ion exchange resin" refers to polymers carrying fixed functional groups or sites associated with exchangeable ions.

As used herein, the term "ionic form" refers to the state of an ion exchanger depending on the counterions present in the functional sites of the ion exchanger. For example, an ion exchanger containing Na$^+$ ions is in the sodium form. After undergoing ion exchange in which K$^+$ ion replace the Na$^+$ ions, the ion exchanger is in the potassium form.

As used herein, the term "osmotically inactive" refers to a carrier that cannot migrate from the phase where it is located.

The term "nucleophile" refers to any agent that can ring open an epoxide.

As used herein, the term "porphyrin" refers to any ligand derived from four pyrroline subunits interconnected via their α carbon atoms through methine bridges.

As used herein, the term "salen" refers to any ligand derived from a diamine and two equivalents of salicylaldehyde or a derivative thereof.

As used herein, the terms "diiminate" and "diiminate ligand" refer to ligands containing a 1,3-diketimine moiety.

01893-1005). For the PPC solution, the polymerization was quenched with tosic acid, treatment used a 10:1 ratio of PPC solution to resin.

Figure 12:
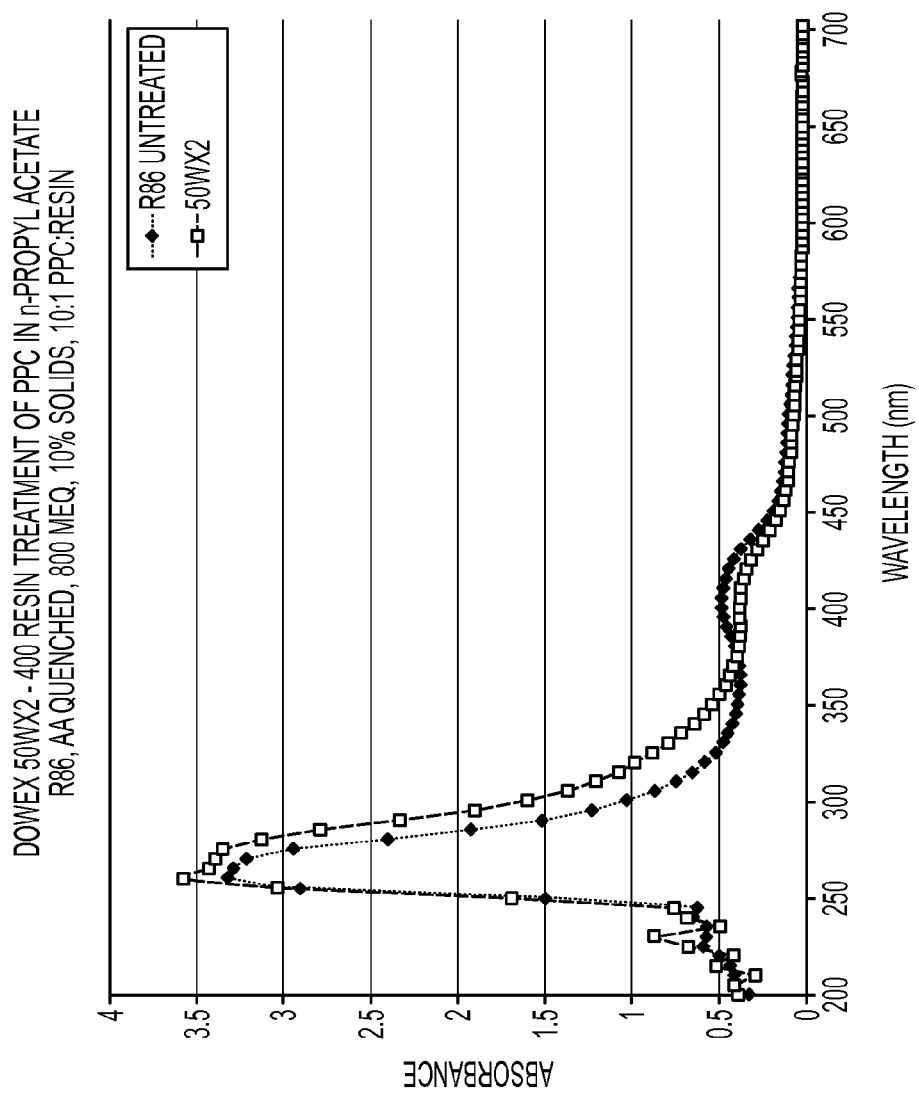

FIG. 12 depicts UV/Vis absorption curves of PPC solution after treatment with a strong acid cation ion exchange resin, DOWEX™ 50WX2. For the PPC solution, the polymerization was quenched with 800 mol. equivalents of acetic acid; treatment used a 10:1 ratio of PPC solution to resin.

Figure 13:
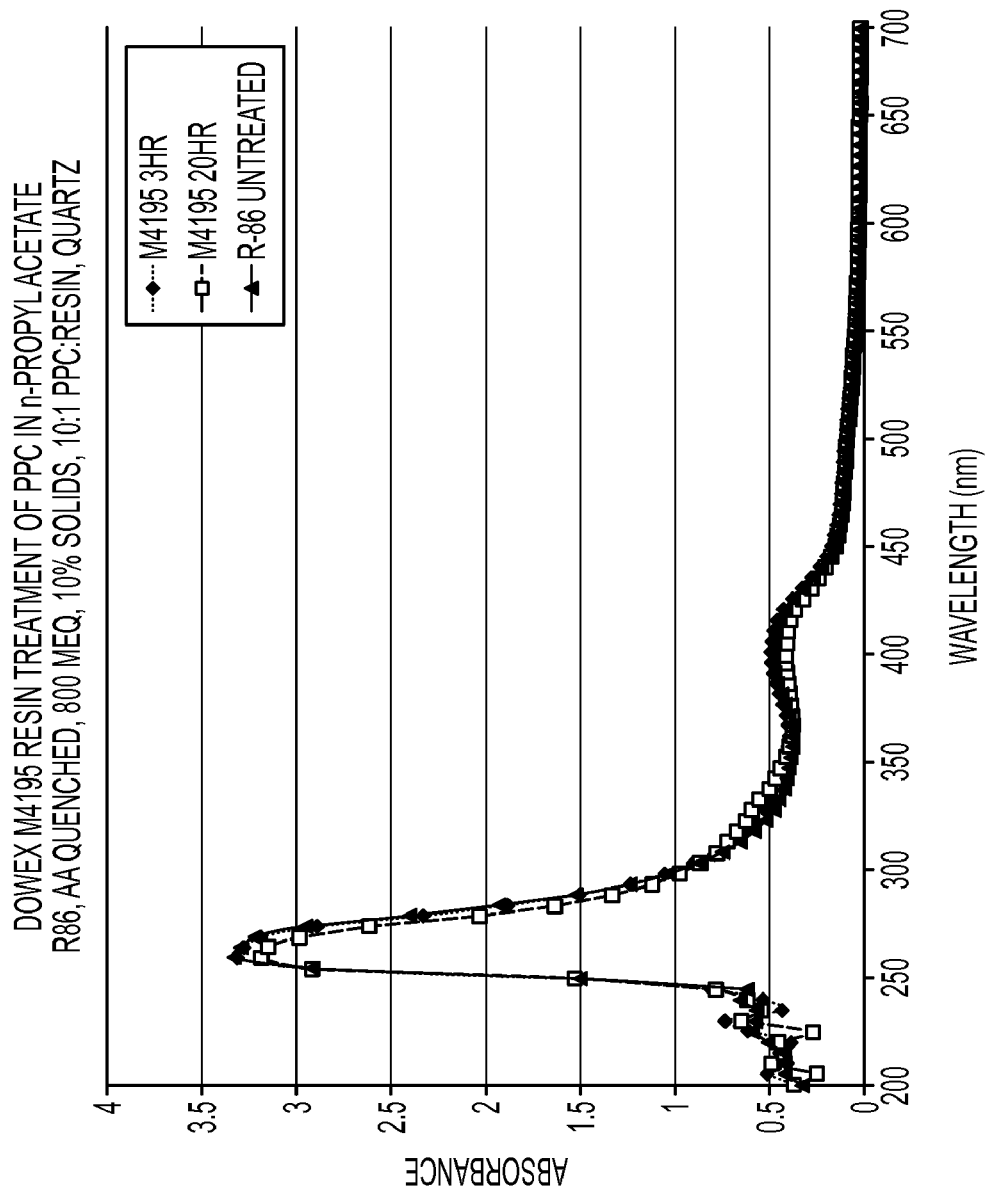

FIG. 13 depicts UV/Vis absorption curves of PPC solution after treatment with a strong acid cation ion exchange resin, DOWEX™ M4195. For the PPC solution, the polymerization was quenched with 800 mol. equivalents of acetic acid; treatment used a 10:1 ratio of PPC solution to resin.

Figure 14:
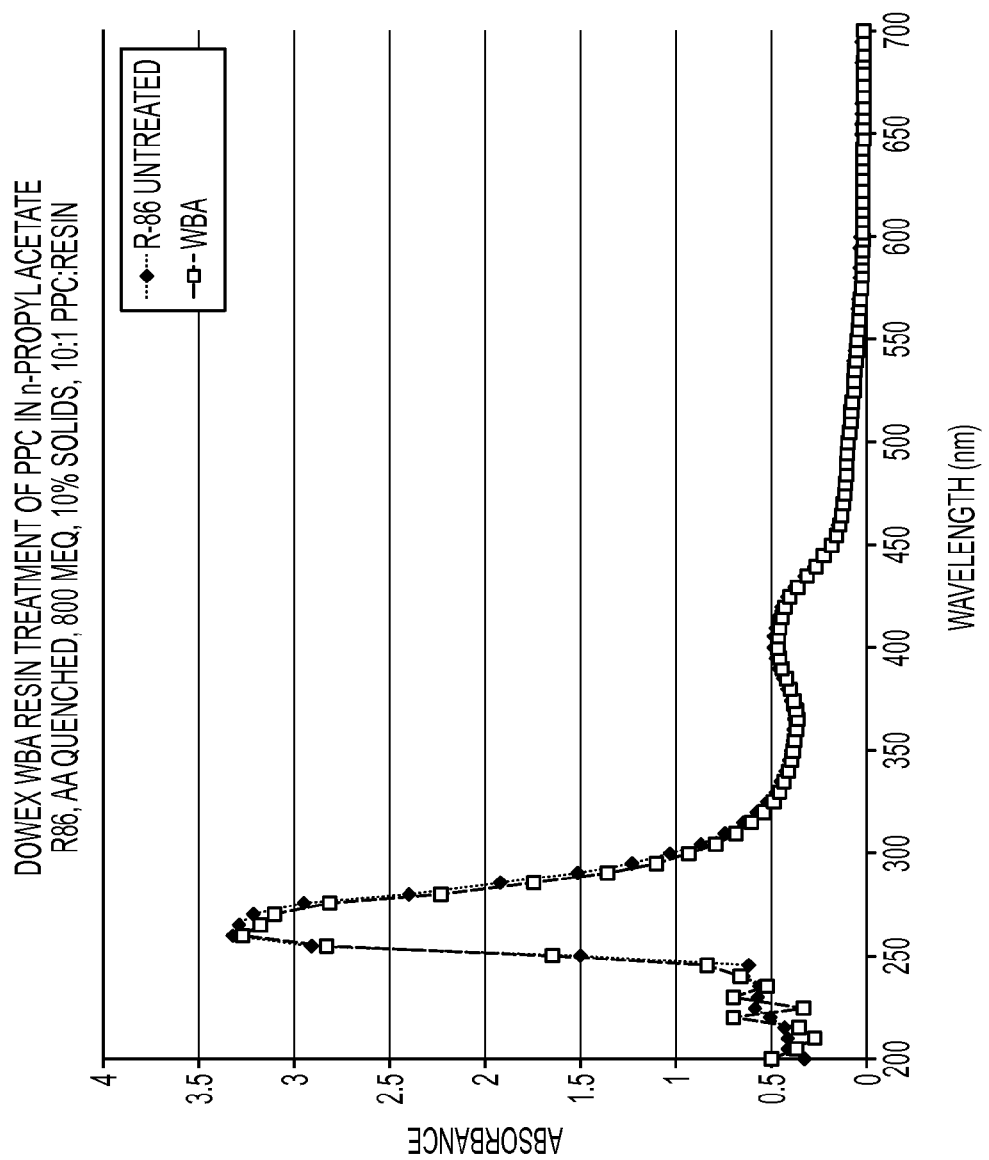

FIG. 14 depicts UV/Vis absorption curves of PPC solution after treatment with a strong acid cation ion exchange resin, DOWEX™ MARATHON™ WBA. For the PPC solution, the polymerization was quenched with 800 mol. equivalents of acetic acid; treatment used a 10:1 ratio of PPC solution to resin.

Figure 15:
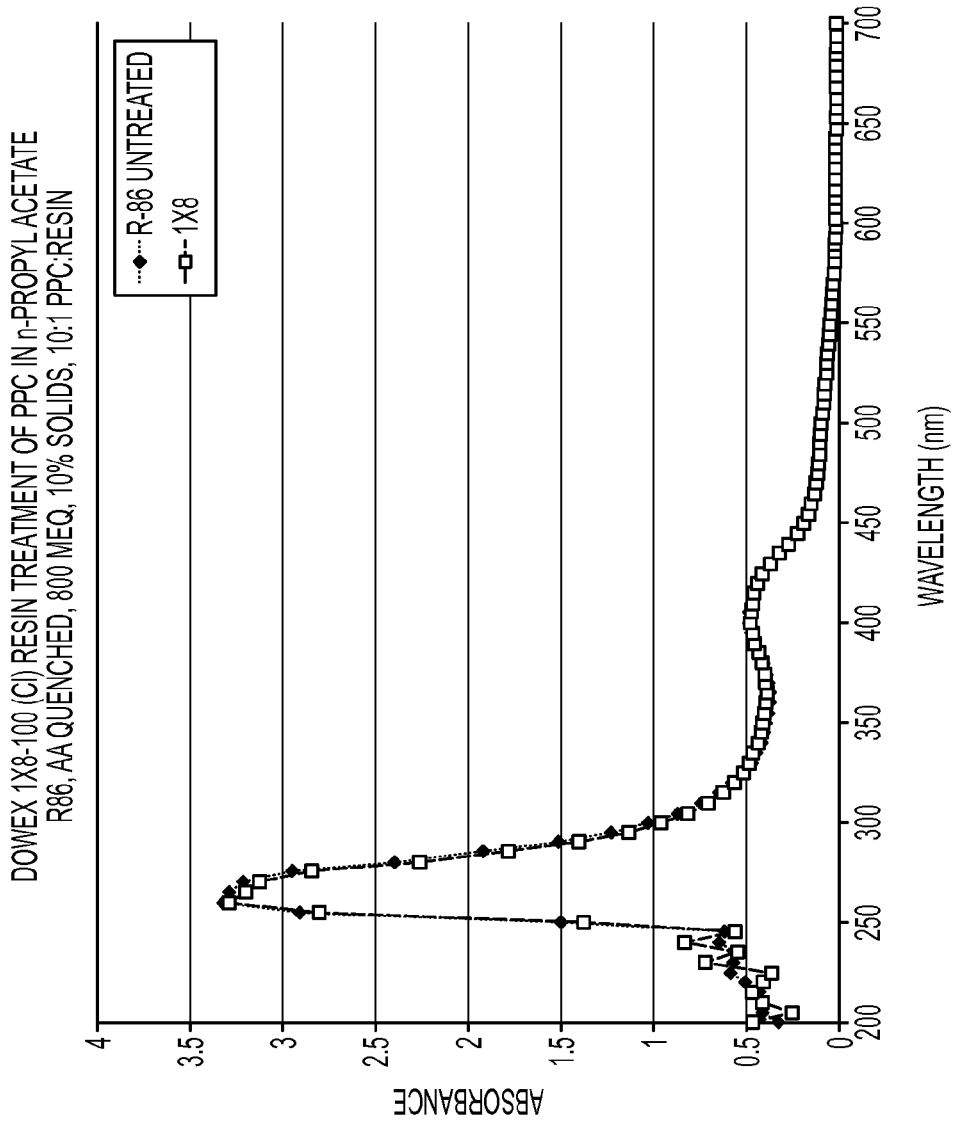

FIG. 15 depicts UV/Vis absorption curves of PPC solution after treatment with a strong acid cation ion exchange resin, DOWEX™ 1X8(Cl). For the PPC solution, the polymerization was quenched with 800 mol. equivalents of acetic acid; treatment used a 10:1 ratio of PPC solution to resin.

Figure 16:
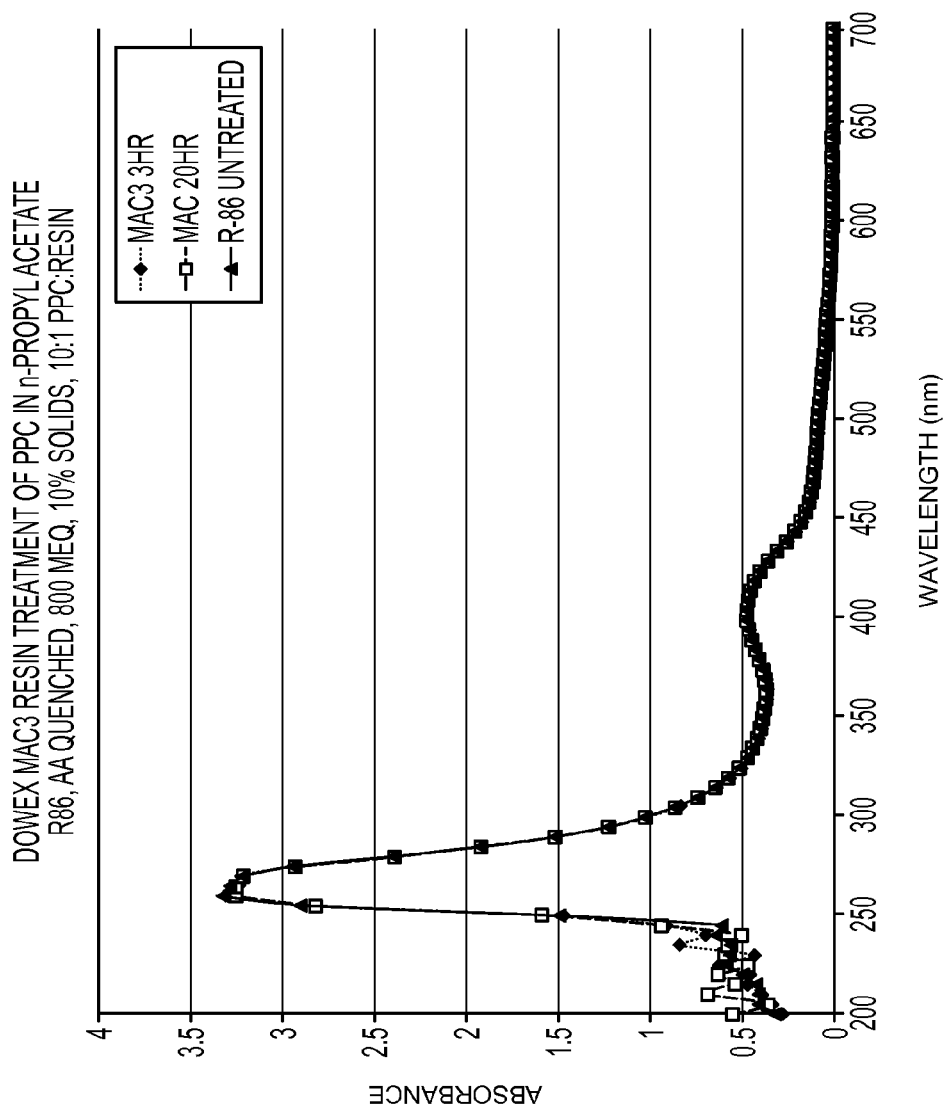

FIG. 16 depicts UV/Vis absorption curves of PPC solution after treatment with a strong acid cation ion exchange resin, DOWEX™ MAC3 (available from Dow Chemical Corp. as of August 2008, see product information form no. 177-01603-0407). For the PPC solution, the polymerization was quenched with 800 mol. equivalents of acetic acid; treatment used a 10:1 ratio of PPC solution to resin.

Figure 17:
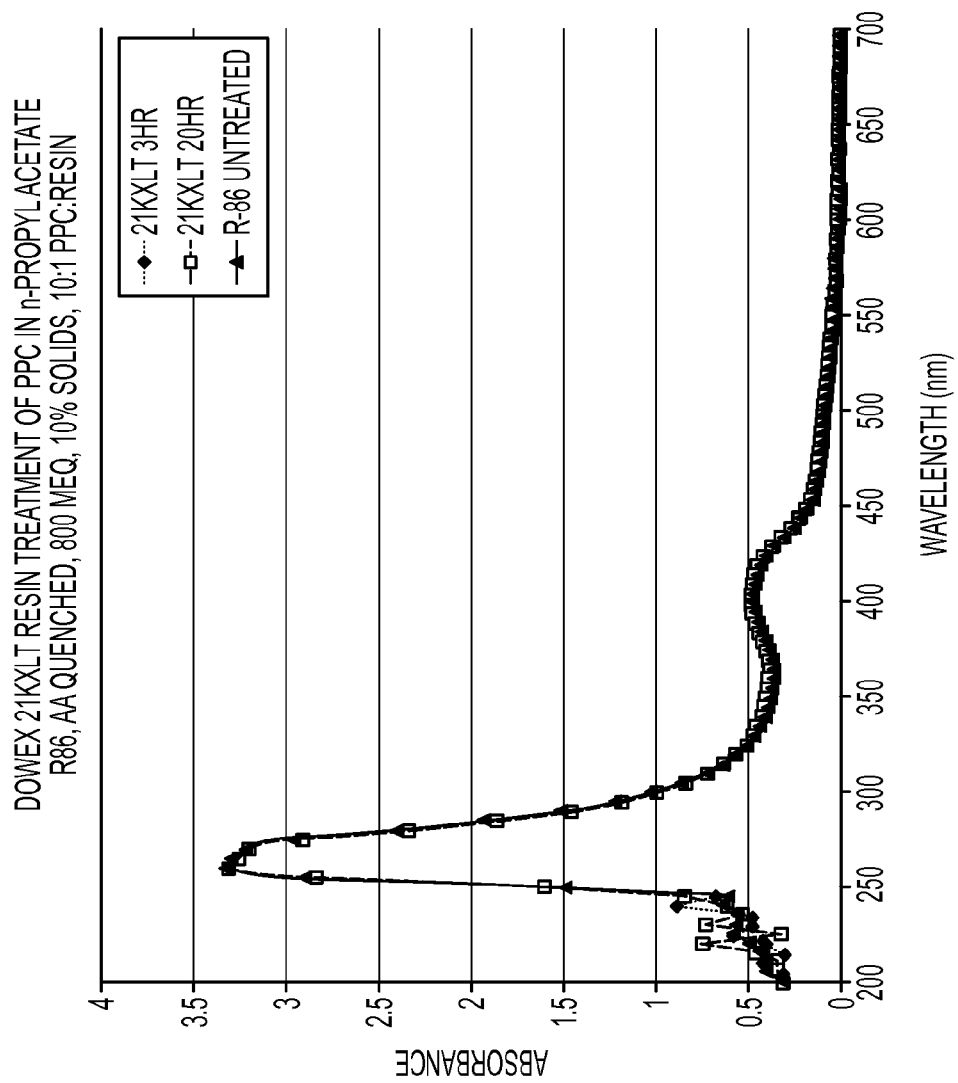

FIG. 17 depicts UV/Vis absorption curves of PPC solution after treatment with a strong acid cation ion exchange resin, DOWEX™ 21K XLT. For the PPC solution, the polymerization was quenched with 800 mol. equivalents of acetic acid; treatment used a 10:1 ratio of PPC solution to resin.

Figure 18:
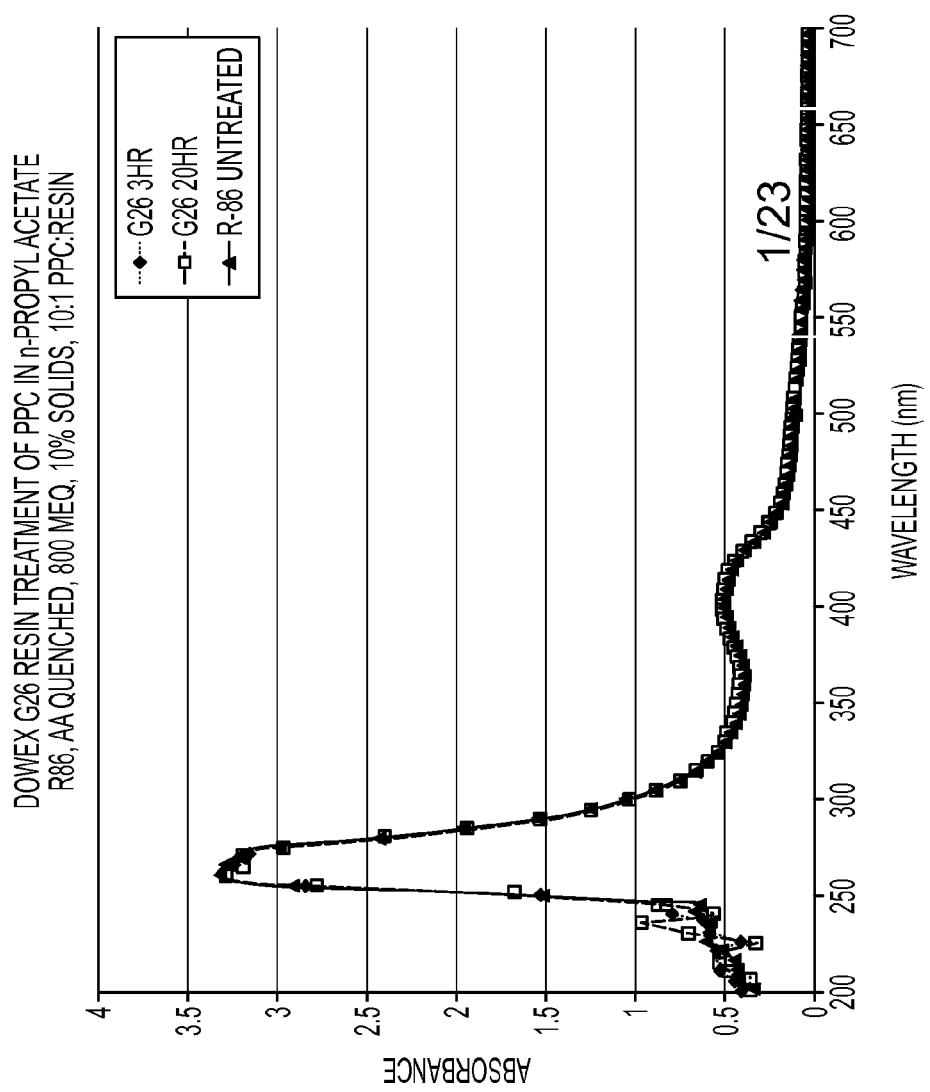

FIG. 18 depicts UV/Vis absorption curves of PPC solution after treatment with a strong acid cation ion exchange resin, DOWEX™ G26 (available from Dow Chemical Corp. as of August 2008, see product information form no. 177-01812-1105). For the PPC solution, the polymerization was quenched with 800 mol. equivalents of acetic acid; treatment used a 10:1 ratio of PPC solution to resin.

Figure 19:
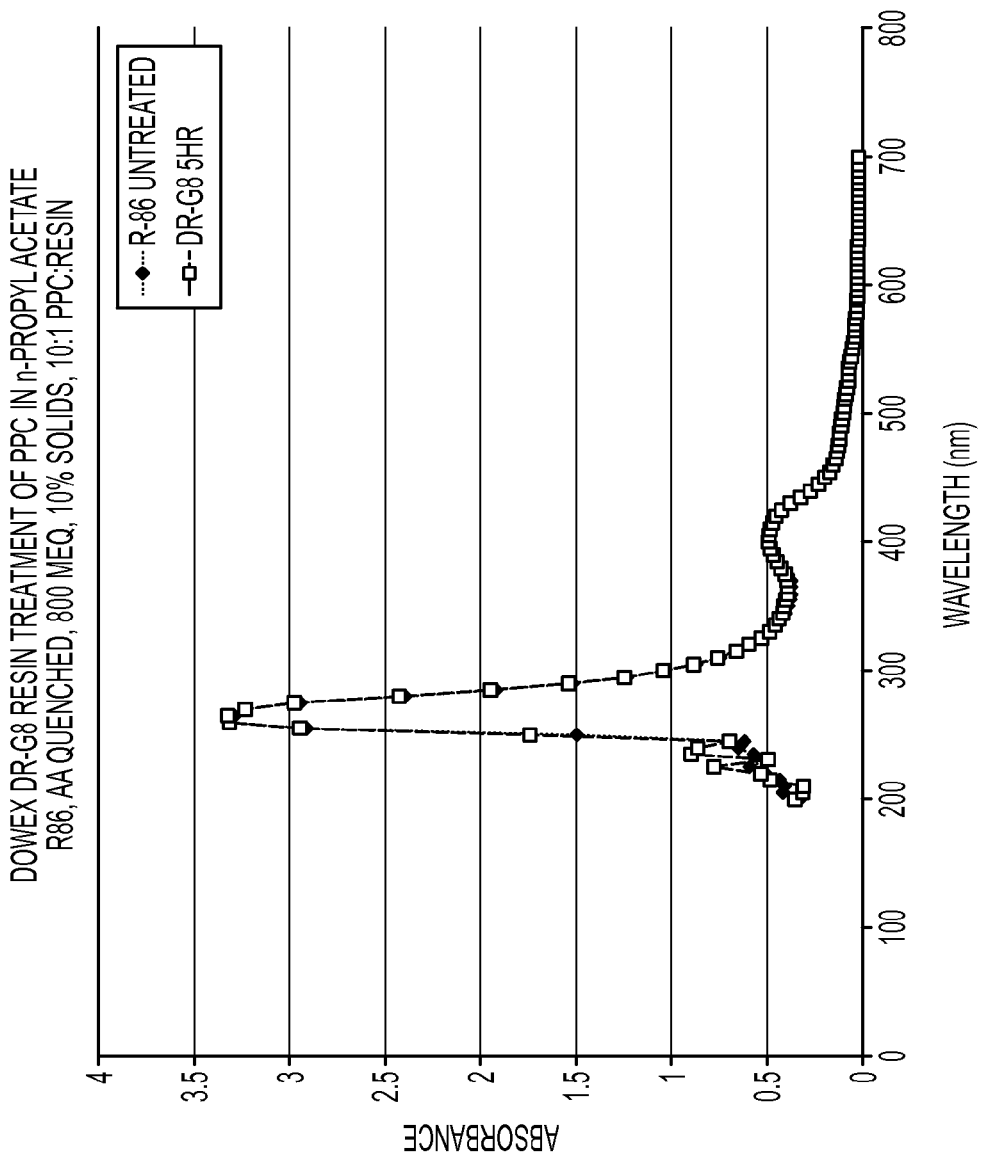

FIG. 19 depicts UV/Vis absorption curves of PPC solution after treatment with a strong acid cation ion exchange resin, DOWEX™ DR-G8 (available from Dow Chemical Corp. as of August 2008, see product information form no. 177-02147-0207). For the PPC solution, the polymerization was quenched with 800 mol. equivalents of acetic acid; treatment used a 10:1 ratio of PPC solution to resin. Results shown are after only 5 hours.

Figure 20:
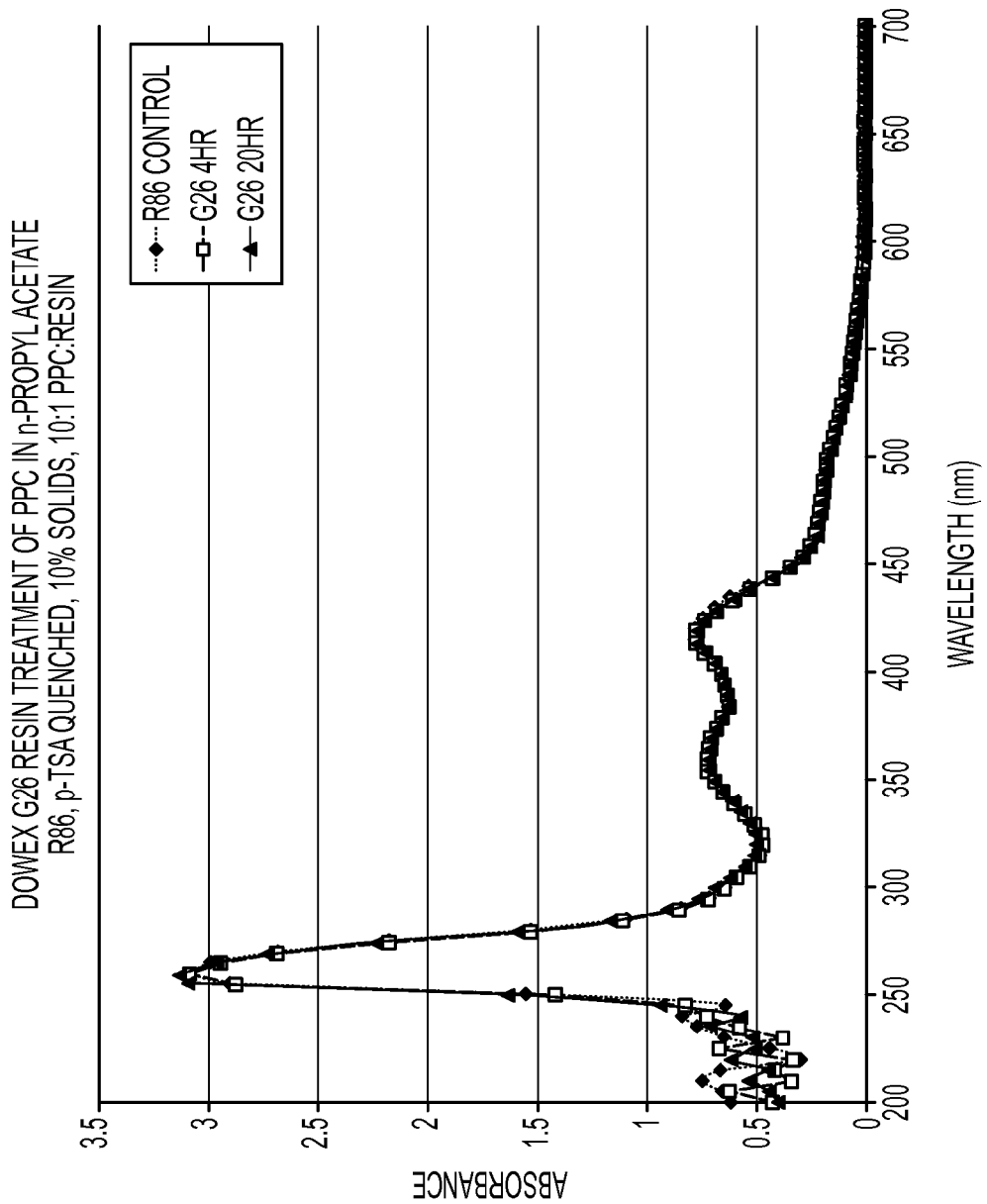

FIG. 20 depicts UV/Vis absorption curves of PPC solution after treatment with a strong acid cation ion exchange resin, DOWEX™ G26. For the PPC solution, the polymerization was quenched tosic acid; treatment used a 10:1 ratio of PPC solution to resin.

Figure 21:
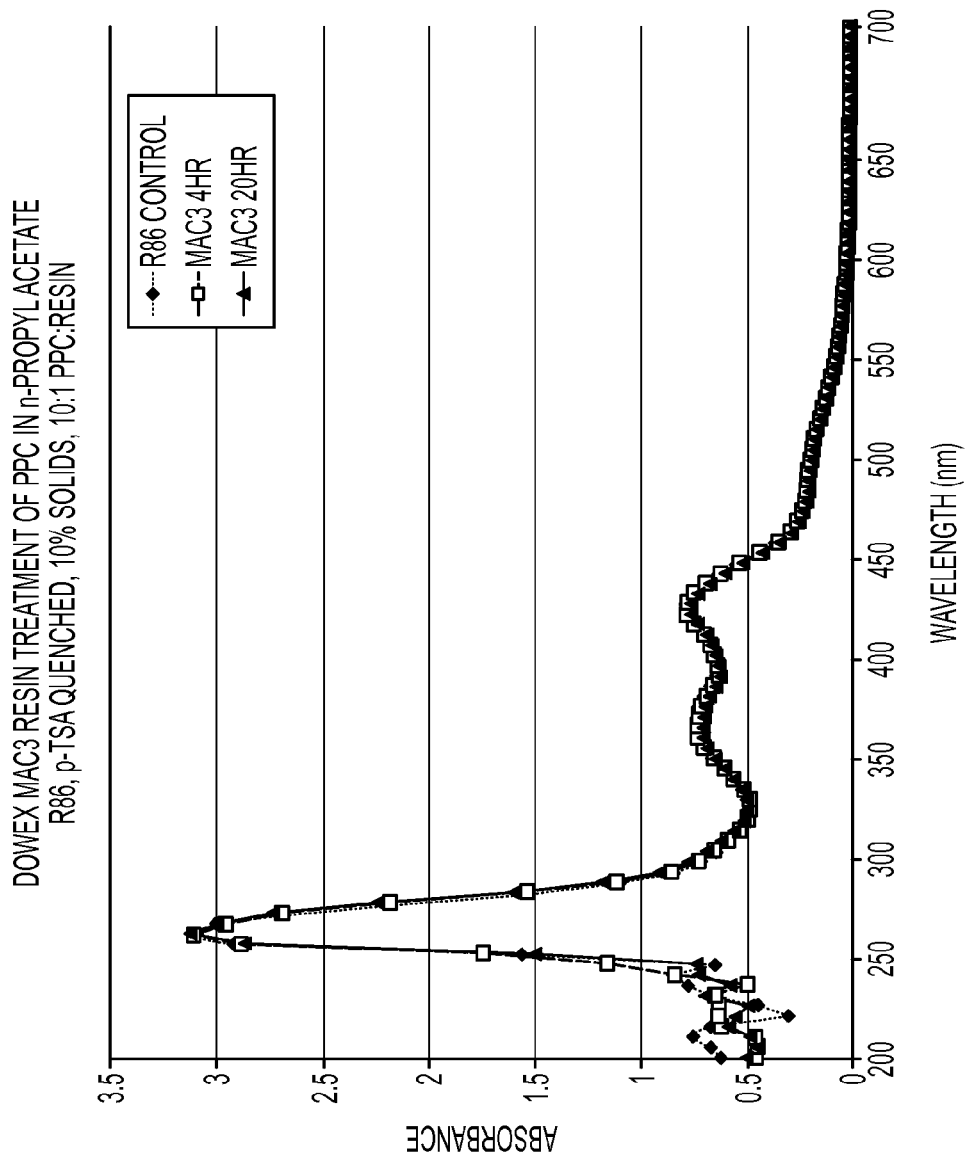

FIG. 21 depicts UV/Vis absorption curves of PPC solution after treatment with a strong acid cation ion exchange resin, DOWEX™ MAC3. For the PPC solution, the polymerization was quenched tosic acid; treatment used a 10:1 ratio of PPC solution to resin.

Figure 22:
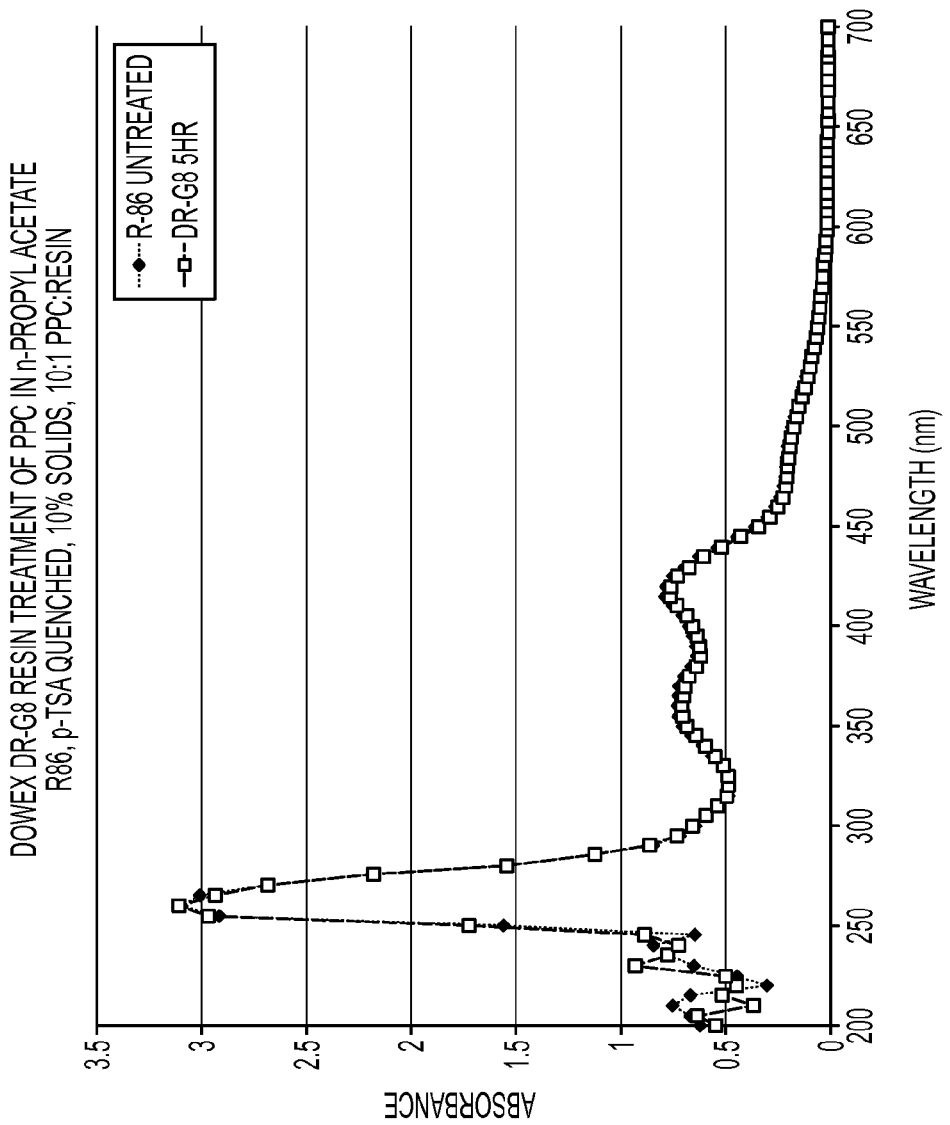

FIG. 22 depicts UV/Vis absorption curves of PPC solution after treatment with a strong acid cation ion exchange resin, DOWEX™ DR-G8. For the PPC solution, polymerization was quenched tosic acid; treatment used a 10:1 ratio of PPC solution to resin.

Figure 23:
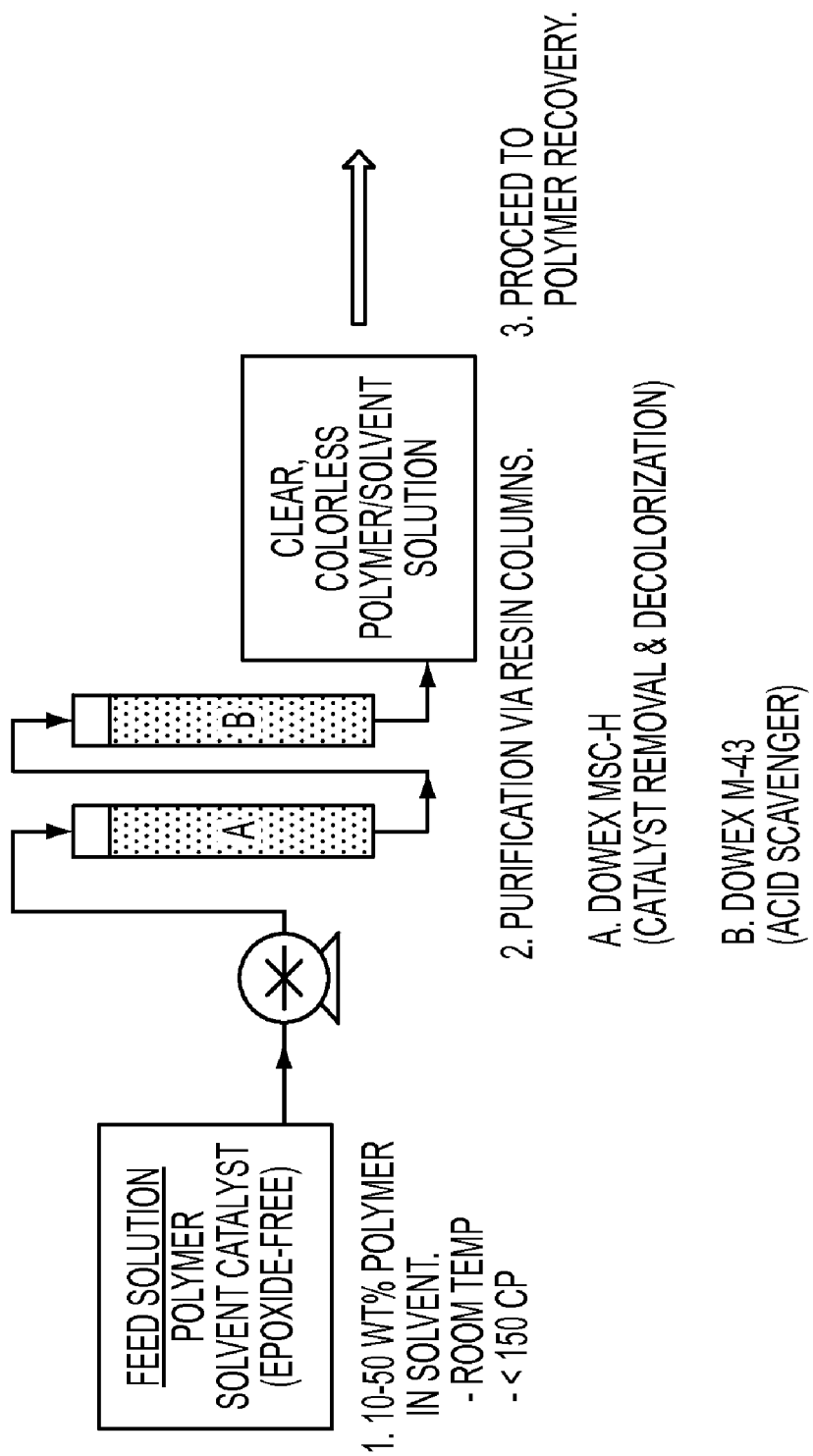

FIG. 23 depicts an overview of the resin bed treatment using two packed beds of resin.

DETAILED DESCRIPTION

Aliphatic Polycarbonates

In one embodiment of the present disclosure, the APC polymer is poly(propylene carbonate). In another embodiment of the present disclosure, the APC polymer is poly(ethylene carbonate). In another embodiment of the present disclosure, the APC polymer is poly(butylene carbonate). In another embodiment of the present disclosure, the APC polymer is poly(cyclohexene carbonate). In another embodiment of the present disclosure, the APC polymer is poly(3-vinyl cyclohexene carbonate). In another embodiment of the present disclosure, the APC polymer is poly(limonene carbonate). In another embodiment of the present disclosure, the APC polymer is poly(norbornene carbonate). In another embodiment of the present disclosure, the APC polymer is poly(cyclopentene carbonate). In another embodiment of the present disclosure, the APC polymer is poly(cyclooctene carbonate).

In certain embodiments of the present disclosure, the APC polymer is a polymer of two or more $C_2$-$C_{12}$ epoxides and carbon dioxide. For example, the APC polymer can be a terpolymer of propylene oxide, cyclohexene oxide and carbon dioxide. In another embodiment of the present disclosure, the APC polymer is a terpolymer of ethylene oxide, propylene oxide and carbon dioxide. In another embodiment of the present disclosure, the APC polymer is a terpolymer of ethylene oxide, cyclohexene oxide and carbon dioxide. In another embodiment of the present disclosure, the APC polymer is a terpolymer of ethylene oxide, butylene oxide and carbon dioxide. In another embodiment of the present disclosure, the APC polymer is a terpolymer of butylene oxide, propylene oxide and carbon dioxide. In another embodiment of the present disclosure, the APC polymer is a terpolymer of cyclohexene oxide, butylene oxide and carbon dioxide. In another embodiment of the present disclosure, the APC polymer is a terpolymer of norbornene oxide, propylene oxide and carbon dioxide. In certain other embodiments of the present disclosure, the APC polymer is a terpolymer of propylene oxide, limonene oxide and carbon dioxide.

In certain embodiments of the present disclosure the APC polymer is a heteropolymer of three or more $C_2$-$C_{12}$ epoxides and carbon dioxide. In certain other embodiments, the APC polymer is a heteropolymer of any three or more of the epoxides described above and carbon dioxide.

In certain embodiments of the present disclosure, the APC polymer is a block co-polymer of two or more of any of the above-described APC compositions.

In certain embodiments of the present disclosure the polymers include ether linkages. Polymers in these embodiments can be mixed polyether polycarbonates, pure polyethers or block copolymers of two or more of these.

Polymerization/Reaction/Catalysts

In one aspect, the present disclosure provides a method that comprises the steps of initiating an aliphatic polycarbonate (APC) polymerization reaction by combining an epoxide with carbon dioxide in the presence of a catalytic metal-ligand complex, and allowing the polymerization reaction to proceed for a period of time to form a reaction mixture comprising a polycarbonate chain. It will be appreciated by one skilled in the art that a variety of epoxides and catalytic transition metal complexes can be used in the disclosed methods.

For example, one skilled in the art could use any of the epoxides described in co-pending U.S. Provisional Application Ser. No. 61/187,750, the entire content of which is hereby incorporated by reference.

In certain embodiments, the epoxide is selected from ethylene oxide, monosubstituted alkyl epoxides, 1,2-disubstituted alkyl epoxides, 1,1-disubstituted epoxides, and polycyclic epoxides.

In certain embodiments, the epoxide is selected from ethylene oxide, propylene oxide, epichlorohydrin, glycidyl ethers, glycidyl esters, 1,2-butylene oxide, 2,3-butylene oxide, cyclopentene oxide, cyclohexene oxide, 3-vinyl cyclohexene oxide, cyclooctene oxide, norbornene oxide and limonene oxide.

In certain embodiments, the epoxide is propylene oxide.

In certain embodiments, the metal of the metal ligand complex is M. In certain embodiments M is any metal. In certain embodiments M is a metal from groups 3 to 13 of the periodic table. In certain embodiments M is a transition metal. In certain embodiments M is a Group 4 transition metal. In certain embodiments, M is titanium. In certain embodiments, M is a Group 6 transition metal. In certain embodiments, M is molybdenum. In certain embodiments, M is chromium. In certain embodiments, M is a Group 7 transition metal. In certain embodiments, M is manganese. In certain embodiments, M is a Group 8 transition metal. In certain embodiments, M is ruthenium. In certain embodiments, M is a Group 9 transition metal. In certain embodiments, M is cobalt. In certain embodiments, wherein the metal is cobalt, the cobalt has a valency of +2 (i.e., Co (II)). In certain embodiments, wherein M is cobalt, the cobalt has a valency of +3 (i.e., Co (III)). In certain embodiments, M is a Group 12 transition metal. In certain embodiments, M is cadmium. In certain embodiments, M is zinc. In certain embodiments, M is in Group 13. In certain embodiments, M is aluminum.

In certain embodiments of the present disclosure, the cobalt catalyst comprises a cobalt (III) catalyst. The catalysts can include a multidentate ligand. In certain embodiments the catalysts can include tetradentate ligands. In some embodiments of the present disclosure, the catalysts include one or more Schiff base ligands. In certain embodiments the catalysts include ligands such as, for example, porphyrin ligands or salen ligands.

In certain embodiments, the catalyst complex includes at least one ligand that is a polymerization initiator. In certain embodiments, the polymerization initiator is a nucleophilic ligand. In other embodiments, the catalyst complex includes at least one ligand that derived from a quench agent used to stop the polymerization reaction.

In certain embodiments, each nucleophilic ligand is denoted $X^1$ or $X^2$, (as the valency of M permits). In certain embodiments one nucleophilic ligand is present and is denoted $X^1$. In certain embodiments, a second nucleophilic ligand is present and is denoted $X^2$.

In certain embodiments, as valency of M permits, one or both of $X^1$ and $X^2$ are present and each is independently selected from the group consisting of $-OR^x$, $-SR^x$, $-SO_2R^x$, $-O(C=O)R^x$, $-O(C=O)OR^x$, $-O(C=O)N(R^x)_2$, $N(R^x)(C=O)R^x$, $-NC$, $-CN$, halo (e.g., $-Br$, $-I$, $-Cl$), $-N_3$, and $PR^x_3$, wherein each $R^x$ is, independently, selected from hydrogen, optionally substituted aliphatic, optionally substituted heteroaliphatic, optionally substituted aryl and optionally substituted heteroaryl.

In certain embodiments, $X^1$ and $X^2$ are each, independently $-O(C=O)R^x$, wherein $R^x$ is selected from optionally substituted aliphatic, optionally substituted heteroaliphatic, optionally substituted aryl, and optionally substituted heteroaryl.

In certain embodiments, $X^1$ and/or $X^2$ are each, independently $-O(C=O)R^x$, wherein $R^x$ is optionally substituted alkyl. In certain embodiments, $X^1$ and $X^2$ are each, independently $-O(C=O)CH_3$ or $-O(C=O)CF_3$.

Furthermore, in certain embodiments, $X^1$ and/or $X^2$ are each, independently $-O(C=O)R^x$, wherein $R^x$ is optionally substituted aryl or heteroaryl. In certain embodiments, X is $-O(C=O)R^x$, wherein $R^x$ is optionally substituted aryl. In certain embodiments, $X^1$ and $X^2$ are $-O(C=O) R^x$, wherein $R^x$ is optionally substituted phenyl. In certain embodiments, $X^1$ and $X^2$ are each, independently $-O(C=O)C_6H_5$ or $-O(C=O)C_6F_5$.

In certain embodiments, $X^1$ and $X^2$ are each, independently $-OR^x$, wherein $R^x$ is selected from optionally substituted aliphatic, optionally substituted heteroaliphatic, optionally substituted aryl, and optionally substituted heteroaryl.

For example, in certain embodiments, $X^1$ and $X^2$ are each, independently $-OR^x$, wherein $R^x$ is optionally substituted aryl. In certain embodiments, $X^1$ and $X^2$ are each, independently $-OR^x$, wherein $R^x$ is optionally substituted phenyl. In certain embodiments, $X^1$ and $X^2$ are each, independently $-OC_6H_5$ or $-OC_6H_2(2,4-NO_2)$.

In certain embodiments, $X^1$ and $X^2$ are each, independently halo. In certain embodiments, $X^1$ and/or $X^2$ are $-Br$. In certain embodiments, $X^1$ and/or $X^2$ are Cl. In certain embodiments, $X^1$ and/or $X^2$ are $-I$.

In certain embodiments, $X^1$ and/or $X^2$ are $-N_3$.
In certain embodiments, $X^1$ and/or $X^2$ are $-NC$.
In certain embodiments, $X^1$ and/or $X^2$ are $-CN$.

In certain embodiments, $X^1$ and $X^2$ are both present and $X^1$ is as defined above, while $X^2$ is a coordinating solvent molecule such as an ether.

In certain embodiments, at least one ligand is not a polymerization initiator. In certain embodiments, the ligand that is not a polymerization initiator is a polydentate ligand. In certain embodiments, the polydentate ligand is a salen ligand.

In certain embodiments, the catalyst complex has the formula:

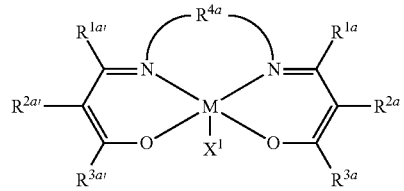

wherein:
M is a metal atom,
$R^{1a}$, $R^{1a'}$, $R^{3a}$, and $R^{3a'}$ are independently a $-\!\!\!\sim\!\!\!- (Z')_m$ group, hydrogen, or an optionally substituted group selected from the group consisting of $C_{1-20}$ aliphatic; $C_{1-20}$ heteroaliphatic having 1-4 heteroatoms independently selected from the group consisting of nitrogen, oxygen, and sulfur; 6- to 10-membered aryl; 5- to 10-membered heteroaryl having 1-4 heteroatoms independently selected from nitrogen, oxygen, or sulfur; and 4- to 7-membered heterocyclic;
$R^{2a}$, $R^{2a'}$, are independently a $-\!\!\!\sim\!\!\!- (Z')_m$ group, hydrogen, halogen, $-OR$, $-NR_2$, $-SR$, $-CN$, $-NO_2$, $-SO_2R$, $-SOR$, $-SO_2NR_2$; $CO_2R$, $C(O)R$, $-CNO$, $-NRSO_2R$, $-NCO$, $-N_3$, $-SiR_3$; or an optionally substituted group selected from the group consisting of $C_{1-20}$ aliphatic; $C_{1-20}$ heteroaliphatic having 1-4 heteroatoms independently selected from the group consisting of nitrogen, oxygen, and sulfur; 6- to 10-membered aryl; 5- to 10-membered heteroaryl having 1-4 heteroatoms independently selected from nitrogen, oxygen, or sulfur; and 4- to 7-membered heterocyclic;

each R is independently hydrogen, an optionally substituted group selected the group consisting of acyl; carbamoyl; arylalkyl; 6- to 10-membered aryl; $C_{1-12}$ aliphatic; $C_{1-12}$ heteroaliphatic; 5- to 10-membered heteroaryl having 1-4 heteroatoms independently selected from the group consisting of nitrogen, oxygen, and sulfur; 4- to 7-membered heterocyclyl; an oxygen protecting group; and a nitrogen protecting group; or:

two R on the same nitrogen atom are taken with the nitrogen to form a 4- to 7-membered heterocyclic ring;

wherein any of [$R^{2a'}$ and $R^{3a'}$], [$R^{2a}$ and $R^{3a}$], [$R^{1a}$ and $R^{2a}$], and [$R^{1a'}$ and $R^{2a'}$] may optionally be taken together with intervening atoms to form one or more rings which may in turn be substituted with one or more $R^{20a}$ groups; and $R^{4a}$ is selected from the group consisting of:

a)
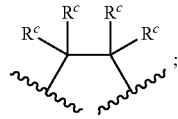

b)
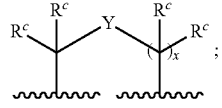

c)
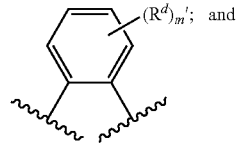

d)
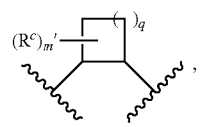

where $R^c$ at each occurrence is independently a —ww—$(Z')_m$ group, hydrogen, halogen, —OR, —NR$_2$, —SR, —CN, —NO$_2$, —SO$_2$R, —SOR, —SO$_2$NR$_2$; —CNO, —NRSO$_2$R, —NCO, —N$_3$, —SiR$_3$; or an optionally substituted group selected from the group consisting of $C_{1-20}$ aliphatic; $C_{1-20}$ heteroaliphatic having 1-4 heteroatoms independently selected from the group consisting of nitrogen, oxygen, and sulfur; 6- to 10-membered aryl; 5- to 10-membered heteroaryl having 1-4 heteroatoms independently selected from nitrogen, oxygen, or sulfur; and 4- to 7-membered heterocyclic;

where:

two or more $R^c$ groups may be taken together with intervening atoms and any intervening atoms to form one or more rings;

when two $R^c$ groups are attached to the same carbon atom, they may be taken together along with the carbon atom to which they are attached to form a moiety selected from the group consisting of: a 3- to 8-membered spirocyclic ring, a carbonyl, an oxime, a hydrazone, an imine;

$X^1$ is a nucleophile capable of ring opening an epoxide;

Y is a divalent linker selected from the group consisting of: —NR—, —N(R)C(O)—, —C(O)NR—, —O—, —C(O)—, —OC(O)—, —C(O)O—, —S—, —SO—, —SO$_2$—, —C(=S)—, —C(=NR)—, or —N=N—; a polyether; a $C_3$ to $C_8$ substituted or unsubstituted carbocycle; and a $C_1$ to $C_8$ substituted or unsubstituted heterocycle;

—ww— (Z') represents one or more independently-defined co-catalyst moieties linked to the ligand via a covalent tether, where:

each Z' independently represents any moiety capable of acting as a co-catalyst in the polymerization reactions described herein. Suitable co-catalyst moieties include but are not limited to ammonium salts, phosphonium salts, arsonium salts, guanidinium salts, azonium salts, amino groups, phosphine groups, guanidine groups, amidine groups, heterocyclic groups and heteroaryl groups;

m is an integer from 1 to 4, inclusive and represents the number of Z' groups present on the tether; and —ww— represents a covalent tether consisting of one or more atoms;

m' is 0 or an integer from 1 to 4, inclusive;

q is 0 or an integer from 1 to 4, inclusive; and x is 0, 1, or 2.

In some embodiments, at least one of [$R^{2a}$ and $R^{3a}$] and [$R^{2a'}$ and $R^{3a'}$] are taken together to form a ring. In some embodiments, both [$R^{2a}$ and $R^{3a}$] and [$R^{2a'}$ and $R^{3a'}$] are taken together to form rings. In some embodiments, the rings formed by [$R^{2a}$ and $R^{3a}$] and [$R^{2a'}$ and $R^{3a'}$] are substituted phenyl rings.

In certain embodiments, where the catalyst complex includes a salen ligand, the salen ligand has one of the following formulae:

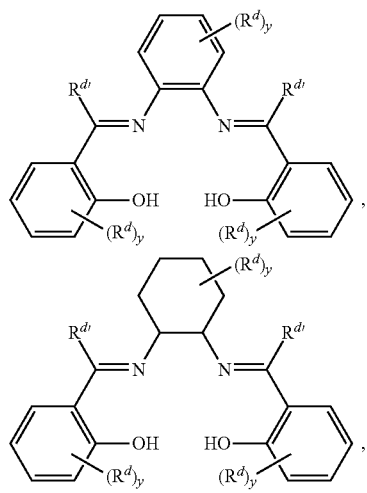

-continued

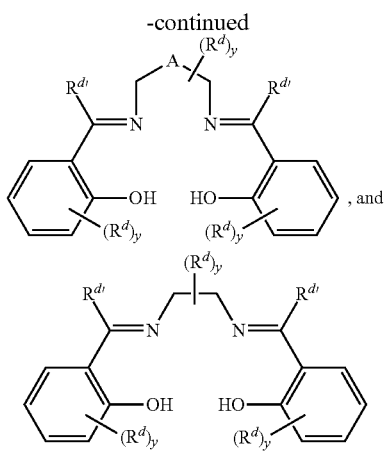
, and wherein:
$R^d$ at each occurrence is independently selected from the group consisting of a —ww—$(Z')_m$ group, —H, optionally substituted $C_1$-$C_{20}$ aliphatic, optionally substituted $C_1$-$C_{20}$ heteroaliphatic, optionally substituted 6- to 14-membered aryl, optionally substituted 5- to 14-membered heteroaryl, halogen, —$OR^{10}$, —$OC(O)R^{13}$, —OC(O)$OR^{13}$, —OC(O)$NR^{11}R^{12}$, —CN, —CNO, —C(O)$R^{13}$, —$C(R^{13})_zH_{(3-z)}$, —C(O)$OR^{13}$, —C(O)$NR^{11}R^{12}$, —$NR^{11}R^{12}$, —$N^+(R^{11})_3$, —$NR^{11}C(O)R^{10}$, —$NR^{11}C(O)OR^{13}$, —$NR^{11}SO_2R^{13}$, —NCO, —$N_3$, —$NO_2$, —$S(O)_xR^{13}$m —$SO_2NR^{11}R^{12}$, —$NO_2$, —$C(R^{13})_zH_{(3-z)}$, —$(CH_2)_kR^{14}$, —$(CH_2)_k$—Z—$R^{16}$—, and —$(CH_2)k$-Z—$(CH_2)_m$—$R^{14}$, where two or more suitable $R^d$ groups can be taken along with intervening atoms to form one or more rings;
$R^{d'}$ at each occurrence is independently selected from the group consisting of —H, $C_1$-$C_{12}$ alkyl, $C_2$-$C_{12}$ alkenyl, $C_2$-$C_{12}$ alkynyl, —CN, —CNO, —C(O)$R^{13}$, —$C(R^{13})_zH_{(3-z)}$, —C(O)$OR^{13}$, —C(O)$NR^{11}R^{12}$, —$C(R^{13})_zH_{(3-z)}$, —$(CH_2)_kR^{14}$, —$(CH_2)_k$—Z—$R^{16}$—, —$(CH_2)_k$—Z—$(CH_2)_m$—$R^{14}$, where two or more suitable $R^{d'}$ groups can be taken along with intervening atoms to form one or more rings;
A is a divalent linker selected from the group consisting of —O—, —$S(O)_x$—, —$(CH_2)$—, —C(O)—, —$C(=NOR^{10})$—, —$(C(R^{14})_xH_{(2-x)})_k$—, a $C_3$ to $C_8$ substituted or unsubstituted carbocycle, and a $C_1$-$C_8$ substituted or unsubstituted heterocycle;
$R^{10}$ at each occurrence is independently selected from the group consisting of —H, —$C(R^{13})_zH_{(3-z)}$, $C_1$-$C_{12}$ alkyl, $C_2$-$C_{12}$ alkenyl, $C_2$-$C_{12}$ alkynyl, up to a $C_{12}$ carbocycle, up to a $C_{12}$ heterocycle, —$S(O)_2R^{13}$; —$Si(R^{15})_3$, and a hydroxyl protecting group;
$R^{11}$ and $R^{12}$ at each occurrence are independently selected from the group consisting of —H, optionally substituted $C_1$-$C_{20}$ aliphatic, optionally substituted $C_1$-$C_{20}$ heteroaliphatic, optionally substituted 6- to 14-membered aryl, optionally substituted 5- to 14-membered heteroaryl, and —$C(R^{13})_zH_{(3-z)}$; wherein $R^{11}$ and $R^{12}$ when both present can optionally be taken together with the atom to which they are attached to form a 3-10-membered ring;
$R^{13}$ at each occurrence is an optionally substituted moiety independently selected from the group consisting of: —H, optionally substituted $C_1$-$C_{20}$ aliphatic, optionally substituted $C_1$-$C_{20}$ heteroaliphatic, optionally substituted 6-14-membered aryl, optionally substituted 5-14-membered heteroaryl;

$R^{14}$ at each occurrence is independently selected from the group consisting of halogen, —$OR^{10}$, —$OC(O)R^{13}$, —OC(O)$OR^{13}$, —OC(O)$NR^{11}R^{12}$, —CN, —CNO, —$C(R^{13})_zH_{(3-z)}$, —C(O)$R^{13}$, —C(O)$OR^{13}$, —C(O)$NR^{11}R^{12}$, —$NR^{11}R^{12}$, —$NR^{11}C(O)R^{13}$, —$NR^{11}C(O)OR^{10}$, —$NR^{11}SO_2R^{13}$, —NCO, —$N_3$, —$NO_2$, —$S(O)_xR^{13}$, —$SO_2NR^{11}R^{12}$, up to a $C_{12}$ heterocycle; and up to a $C_{12}$ carbocycle;
$R^{15}$ at each occurrence is independently selected from the group consisting of $C_1$-$C_6$ alkyl, $C_2$-$C_6$ alkenyl, $C_2$-$C_6$ alkynyl, and up to $C_{12}$ substituted or unsubstituted carbocyclic;
$R^{16}$ at each occurrence is independently selected from the group consisting of $C_1$-$C_{12}$ alkyl, $C_2$-$C_{12}$ alkenyl, $C_2$-$C_{12}$ alkynyl, up to $C_{12}$ heterocylic, up to $C_{12}$ carbocyclic, and —$C(R^{13})_zH_{(3-z)}$;
Z is a divalent linker selected from the group consisting of —(CH=CH)$_a$—, —(CH=CH)$_a$—, —C(O)—, —$C(=NOR^{11})$—, —$C(=NNR^{11}R^{12})$—, —O—, —$N(R^{11})$—, —$N(C(O)R^{13})$—, —$S(O)_x$—, a polyether, and a polyamine;
a is 1, 2, 3, or 4;
—ww—$(Z')_m$ represents one or more independently-defined co-catalyst moieties linked to the ligand via a covalent tether, wherein:
each Z' independently represents any moiety capable of acting as a co-catalyst in the polymerization reactions described herein. Suitable co-catalyst moieties include but are not limited to ammonium salts, phosphonium salts, arsonium salts, guanidinium salts, azonium salts, amino groups, phosphine groups, guanidine groups, amidine groups, heterocyclic groups and heteroaryl groups;
m is an integer from 1 to 4, inclusive and represents the number of Z' groups present on the tether; and
—ww— represents a covalent tether consisting of one or more atoms;
k is an integer from 1 to 8 inclusive;
m is an integer from 1 to 8 inclusive;
x is 0, 1, or 2;
y is 0, 1, 2, 3, or 4; and
z is 1, 2, or 3.
In certain embodiments, the ligand is any of those disclosed in U.S. Pat. Nos. 6,870,004; 5,637,739; 7,220,870; and 7,304,172, the entirety of each of which is incorporated herein by reference.

In certain embodiments, the ligand is a porphyrin ligand.
In certain embodiments, the porphyrin ligand has the following formula:

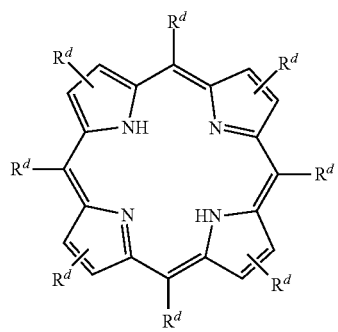

wherein:

$R^d$ at each occurrence is independently selected from the group consisting of —H, $C_1$-$C_{12}$ alkyl, $C_2$-$C_{12}$ alkenyl, $C_2$-$C_{12}$ alkynyl, halogen, —$OR^{10}$, —$OC(O)R^{13}$, —$OC(O)OR^{13}$, —$OC(O)NR^{11}R^{12}$, —CN, —CNO, —$C(O)R^{13}$, —$C(R^{13})_zH_{(3-z)}$, —$C(O)OR^{13}$, —$C(O)NR^{11}R^{12}$, —$NR^{11}R^{12}$, —$NR^{11}C(O)R^{10}$, —$NR^{11}C(O)OR^{13}$, —$NR^{11}SO_2R^{13}$, —NCO, —$N_3$, —$NO_2$, —$S(O)_xR^{13}$m —$SO_2NR^{11}R^{12}$, —$NO_2$, —$C(R^{13})_zH_{(3-z)}$, —$(CH_2)_kR^{14}$, —$(CH_2)_k$—Z—$R^{16}$—, and —$(CH_2)_k$—Z—$(CH_2)_m$—$R^{14}$;

A is a divalent linker selected from the group consisting of —O—, —$S(O)_x$—, —$(CH_2)$—, —$C(O)$—, —$C(=NOR^{10})$—, —$(C(R^{14})_xH_{(2-x)})_k$—, a $C_3$ to $C_8$ substituted or unsubstituted carbocycle, and a $C_1$-$C_8$ substituted or unsubstituted heterocycle;

$R^{10}$ at each occurrence is independently selected from the group consisting of —H, —$C(R^{13})_zH_{(3-z)}$, $C_1$-$C_{12}$ alkyl, $C_2$-$C_{12}$ alkenyl, $C_2$-$C_{12}$ alkynyl, up to a $C_{12}$ carbocycle, up to a $C_{12}$ heterocycle, —$S(O)_2R^{13}$; —$Si(R^{15})_3$, and a hydroxyl protecting group;

$R^{11}$ and $R^{12}$ at each occurrence are independently selected from the group consisting of —H, $C_1$-$C_{12}$ alkyl, $C_2$-$C_{12}$ alkenyl, $C_2$-$C_{12}$ alkynyl, and —$C(R^{13})_zH_{(3-z)}$; wherein $R^{11}$ and $R^{12}$ when both present can optionally be taken together with the atom to which they are attached to form a 3- to 10-membered ring;

$R^{13}$ at each occurrence is independently selected from the group consisting of: —H, b) $C_1$-$C_{12}$ alkyl, $C_2$-$C_{12}$ alkenyl, $C_2$-$C_{12}$ alkynyl, up to a $C_{12}$ carbocycle, up to a $C_{12}$ heterocycle;

$R^{14}$ at each occurrence is independently selected from the group consisting of halogen, —$OR^{10}$, —$OC(O)R^{13}$, —$OC(O)OR^{13}$, —$OC(O)NR^{11}R^{12}$, —CN, —CNO, —$C(R^{13})_zH_{(3-z)}$, —$C(O)R^{13}$, —$C(O)OR^{13}$, —$C(O)NR^{11}R^{12}$, —$NR^{11}R^{12}$, —$NR^{11}C(O)R^{13}$, —$NR^{11}C(O)OR^{10}$, —$NR^{11}SO_2R^{13}$, —NCO, —$N_3$, —$NO_2$, —$S(O)_xR^{13}$, —$SO_2NR^{11}R^{12}$, up to a $C_{12}$ heterocycle; and up to a $C_{12}$ carbocycle;

$R^{15}$ at each occurrence is independently selected from the group consisting of $C_1$-$C_6$ alkyl, $C_2$-$C_6$ alkenyl, $C_2$-$C_6$ alkynyl, and up to $C_{12}$ substituted or unsubstituted carbocyclic;

$R^{16}$ at each occurrence is independently selected from the group consisting of $C_1$-$C_{12}$ alkyl, $C_2$-$C_{12}$ alkenyl, $C_2$-$C_{12}$ alkynyl, $C_{12}$ heterocylic, up to $C_{12}$ carbocyclic, and —$C(R^{13})_zH_{(3-z)}$;

Z is a divalent linker selected from the group consisting of —$(CH=CH)_a$—, —$(CH\equiv CH)_a$—, —$C(O)$—, —$C(=NOR^{11})$—, —$C(=NNR^{11}R^{12})$—, —O—, —$N(R^{11})$—, —$N(C(O)R^{13})$—, —$S(O)_x$—, a polyether, and a polyamine;

a is 1, 2, 3, or 4;
k is an integer from 1 to 8 inclusive;
m is an integer from 1 to 8 inclusive;
x is 0, 1, or 2;
y is 0, 1, 2, 3, or 4; and
z is 1, 2, or 3.

In certain embodiments, the ligand is a beta diiminate ligand.

In certain embodiments, the catalytic transition metal-ligand complex has one of the following formulae:

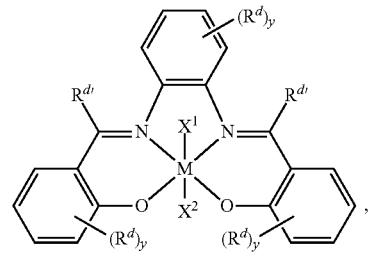

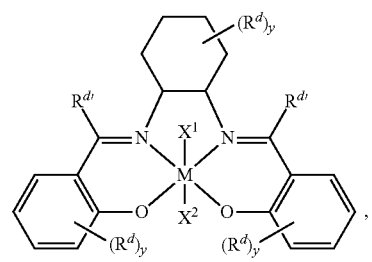

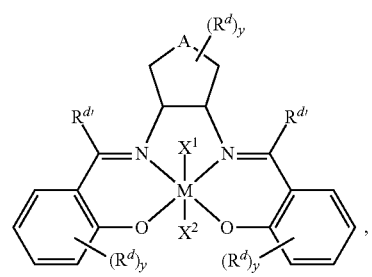

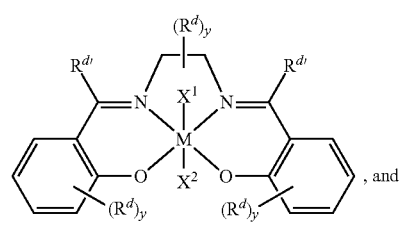

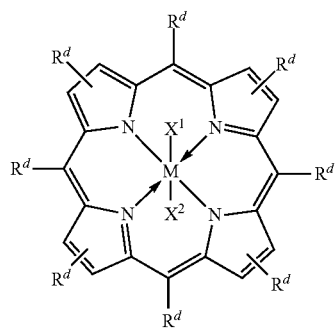

wherein, each of $R^d$, $R^{d'}$, y, $X^1$ and $X^2$ are as defined above and described in classes and subclasses above, and wherein, M is a transition metal.

In certain embodiments, the catalytic transition metal-ligand complex has one of the following formulae:

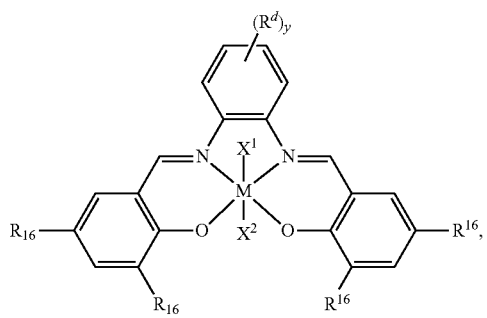

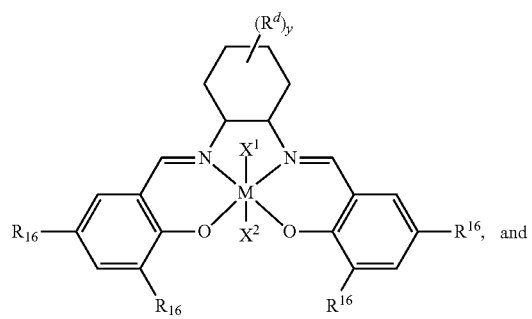

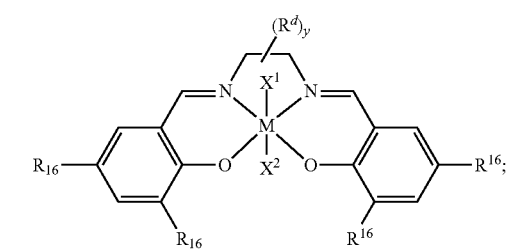

wherein, each of $R^d$, y, $R^{16}$, M, $X^1$ and $X^2$ are as defined above and described in classes and subclasses above.

In certain embodiments, $R^{16}$ is tert-butyl, thus forming a compound of one of the following formulae:

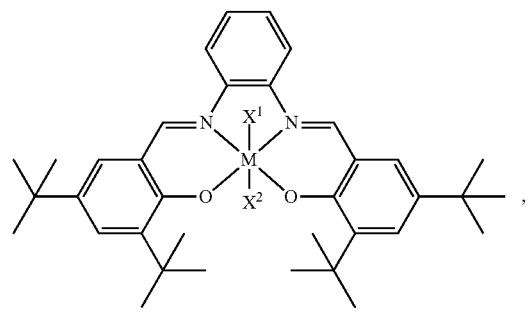

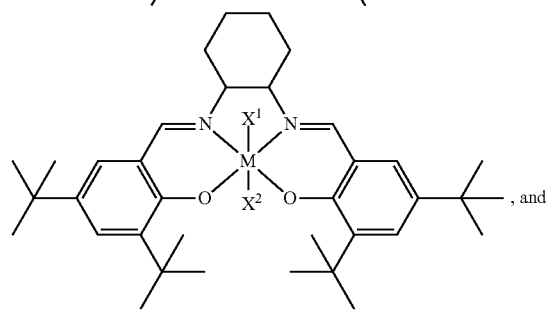

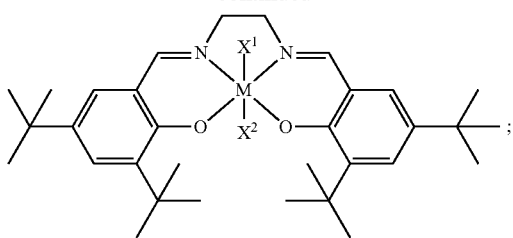

wherein, each of M, $X^1$ and $X^2$ are as defined above and described in classes and subclasses above.

In some embodiments, the metallosalenate complex has a structure selected from the group consisting of compounds VI through XXXVII:

VI

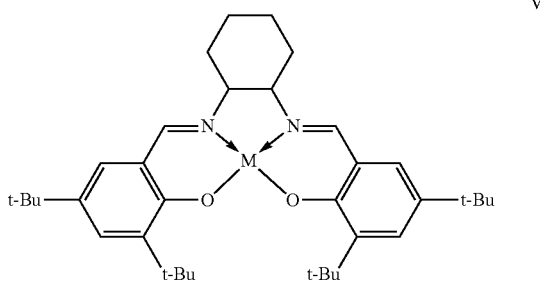

VII

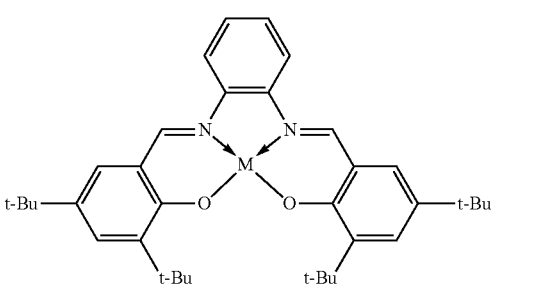

VIII

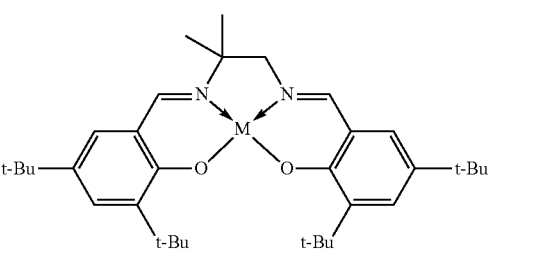

IX

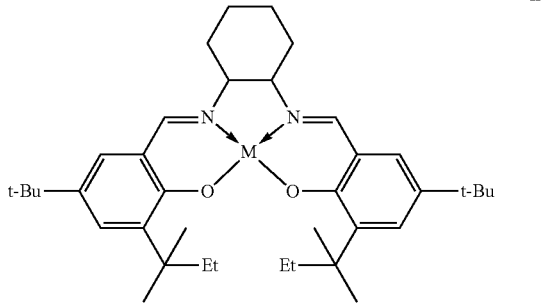

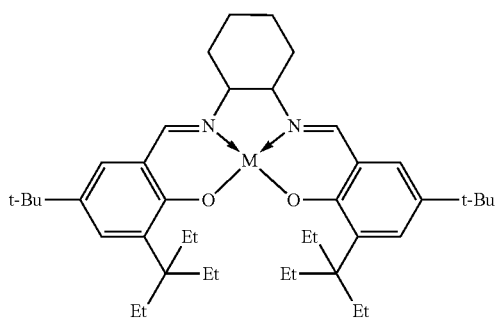
X
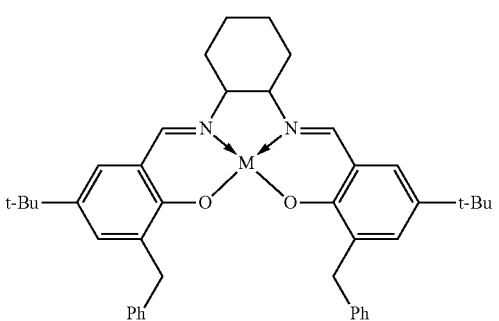
XI
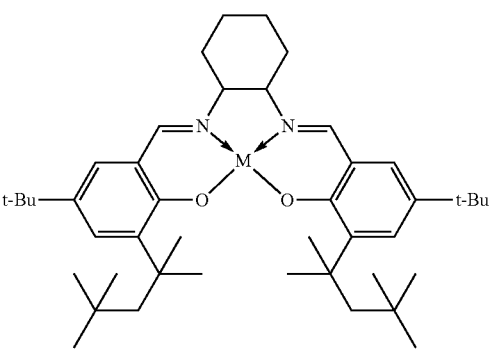
XII
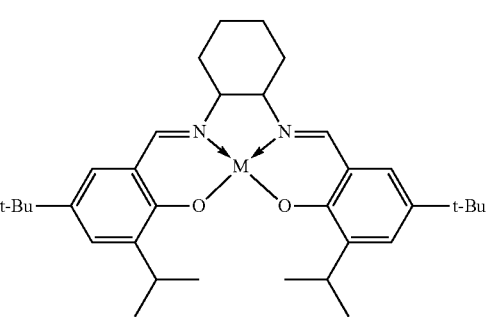
XIII
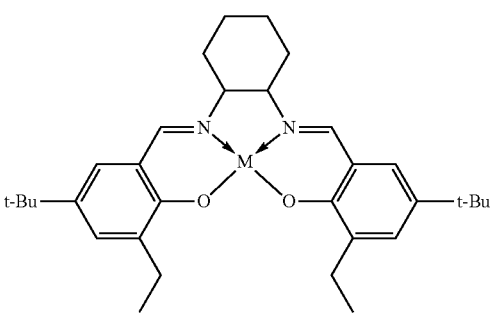
XIV
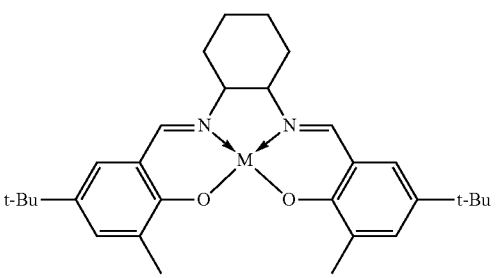
XV
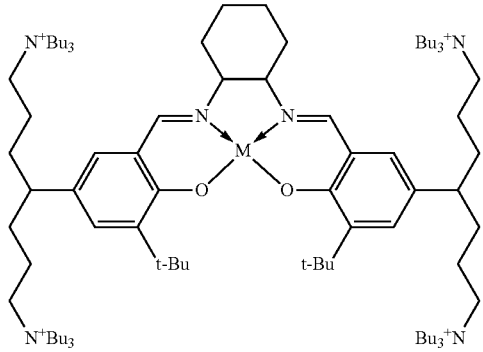
XVI
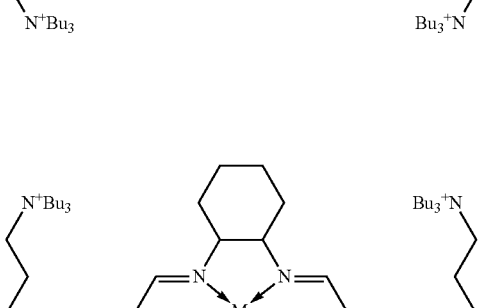
XVII
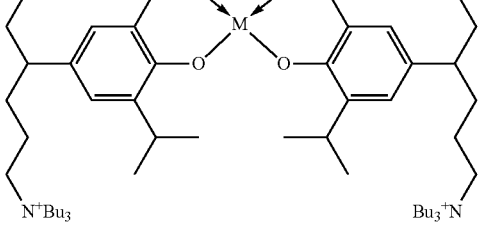
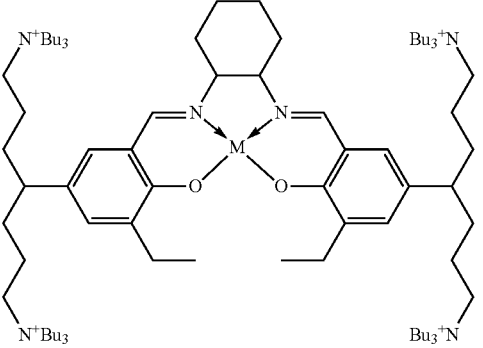
XVIII -continued
XVI
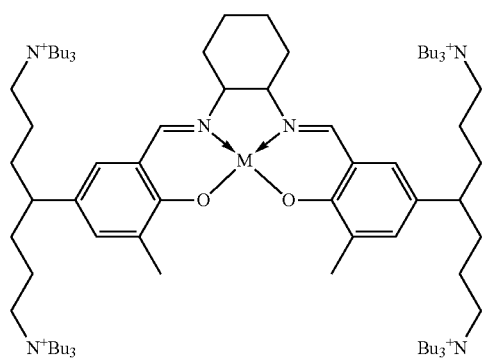
XX
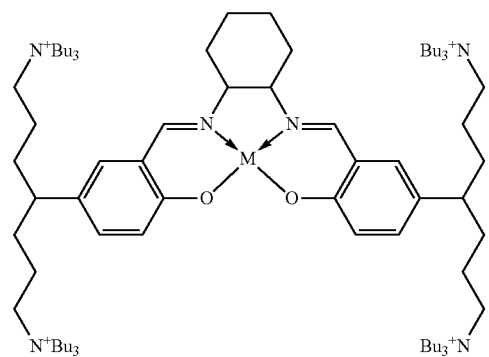
XXI
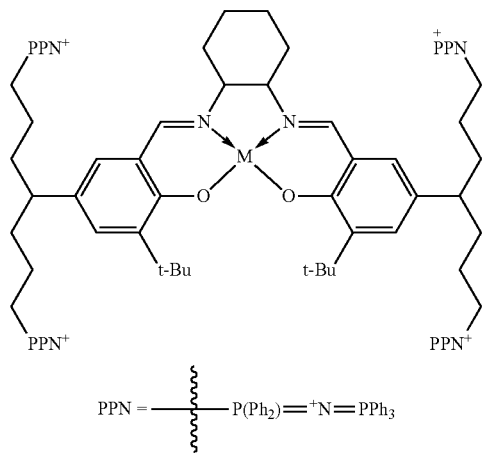
PPN = ─P(Ph₂)=⁺N=PPh₃
XXII
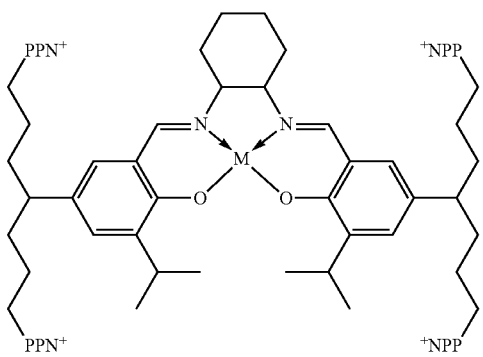
-continued
XXIII
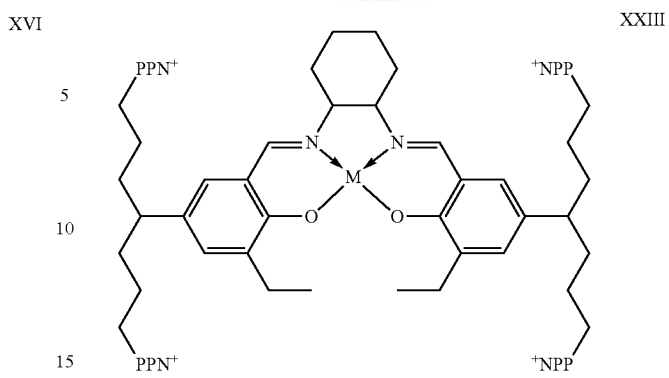
XXIV
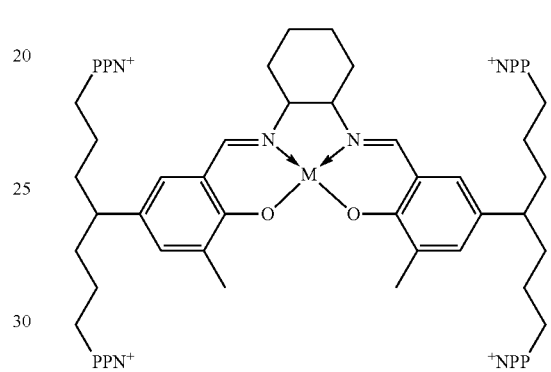
XXV
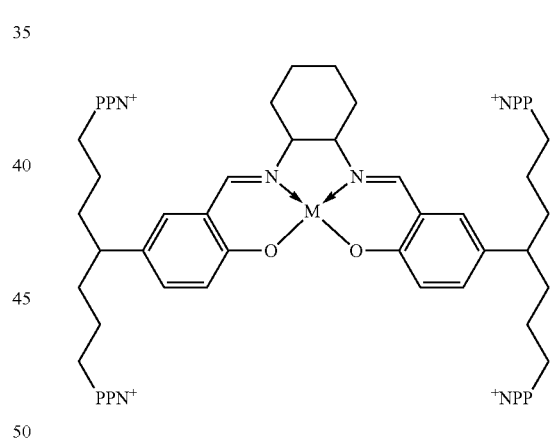
XXVI
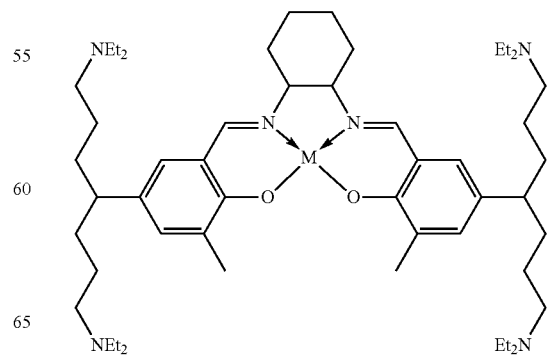

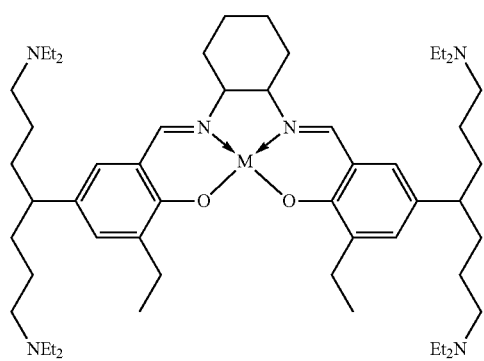
XXVII
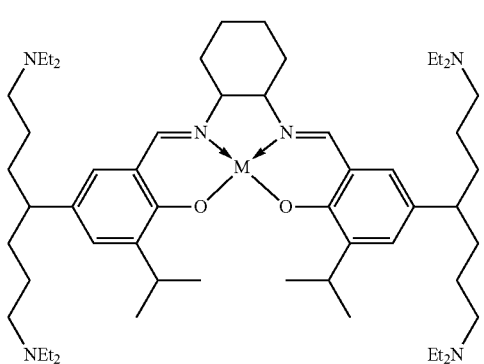
XXVIII
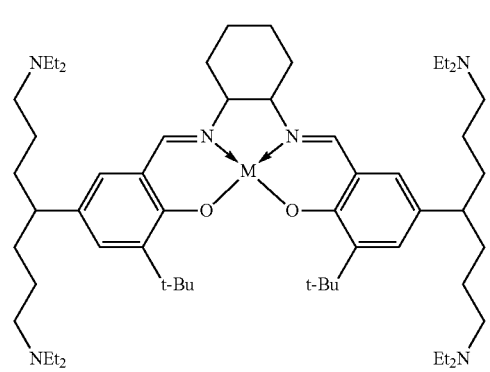
XXIX
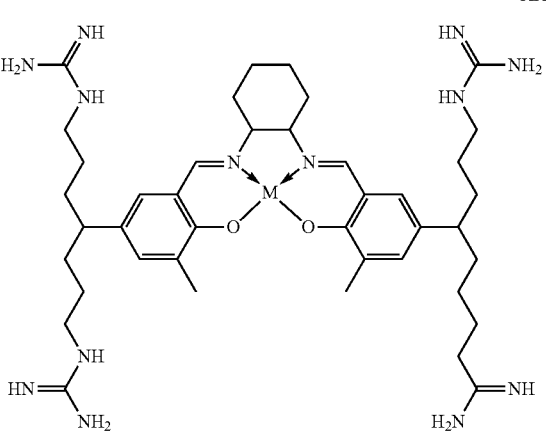
XXX
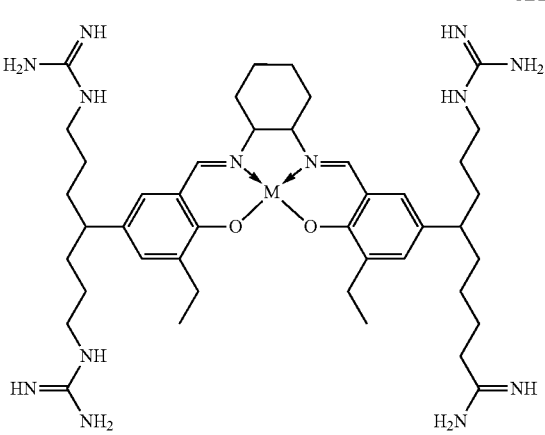
XXXI
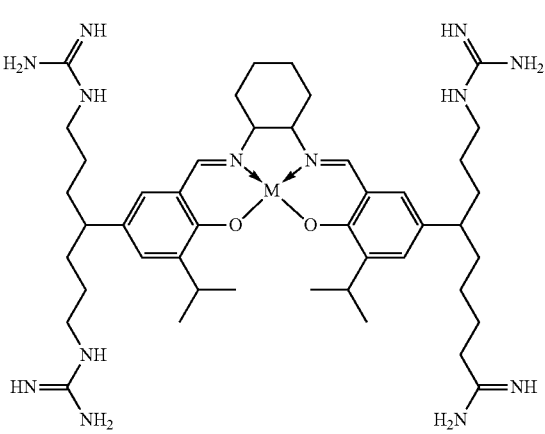
XXXII
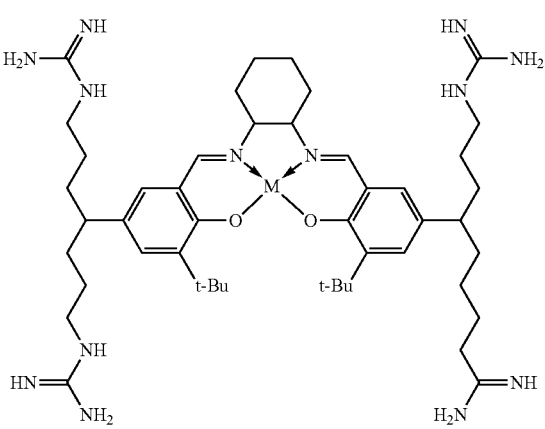
XXXIII

XXXIV

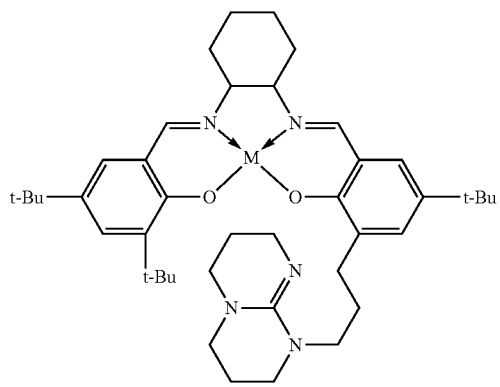

XXXV

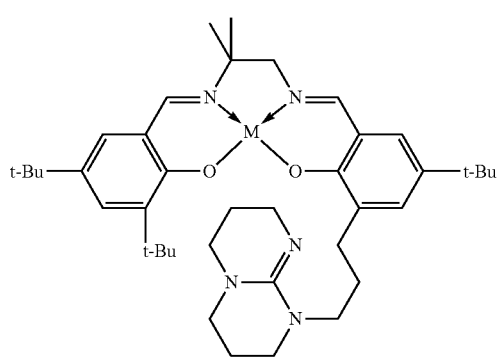

XXXVI

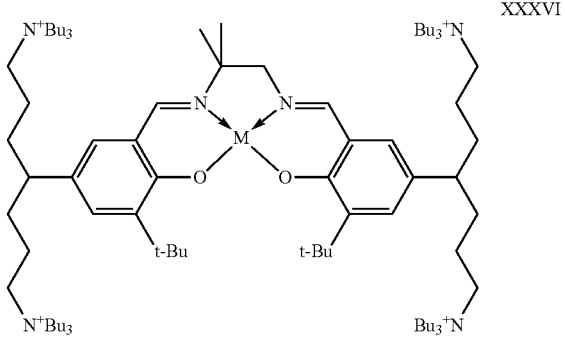

XXXVII

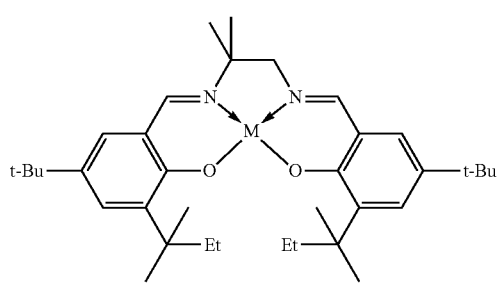

In certain embodiments, one skilled in the art could use any one of the catalytic transition metal-ligand complexes described in co-pending U.S. PCT Application No. PCT/US2009/054773 (described as metal complexes therein). Additional metal complexes suitable for the present invention are described in U.S. Pat. Nos. 7,304,172, 6,870,004, in U.S. Patent Application Publication No.'s US2007/0255039 and US2008/0108499, in PCT application No. PCT/US2009/042926, in PCT Publication Nos. WO2009/102078A1, WO2008150033A1, and WO2008136591A1 and in Chinese Patent Nos. CN 101412809, CN 1887934, and CN 101020747 the entire content of each of which is incorporated herein by reference.

In certain embodiments of the present disclosure, the catalyst includes a co-catalyst. The co-catalyst can be a compound such as an amine a phosphine, a guanidine, an amidine, or an organic salt. In certain embodiments, the co-catalyst is an aromatic amine. In certain other embodiments, the co-catalyst is a nitrogen containing heterocycle. In some embodiments the co-catalyst is a Lewis base. In some embodiments the Lewis base is N-methylimidazole ("N-MeIm"), dimethylaminopyridine ("DMAP") or 1,4-diazabicyclo[2.2.2]octane ("DABCO") triethyl amine, guanidine, and diisopropyl ethyl amine. In those embodiments where the co-catalyst is an organic salt, the salt can be selected from the group including phosphonium salts, ammonium salts, guanidinium, amidinium, azonium, and arsonium salts. In some embodiments, the co-catalyst is a bis(triphenylphosphine)iminium salt ($PPN^+X^-$). In some embodiments, the co-catalyst is bis(triphenylphosphine)iminium chloride ($PPN^+Cl^-$). In some embodiments, the co-catalyst is bis(triphenylphosphine)iminium bromide ($PPN^+Br^-$). In some embodiments the co-catalyst is bis(triphenylphosphine)iminium azide. ($PPN^+N_3^-$). In various aspects, the co-catalyst is tetra-n-butylammonium chloride [$(n\text{-}Bu)_4NCl$], tetra-n-butylammonium bromide [$(n\text{-}Bu)_4NBr$], tetra-n-butylammonium azide [$(n\text{-}Bu)_4NN_3$].

Quenching

In one aspect, the present disclosure provides a method which includes a step of quenching the polymerization reaction by contacting the reaction mixture with an acid containing an anion that is not a polymerization initiator.

In certain embodiments, the quenching step includes any of the methods described in co-pending U.S. Patent application No. 61/097,725, the entirety of which is hereby incorporated herein by reference.

In certain embodiments, the acid contains a non-nucleophilic anion. In certain embodiments, the acid is a sulfonic acid. In certain embodiments, the quench step of the above method comprises adding a sulfonic acid having the formula $R^1SO_3H$, wherein $R^1$ is a radical selected from the group consisting of optionally substituted alkyl, optionally substituted aryl, and optionally substituted heterocyclic. In certain embodiments, $R^1$ is a radical selected from optionally substituted $C_1$-$C_{20}$ alkyl, $C_1$-$C_{20}$ alkenyl, and an optionally substituted phenyl.

In certain embodiments, the sulfonic acid is selected from the group consisting of p-toluene sulfonic acid (commonly called tosic acid or "PTSA"), methane sulfonic acid, ethane sulfonic acid, 1-propane sulfonic acid, trifluoromethyl sulfonic acid, 4-nitrophenyl sulfonic acid, sulfoacetic acid, cumenesulphonic acid, xylene sulfonic acid, 3-amino-1-propanesulfonic acid, 2-(methylamino)ethanesulfonic acid, 2-aminoethanesulfonic acid, 2-sulfanylethanesulfonic acid, 3-hydroxy-1-propanesulfonic acid, benzenesulfonic acid, 3-pyridinesulfonic acid, 2-pyridinesulfonic acid, 4-piperidinesulfonic acid, 2-aminobenzenesulfonic acid, 1-methylpyridinium 3-sulfonate, 1-methyl-2-pyridiniumsulfonate, 4-hydroxybenzenesulfonic acid, cyclohexane sulfonic acid, 4-ethylbenzenesulfonic acid, 2,5-dimethylbenzenesulfonic acid, 4-methylmetanilic acid, 4-amino-3-methylbenzenesulfonic acid, 1-naphthalenesulfonic acid, 2-amino-5-methylbenzenesulfonic acid, and perfluorooctane sulfonic acid.

In certain embodiments, the sulfonic acid is p-toluene sulfonic acid.

In certain embodiments, the quench step of the above method comprises adding a sulfamic acid.

In certain embodiments, the quench step of the above method comprises adding a sulfamic acid having the formula $R^1R^2N\text{—}SO_3H$, wherein $R^1$ and $R^2$ are radicals independently selected from the group consisting of hydrogen, optionally substituted alkyl, optionally substituted aryl, and an optionally substituted heterocyclyl.

In certain embodiments, the quench step of the above method comprises adding a phosphoric acid derivative having at least one acidic hydrogen atom.

In certain embodiments, the phosphoric acid derivative is selected from phosphoric acid, pyrophosphoric acid, triphosphoric acid, an alkyl derivative of phosphoric acid, pyrophosphoric acid, or triphosphoric acid, an aryl derivative of phosphoric acid, pyrophosphoric acid, or triphosphoric acid, and a mixture of any two or more of the above phosphoric acid derivatives.

In certain embodiments, the quenching step of the above method comprises adding a phosphoric acid having the formula:

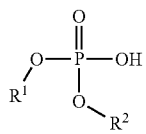

wherein, $R^1$ and $R^2$ are radicals independently selected from hydrogen, a monophosphate group, a diphosphate group, an optionally substituted alkyl, an optionally substituted aryl, an optionally substituted heterocyclic, an ester derivative of a monophosphate group, and an ester derivative of a diphosphate group. In certain embodiments the acid used for quenching in a form including a solid support substrate. In certain embodiments, there is not a separate quenching step, but the quench is performed by the solid phase used to remove the catalyst. This concomitant quench and catalyst removal method is understood to be possible with any of the purification methods disclosed below. In certain embodiments, the epoxide polymer precursors may react with certain acidic ion exchange resins. In such cases, it will be apparent to one having ordinary skill in the art of chemical synthesis, that the screening of various solid phases to find ones compatible with the epoxide in the reaction mixture is desirable and that such screening can be a matter of routine experimentation. Alternatively, in certain embodiments, residual epoxides can be removed from the polymerization mixture prior to undertaking a concomitant quench and purification method. Removal of the residual epoxides can be done by distillation, chemical reaction, adsorption or other methods known to the art.

Polymer Dope

In various aspects, the reactions, methods and procedures described above produce a crude APC product or "polymer dope." The polymer dope may be in a solvent and the mixture may additionally contain reaction byproducts, unreacted reactants, and catalyst, in addition to the APC.

In various aspects, the APC solution ("polymer dope") is composed of one or more organic solvents such as ketones, esters, ethers, nitriles, amides, chlorinated hydrocarbons, aromatic solvents or combinations thereof. In certain embodiments the solvents include, but are not limited to: acetone, methyl ethyl ketone, ethyl acetate, n-propyl acetate, butyl acetate, dimethoxy ethane, t-butyl methyl ether, acetonitrile, tetrahydrofuran, toluene, benzene, chloroform, dichloromethane, DMF, and mixtures of two or more of the above. In one embodiment, the APC solution is a crude reaction mixture containing residual epoxide.

Ion Exchange Purification

In various aspects, organic ion exchange materials generally possess a three dimensional structure, the matrix. In various aspects, functional groups may be attached to the structure, or directly incorporated in the polymeric chains. The matrix may be constructed from linear polymeric chains cross-linked with each other by relatively short links. By way of example, in various aspects, the present disclosure includes the use of ion exchange materials such as sulphonated polystyrene cross-linked with divinylbenzene:

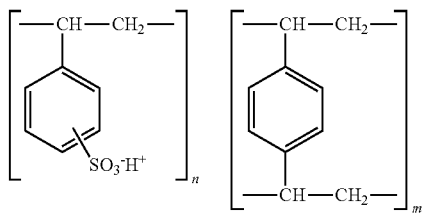

In various embodiments of the present disclosure, the ion exchange materials comprise a silica matrix derivatized with sulfonic acid. In various aspects, the $SO_3H$ can exchange the hydrogen ion for any other cation. The present disclosure is not limited to $SO_3H$ functional groups, as the various matrices and support substrates may carry a wide variety of functional groups, including by not limited to cation exchange, anion exchange, amphoteric, Lewis basic, Lewis acidic and chelating materials. Another ion exchange material, for example, consists of phenol and formaldehyde copolymers.

In various embodiments, the ion exchange matrix may be a cross-linked polymer. In various aspects, properties of ion exchange materials can vary by the degree of cross-linking In the example of polystyrene-divinylbenzene ion exchange material, the divinylbenzene is the cross-linking material, and the percentage of divinylbenzene indicates the degree of cross-linking.

In various aspects, the ion exchange materials may be three dimensional polymer networks. In various aspects, non-cross-linked polymers or hyperlinked polymers may be used as the ion exchange matrix. In various aspects, the functional groups need not be bonded directly to the polymer matrix. Some functional groups can be bound to a polymer, distinct from the matrix forming polymer. The two polymers need not be chemically bonded, but tangled and intertwined with each other to form a contiguous mass.

In various aspects, ion exchange materials may take the form of gels, or gel resins, distributed across a bead, or other support substrate. In various aspects, ion exchange materials may take the form of macroporous resins which have a heterogeneous structure consisting of two phases, a gel region comprised of polymers and macroscopic permanent pores. In various embodiments of the present disclosure, the ion exchange materials comprise macroreticular resins which are additionally macroporous resins in which the gel regions consist of a plurality bead micro-grains. Ion exchange materials may comprise a wide variety of morphologies and forms, including variations in porosity and other surface properties. In various aspects, materials can be formed into, but not limited to beads, pellets, spheres, spheroids, rings, hollow cylinders, blocks, fibers, meshes, membranes, textiles. In various aspects, the particle size may be widely distributed, or may be very narrow, so-called mono-disperse resins.

In various embodiments, ion exchange materials may contain a wide variety of functional groups, either cationic, anionic, amphoteric, Lewis basic, Lewis acidic and chelating materials. In various aspects, the functional groups may be —$SO_3^-$, $PO_3^{2-}$, —COOH, $HPO_2^-$, —$C_6H_4OH$, —SH, —$AsO_3^-$, —$SeO_3^-$. In various aspects, the functions groups may be —$N^+(CH_3)_3$, —$N^+(CH_3)_2C_2H_4OH$, —$N^+(CH_3)_2C_2H_5$, —$P^+(C_4H_9)_3$. In various aspects, the functional groups may be —$SO_3^-H^+$, —$N(CH_3)_2$, —COOH, —$N^+(CH_3)_3OH^-$.

In various aspects the present disclosure comprises exposing solutions containing APCs to ion exchange resins under conditions such that catalyst materials are removed from the polymer solution. After completion of the polymerization reaction, the solution may be treated to remove excess epoxides, propylene oxide, other reaction byproducts, or other unconsumed reactants prior contact with the ion exchange resins. Removal of byproducts, unconsumed reactants and other compounds may be accomplished by evaporation, distillation, extraction, or any other separation technique known to those skilled in the art.

The processing of polymer containing solutions to remove catalysts may be accomplished under a wide variety of conditions. The time and/or temperature may vary, as well as the relative concentrations of ion exchange resins. The process may be a batch process, or a continuous process. The reaction may occur in a single vessel, over multiple vessels, or in a packed column. Additionally, the polymer solution may be pumped through a filter or other pressurized vessel containing ion exchange resin.

The contact time between the polymer solution and the ion exchange resins may be, in various embodiments, at least 0.1, 0.5, 1, 2, 3, 5, 6, 8, 12, 18, 24, 36, 48, or 72 hours. The polymer solution and ion exchange resin mixture may be maintained at a temperature of at least 0, 5, 10, 15, 20, 25, 30, 35, 40, 45, 50, 55, 60, 65, 70, 75, 80, 85, 90, or 95 degrees Celsius. The ion exchange may be performed under a vacuum, or at any pressure up to 3 atmospheres.

Efficacy of polymer clean-up can be measured by UV/Vis absorption using techniques standard in the art. In various embodiments the absorbance of across the UV/Vis spectrum of wavelengths will be measured. In various embodiments the absorbance at 400 nm will be considered, and in various aspects the absorbance at 265 nm. In various embodiments combinations of absorbances at specific wavelengths will be considered. The polymer solution absorbance at 400 nm may be reduced by 99, 97, 95, 90, 85, 80, 75, 70, 65, 60, 55, 50, 45, 40, 35, 30, 25, 20, 15, 10 or 5%. The total absorbance at 400 nm may be less than 1, 0.9, 0.8, 0.7, 0.6, 0.5, 0.4, 0.3, 0.2, or 0.1 after ion exchange processing.

Efficacy of polymer clean-up can be assessed by metal concentration analysis using techniques standard in the art. Suitable techniques include, but are not limited to: atomic absorption spectroscopy (AA), inductively coupled plasma atomic emission spectroscopy (ICP OES), and ultraviolet visible absorption spectroscopy, (UV-Vis). In various embodiments the metals content of the polymer solution can be reduced by 99, 97, 95, 90, 85, 80, 75, 70, 65, 60, 55, 50, 45, 40, 35, 30, 25, 20, 15, 10 or 5%. The metal concentration of the polymer may be less than 10, 1, 0.9, 0.8, 0.7, 0.6, 0.5, 0.4, 0.3, 0.2, or 0.1 parts per million (ppm) after ion exchange processing.

Without being bound to a particular theory, the removal of the catalyst may be accomplished by any of a variety of chemical interactions including, but not limited to, adsorption of metal to the resin, absorption of metal to the resin, absorption of the ligand to the resin, adsorption of the ligand to the resin, resin mediated conversion of the catalyst to other species, or a combination of two or more of the above.

In various embodiments, the contacting step between the ion exchange materials and the polymer solution may remove the co-catalyst from the solution. Without being bound to a particular theory, the removal of the co-catalyst may be accomplished by any of a variety of chemical interactions including, but not limited to, adsorption to the ion exchange material, absorption to the ion exchange material or resin mediated conversion of the catalyst to other species.

In certain embodiments, methods of the invention further include a step of recovering the catalyst or catalyst components from the ion exchange material or resin. This may be done by flushing the ion exchange material with a solution containing a high concentration of an ion capable of displacing the catalyst from the resin. In certain embodiments where the catalyst contains organic cationic cocatalyst moieties tethered to the ligand of the metal complex, the step of removing the catalyst from the resin includes flushing the ion exchange material with a solution of $X^-$, where X is as defined hereinabove. In certain embodiments, the ion exchange material is flushed with a solution of an organic acid such as acetic acid or trifluoroacetic acid, or a metal salt of such an acid. In another embodiment, the ion exchange material is flushed with a solution of a nitro phenol compound. In certain embodiments of this aspect of the invention, the catalyst recovered from the ion exchange material is associated with a counterion X, and is suitable for direct use in the copolymerization of epoxides and carbon dioxide.

In some embodiments, methods of the invention include a step of contacting the polymer solution with a second solid phase. In some embodiments, the second solid phase comprises polymers. In some embodiments, the polymers of the second solid phase may be polystyrene, divinylbenzene, polyvinylpyridine, polymethylmethacrylate, polyolefins, polytetrafluoroethylene, and derivatives or combinations thereof. In some embodiments, the second solid phase comprises an inorganic solid. In certain embodiments, the inorganic solid phase may be silica, alumina, zirconia, molecular sieves, zeolites, clays or derivatives or combinations thereof. In some embodiments, the second solid phase comprises an acid-absorbing resin. In certain embodiments, an acid absorbing resin may be a polymeric resin containing an immobilized base. In certain embodiments, the second solid phase is an ion exchange resin as described above and herein. In certain embodiments, the ion exchange resin is an anion exchange resin.

Exemplary ion exchange resins include, but are not limited to, quaternary amine resins or "Q-resins" (e.g., Q-Sepharose®, QAE Sephadex®); diethylaminoethane (DEAE) resins (e.g., DEAE-Trisacryl®, DEAE Sepharose®, benzoylated naphthoylated DEAE, diethylaminoethyl Sephacel®); Amberjet® resins; Amberlyst® resins; Amberlite® resins (e.g., Amberlite® IRA-67, Amberlite® strongly basic, Amberlite® weakly basic), cholestyramine resin, ProPac® resins (e.g., ProPac® SAX-10, ProPac® WAX-10, ProPac® WCX-10); TSK-GEL® resins (e.g., TSKgel DEAE-NPR; TSKgel DEAE-5PW); and Acclaim® resins. In certain embodiments, the ion exchange resin is a Dowex® ion exchange resin (e.g., Dowex M-43 ion exchange resin).

The processing of the polymer solution with a second solid phase may be accomplished under a wide variety of conditions. The time and/or temperature and/or the identity of the second solid phase may vary. In certain embodiments, the second solid phase is an ion exchange resin, the relative concentrations of which may vary. The process may be a batch process, or a continuous process.

In some embodiments, the contact time between the polymer solution and the second solid phase may be at least 0.1, 0.5, 1, 2, 3, 5, 6, 8, 12, 18, 24, 36, 48, or 72 hours. In certain embodiments, the polymer solution and ion exchange resin mixture may be maintained at a temperature of at least 0, 5, 10, 15, 20, 25, 30, 35, 40, 45, 50, 55, 60, 65, 70, 75, 80, 85, 90, or 95 degrees Celsius. In certain embodiments, the ion exchange may be performed under a vacuum, or at any pressure up to 3 atmospheres.

Typical mobile phases for anionic exchange chromatography include relatively polar solutions, such as water and polar organic solvents. Thus, in certain embodiments, the mobile phase comprises about 0%, 1%, 2%, 4%, 6%, 8%, 10%, 12%, 14%, 16%, 18%, 20%, 25%, 30%, 35%, 40%, 45%, 50%, 55%, 60%, 65%, 70%, 75%, 80%, 85%, 90%, 95%, or about 100% acetone. In certain embodiments, the mobile phase comprises between about 1% to about 100%, about 5% to about 95%, about 10% to about 90%, about 20% to about 80%, about 30% to about 70%, or about 40% to about 60% acetone at any given time during the course of the process. In certain embodiments, the mobile phase is buffered. In certain embodiments, the mobile phase is not buffered.

In some embodiments, the present invention provides a method of purifying a product of an aliphatic polycarbonate polymerization reaction, the method comprising steps of:

1. contacting the product of the polymerization reaction with a first solid phase comprising an acidic ion exchanger; and 2. subsequently contacting the product of the polymerization reaction with a second solid phase comprising a basic ion exchanger.

EXAMPLES

Example 1

Kinetics of DOWEX™ MARATHON™ MSC Cleanup in Vials

Background:

This experiment was conducted to better understand the rate at which the DOWEX™ would clean up a solution of PPC reactor dope. The dope was prepared by first running the standard polymerization, then quenching with a solution of p-toluene sulfonic acid in propyl acetate. Then, the excess propylene oxide was removed via rotory evaporation. The starting material was measured to be approximately 10 wt % PPC, 90 wt % propyl acetate, and contained catalyst at a concentration of $1.3 \times 10^{-4}$ mmol catalyst per gram of dope. The solution was a medium orange color.

Procedure:

A. Three jars were prepared, each containing 70 g of the starting dope material. Then different amounts of DOWEX™ MARATHON™ MSC (weighed dry, then pre-wetted with propyl acetate) were added to each jar. The resultant DOWEX™ loadings were 50, 100, and 200 grams of DOWEX™ per mmol of catalyst.

B. Jars were agitated on a shaker table at 200 rpm, and aliquots removed over time for UV/Vis analysis. Aliquots were removed with a Pasteur pipette, and care was taken to exclude the resin beads from the samples.

Results:

TABLE 1

| 50 g Dowex/mmol | | | 100 g Dowex/mmol | | | 200 g Dowex/mmol | | |
|---|---|---|---|---|---|---|---|---|
| t, min | $A_{400}$ | A/Ao | t, min | $A_{400}$ | A/Ao | t, min | $A_{400}$ | A/Ao |
| 0 | 0.942 | 1.000 | 0 | 0.944 | 1.000 | 0 | 0.941 | 1.000 |
| 1 | 0.879 | 0.933 | 1 | 0.798 | 0.845 | 1 | 0.661 | 0.702 |
| 3 | 0.837 | 0.889 | 3 | 0.709 | 0.751 | 3 | 0.443 | 0.471 |
| 10 | 0.789 | 0.838 | 10 | 0.563 | 0.596 | 10 | 0.151 | 0.160 |
| 30 | 0.706 | 0.749 | 30 | 0.31 | 0.328 | 30 | 0.044 | 0.047 |
| 60 | 0.653 | 0.693 | 60 | 0.179 | 0.190 | 60 | 0.013 | 0.014 |
| 120 | 0.425 | 0.451 | 90 | 0.085 | 0.090 | 120 | 0.013 | 0.014 |
| | | | 150 | 0.042 | 0.044 | | | |

Figure 1:
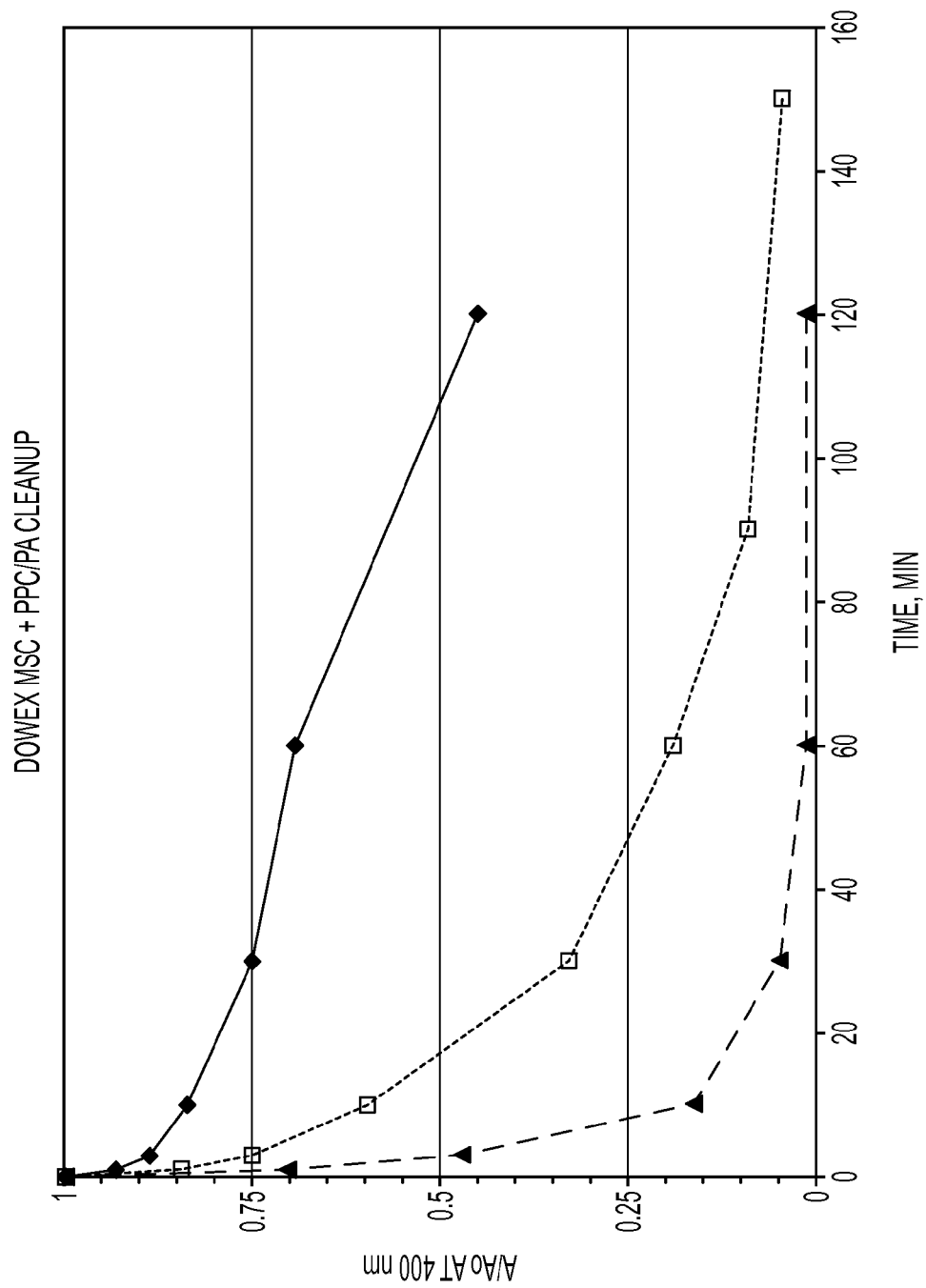
FIG. 1 depicts ratios of absorbance of 400 nm light of PPC treated with different concentrations of ion exchange resin.

The results of this experiment demonstrates the effect of the DOWEX™ loading (relative to catalyst) on the rate at which a given solution becomes colorless. In general, with heavier loading of DOWEX™, a faster and more complete decolorization of the solution can result. (See FIG. 1)

Example 2

DOWEX™ Clean Up in a Packed Bed (PPC)

Background:

In various commercial embodiments a packed bed is utilized for solid-liquid mass transfer operations. The purpose of this experiment was to test the efficacy of DOWEX™ in a laboratory scale packed bed column.

Procedure:

A. The starting material was a propyl acetate-PPC dope (10 wt %) containing catalyst at $1.3 \times 10^{-4}$ mmol catalyst per gram of dope. The mass of the solution to start was 780 grams.

B. A packed bed column was prepared on the basis of 100 g DOWEX™ per mmol of catalyst. Therefore, 10 grams of dry DOWEX™ MARATHON™ MSC were slurried in propyl acetate and added to the top of a glass column fitted with fitted, threaded end fittings. The column was 1.5 cm in diameter. The height of the bed was 10 cm. The estimated liquid holdup in the bed of DOWEX™ was 5 mL.

C. The polymer dope solution was pumped in a recirculating loop from bottle of dope, through the packed bed column, and returning to the bottle at a rate of about 16 mL/min. The bottle was constantly stirred with a magnetic stir bar.

D. Samples were withdrawn from the column inlet (i.e., this is the same as sampling the dope in the bottle) over time.

Results:

From t=0 to 4 hours, the solution gradually changed color from orange to yellow, to a light pale yellow/green, to a clear, colorless solution.

In various embodiments, the use of DOWEX™ resin beads in a packed bed column is a viable way in which to accomplish catalyst removal and subsequent decolorization of the PPC polymer dope.

Example 3

DOWEX™ Clean Up in a Packed Bed (PPC Polyol)

Background:

The purpose of this experiment is to determine the viability of a packed bed operation in a different polymer and catalyst system.

Procedure:

A. The starting material was PPC polyol polymer in ethyl acetate dope (40 wt % polymer) containing catalyst at 1.6× $10^{-3}$ mmol catalyst per gram of dope. The mass of the solution to start was 3500 grams.

B. A packed bed column was prepared on the basis of 100 g DOWEX™ per mmol of catalyst. Therefore, 600 grams of dry DOWEX™ MARATHON™ MSC were slurried in ethyl acetate and loaded into a 2" i.d. glass column. The height of the bed was 16.5 inches. The estimated liquid holdup in the bed of DOWEX™ was 330 mL.

C. The polymer dope solution was pumped in a recirculating loop from the 2-gallon reactor pot, through the packed bed column, and returning to the pot at a rate of about 85 mL/min. The pot was stirred continuously.

D. Samples were withdrawn from the column inlet (i.e., this is the same as sampling the dope in the pot) over time.

Figure 2:
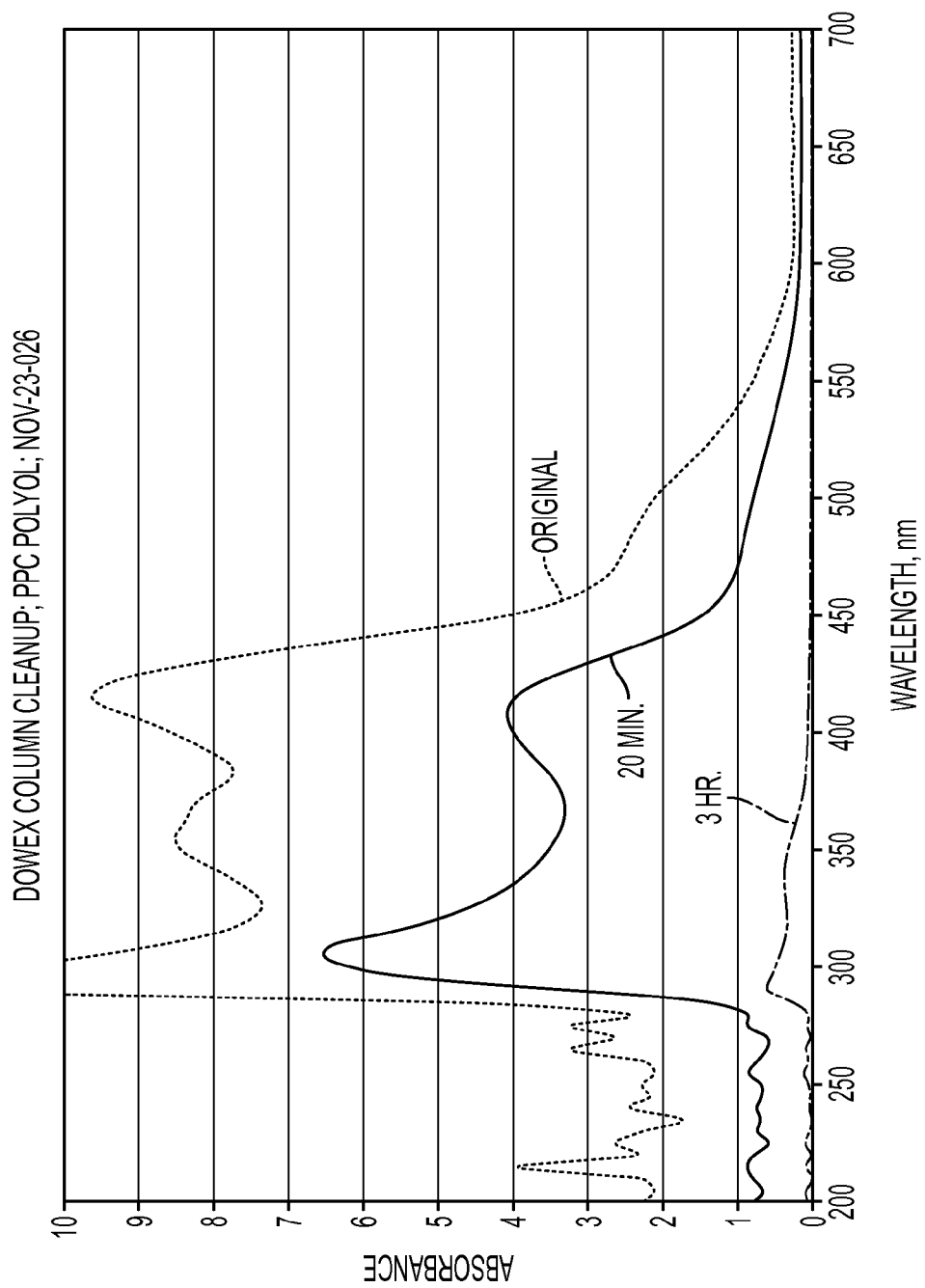
FIG. 2 depicts UV/Vis absorbance curves of PPC polyol solution circulated through packed ion exchange column. The curves show UV/Vis absorbance after 20 minutes, and 3 hours of recirculation as well as initial absorbance.

Results:

From t=0 to 4 hours, the solution gradually changed color from orange to yellow, to a light pale yellow/green, to a very clear, colorless solution. Samples were taken at t=0, t=20 min, and t=3 hours and analyzed via UV/Vis (see FIG. 2).

The use of DOWEX™ resin beads in a packed bed column can be a viable way to remove catalyst and decolorize PPC polyol dope. Recirculation through a packed bed column can remove catalyst and color to reduce UV/vis absorption by at least 90%.

Example 4

Acetic Acid Quenched PPC Solution Treated with DOWEX™ MARATHON™ MSC Resin

Figure 3:
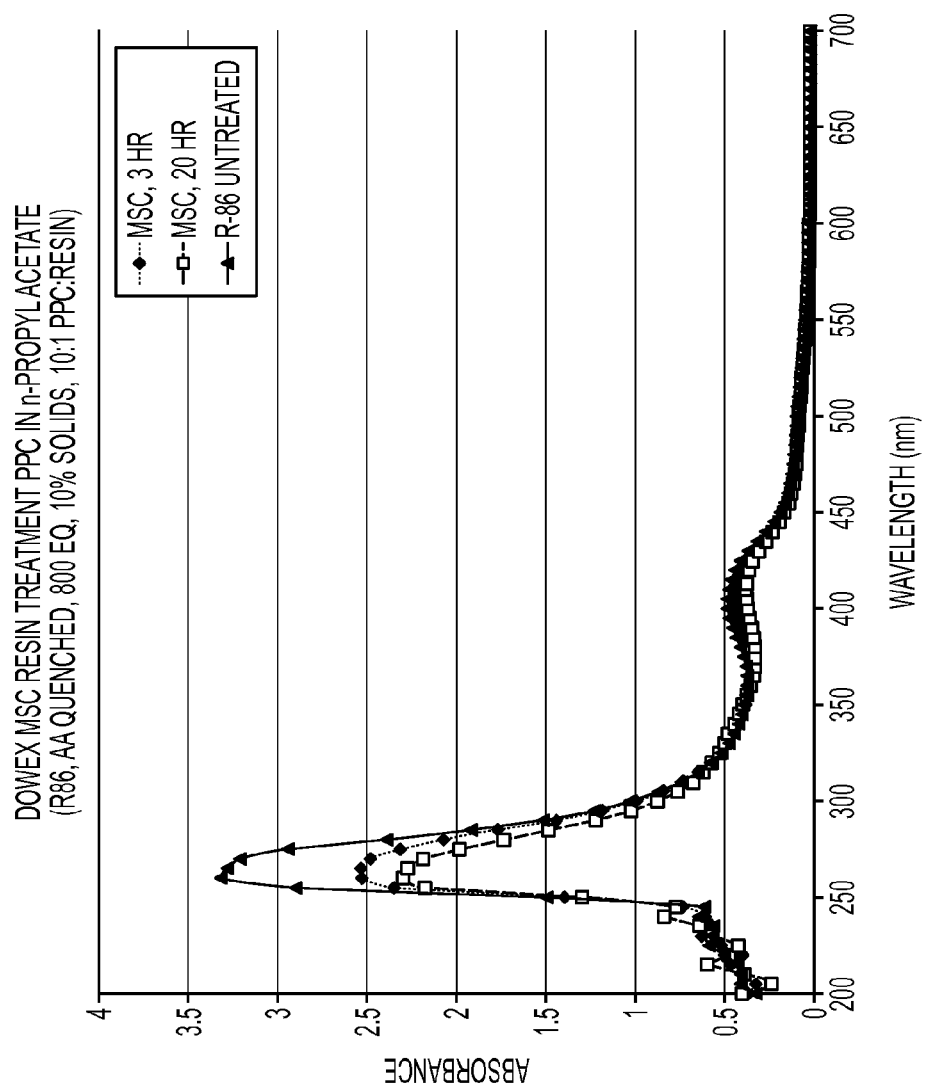
FIG. 3 depicts UV/Vis absorption curves of PPC solution after treatment with a strong acid cation ion exchange resin, DOWEX™ MARATHON™ MSC (available from Dow Chemical Corp. as of August 2008, see product information form no. 177-01786-0707). For the PPC solution, the polymerization was quenched with 800 mol. equivalents of acetic acid; treatment used a 10:1 ratio of PPC solution to resin.

The purpose of this experiment is to establish the potential viability of polymer dope cleanup utilizing DOWEX™ MARATHON™ MSC resin for an acetic acid quenched polymer dope. To a 50 ml vial was added 29.77 g of PPC solution 10% solids in n-propyl acetate ('Run 86' Mn=221456, Mw=293000, PDI=1.322, quenched with 800 molar equivalents of acetic acid and the unreacted propylene oxide was removed by vacuum stripping.) Also added to the vial was 0.297 g of DOWEX™ MARATHON™ MSC resin. The vial was placed on an orbital shaker at 200 RPM. After 20 hours a UV-VIS scan of the PPC solution was done in a quartz cuvette. The absorbance at 265 nm was 2.5358 for the treated sample and 3.29 for the PPC solution before treatment. The absorbance at 400 nm was 0.4238 for the treated sample and 0.4837 for the PPC solution before treatment (see FIG. 3).

Figure 4:
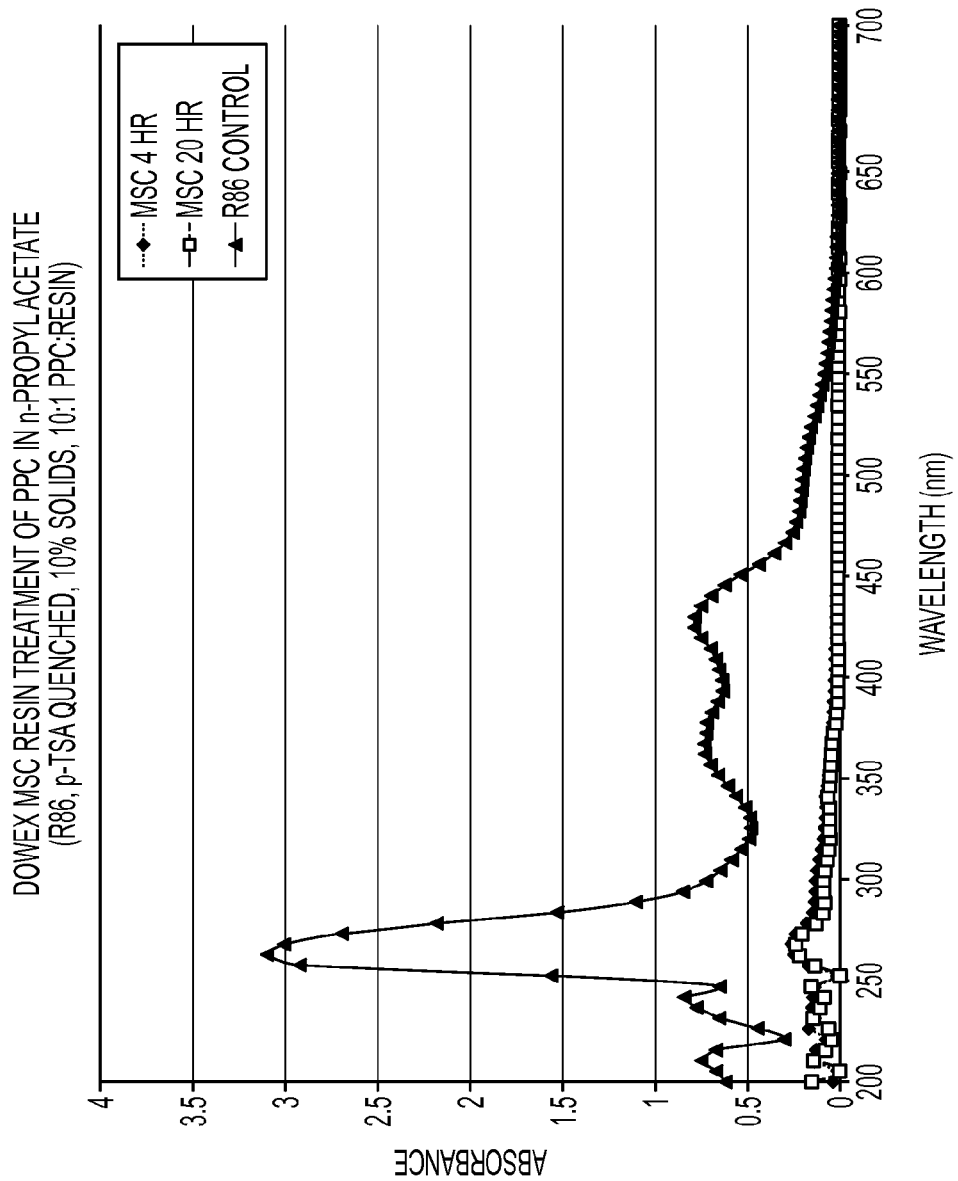
FIG. 4 depicts UV/Vis absorption curves of PPC solution after treatment with a strong acid cation ion exchange resin, DOWEX™ MARATHON™ MSC. For the PPC solution, the polymerization was quenched with para-toluene sulfonic acid (commonly called tosic acid, or pTSA); treatment used a 10:1 ratio of PPC solution to resin.

Example 5 p-Toluene Sulfonic Acid Quenched PPC Solution Treated with DOWEX™ MARATHON™ MSC Resin The purpose of this experiment is to establish the potential viability of polymer dope cleanup utilizing DOWEX™ MARATHON™ MSC resin for a p-toluene sulfonic acid quenched polymer dope. To a 50 ml vial added 28.2546 g of PPC solution 10% solids in n-propyl acetate ('Run 86' Mn=221456, Mw=293000, PDI=1.322. This run was quenched with 1 molar equivalent of p-toluene sulfonic acid and the unreacted propylene oxide was removed by vacuum stripping.) Also added to the vial was 0.2823 g of DOWEX™ MARATHON™ MSC resin. The vial was placed on an orbital shaker at 200 RPM. After 20 hours a UV-VIS scan of the PPC solution was done in a quartz cuvette. The absorbance at 265 nm was 0.2552 for the treated sample and 3.00 for the PPC solution before treatment. The absorbance at 400 nm was 0.0207 for the treated sample and 0.6699 for the PPC solution before treatment (see FIG. 4).

Example 6

Figure 5:
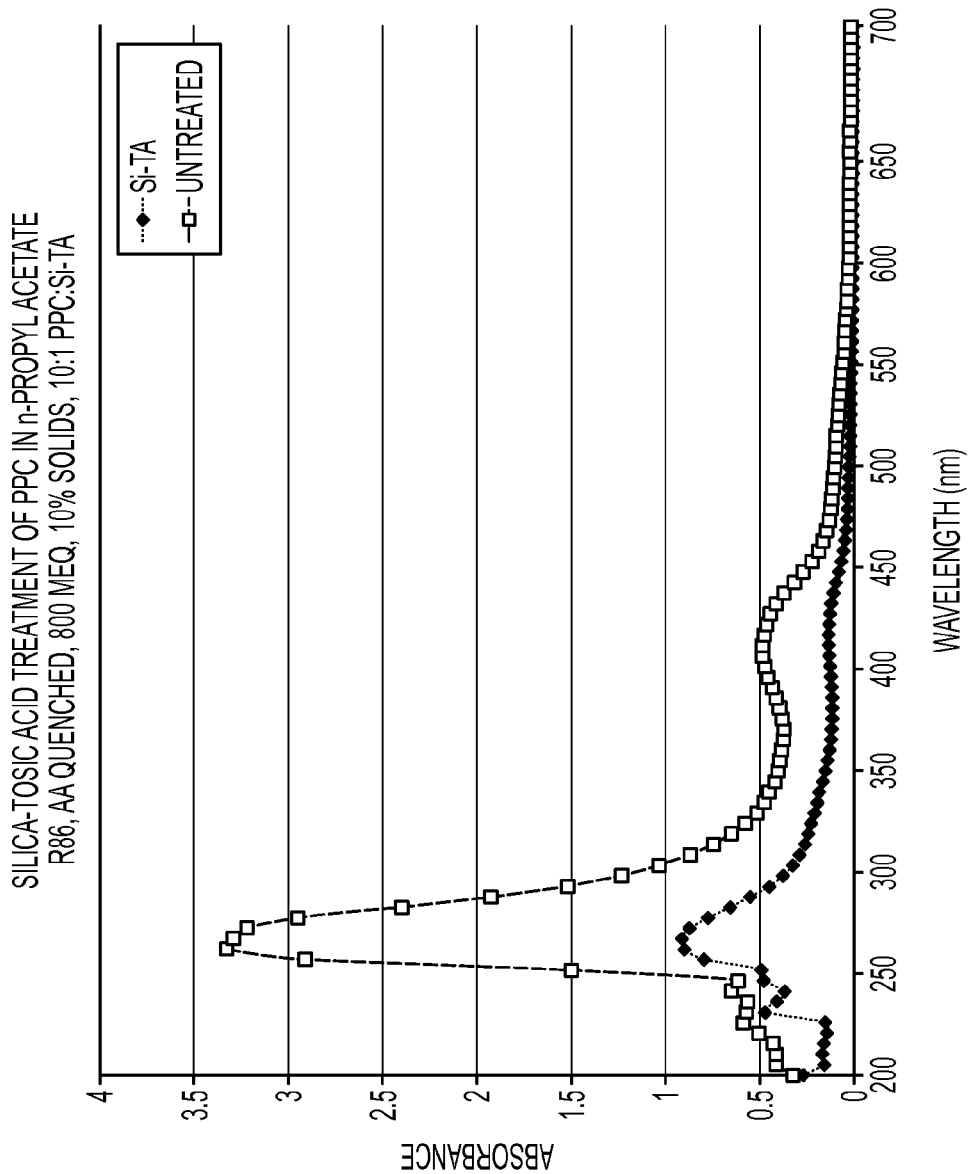
FIG. 5 depicts UV/Vis absorption curves of PPC solution after treatment with silica-bound tosic acid. For the PPC solution, the polymerization was quenched with 800 mol. equivalents of acetic acid; treatment used a 10:1 ratio of PPC solution to resin.

Acetic Acid Quenched PPC Solution Treated with Tosic Acid Derivatized Silica Gel The purpose of this experiment is to establish the potential viability of polymer dope cleanup utilizing p-toluene sulfonic acid derivatized silica gel resin for an acetic acid quenched PPC polymer dope. To a 50 ml vial was added 27.6 g of PPC solution 10% solids in n-propyl acetate ('Run 86' Mn=221456, Mw=293000, PDI=1.322. This run was quenched with 800 molar equivalents of acetic acid and the unreacted propylene oxide was removed by vacuum stripping.). Next, 0.2744 g of Si-Tosic Acid derivatized silica (Silicycle Chemical Division, SCX 40-63 um particle size, 0.59 mmol/g functionalized) was added and the vial was placed on an orbital shaker at 200 RPM. After 20 hours, 5 ml of the solution was filtered through a 0.45 micron Pall syringe filter and a UV-VIS scan of the PPC solution was measured in a quartz cuvette. The absorbance at 265 nm was 0.9136 for the treated sample and 3.29 for the PPC solution before treatment. The absorbance at 400 nm was 0.1311 for the treated sample and 0.4837 for the PPC solution before treatment (see FIG. 5).

Figure 6:
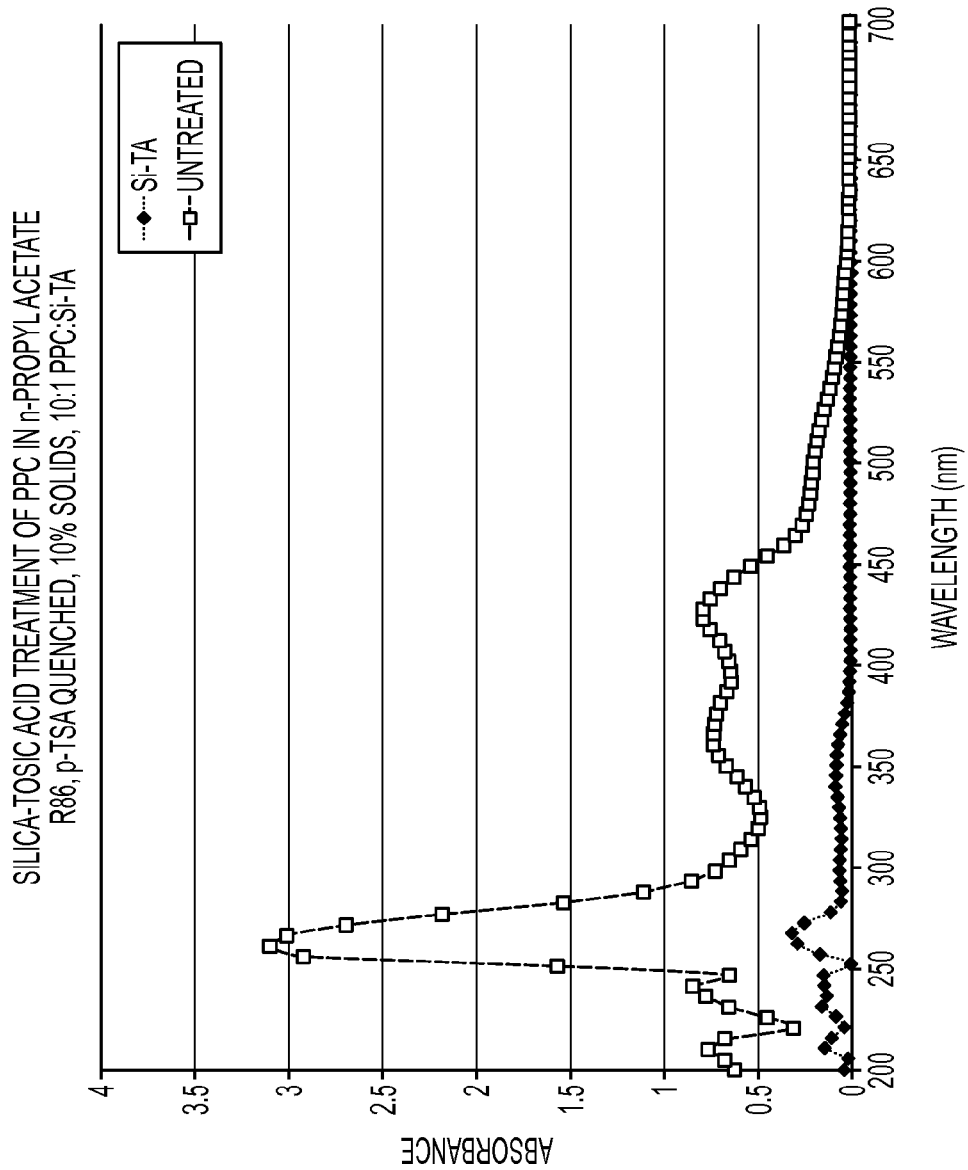
FIG. 6 depicts UV/Vis absorption curves of PPC solution after treatment with silica-bound tosic acid. For the PPC solution, the polymerization was quenched with tosic acid; treatment used a 10:1 ratio of PPC solution to resin.
Figure 7:
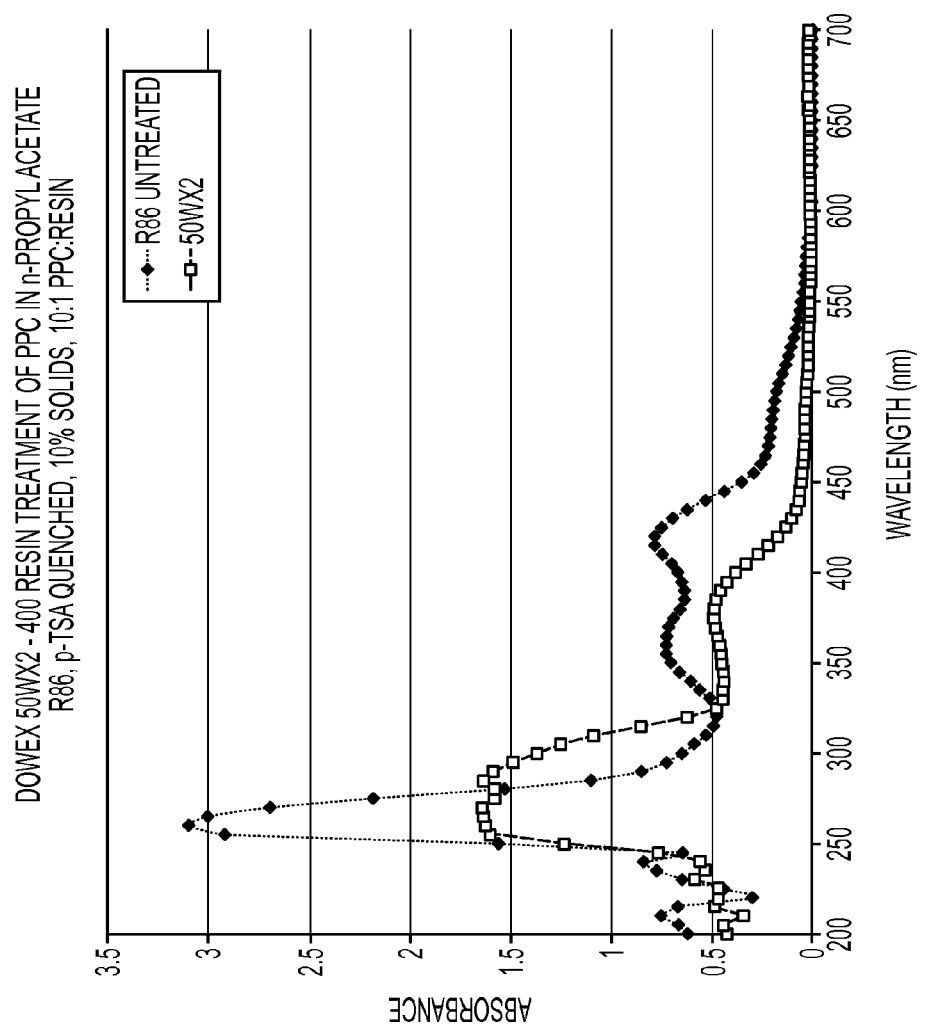
FIG. 7 depicts UV/Vis absorption curves of PPC solution after treatment with a strong acid cation ion exchange resin, DOWEX™ 50WX2-400 (available from Dow Chemical Corp. as of August 2008, see product information form no. 177-01509-904). For the PPC solution, the polymerization was quenched with tosic acid; treatment used a 10:1 ratio of PPC solution to resin.
Figure 8:
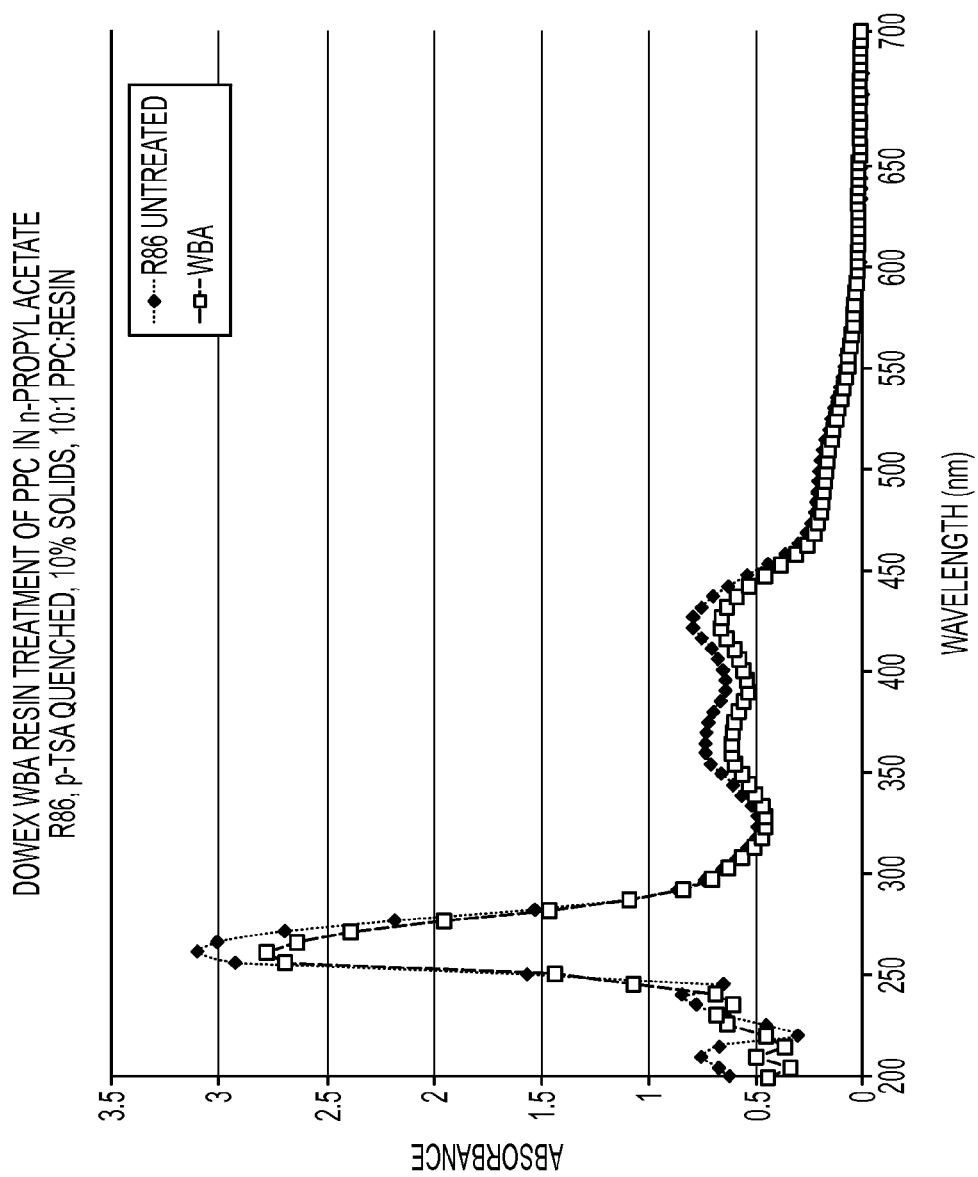
FIG. 8 depicts UV/Vis absorption curves of PPC solution after treatment with a strong acid cation ion exchange resin, DOWEX™ MARATHON™ WBA (available from Dow Chemical Corp. as of August 2008, see product information form no. 177-01592-104). For the PPC solution, the polymerization was quenched with tosic acid; treatment used a 10:1 ratio of PPC solution to resin.
Figure 9:
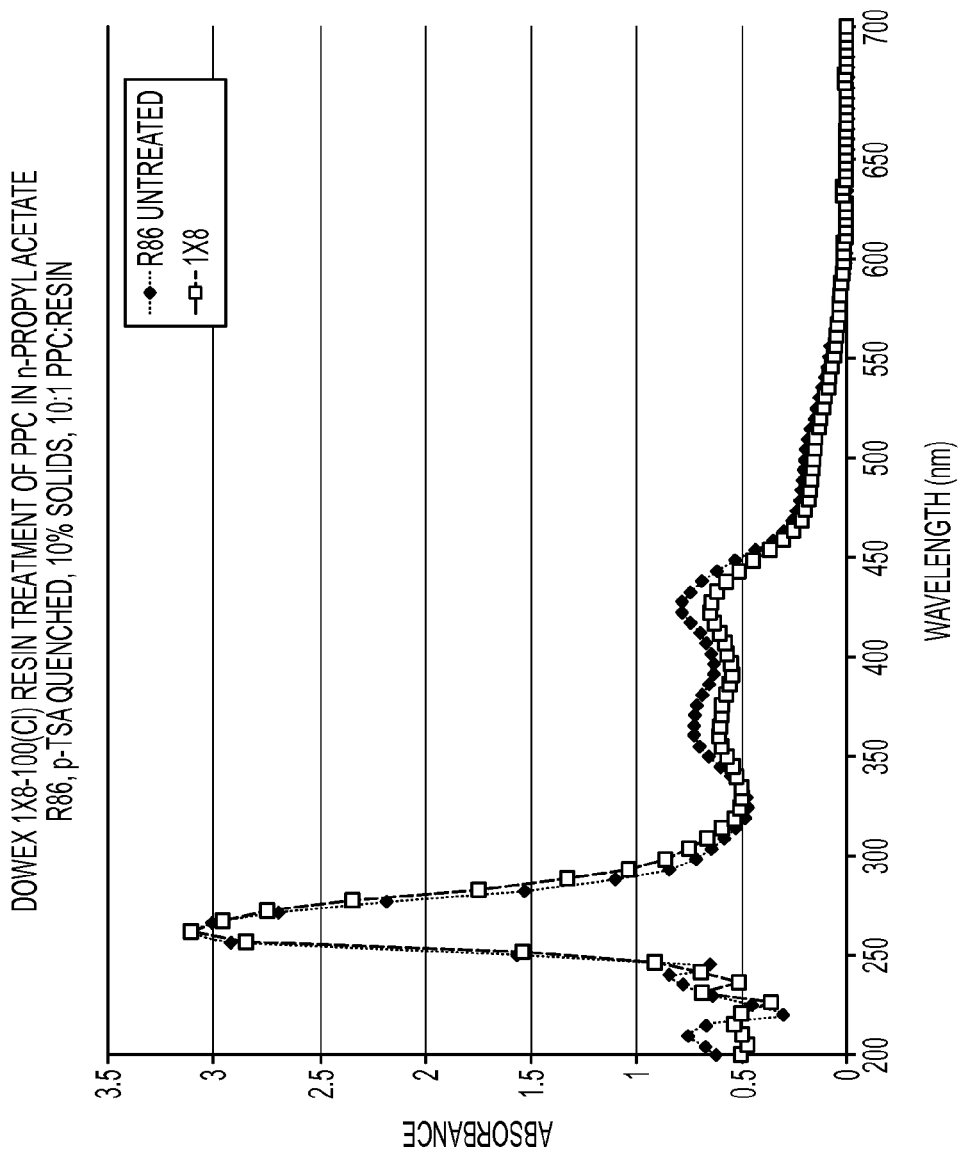
FIG. 9 depicts UV/Vis absorption curves of PPC solution after treatment with a strong acid cation ion exchange resin, DOWEX™ 1X8-100(Cl) (available from Dow Chemical Corp. as of August 2008, see product information form no. 177-01509-904). For the PPC solution, the polymerization was quenched with tosic acid; treatment used a 10:1 ratio of PPC solution to resin.
Figure 10:
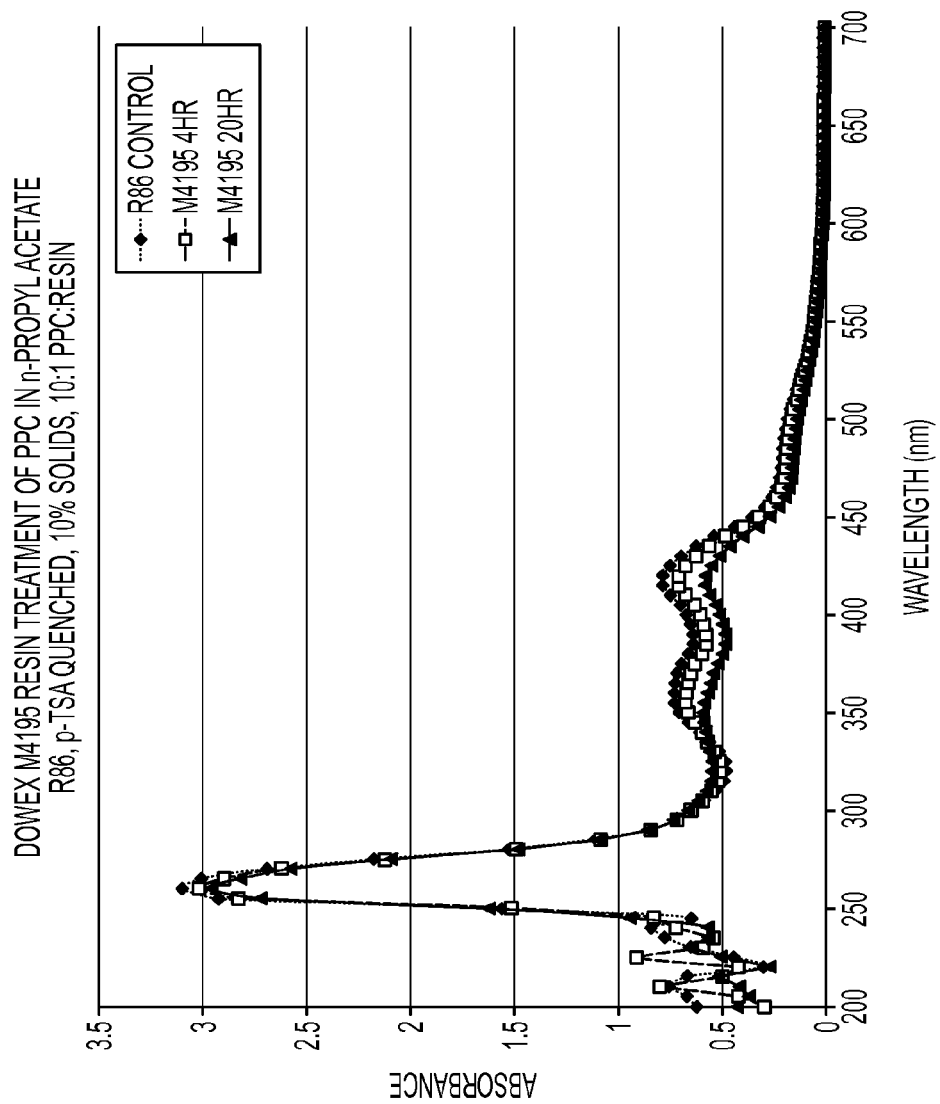
FIG. 10 depicts UV/Vis absorption curves of PPC solution after treatment with a strong acid cation ion exchange resin, DOWEX™ M4195 (available from Dow Chemical Corp. as of August 2008, see product information form no. 177-01817-0306 and Grinstead, Robert R. "New developments in the chemistry of XFS 4195 and XFS 43084 chelating ion exchange resin." Ion Exch. Technol. (1984), 509-518). For the PPC solution, the polymerization was quenched with tosic acid; treatment used a 10:1 ratio of PPC solution to resin.
Figure 11:
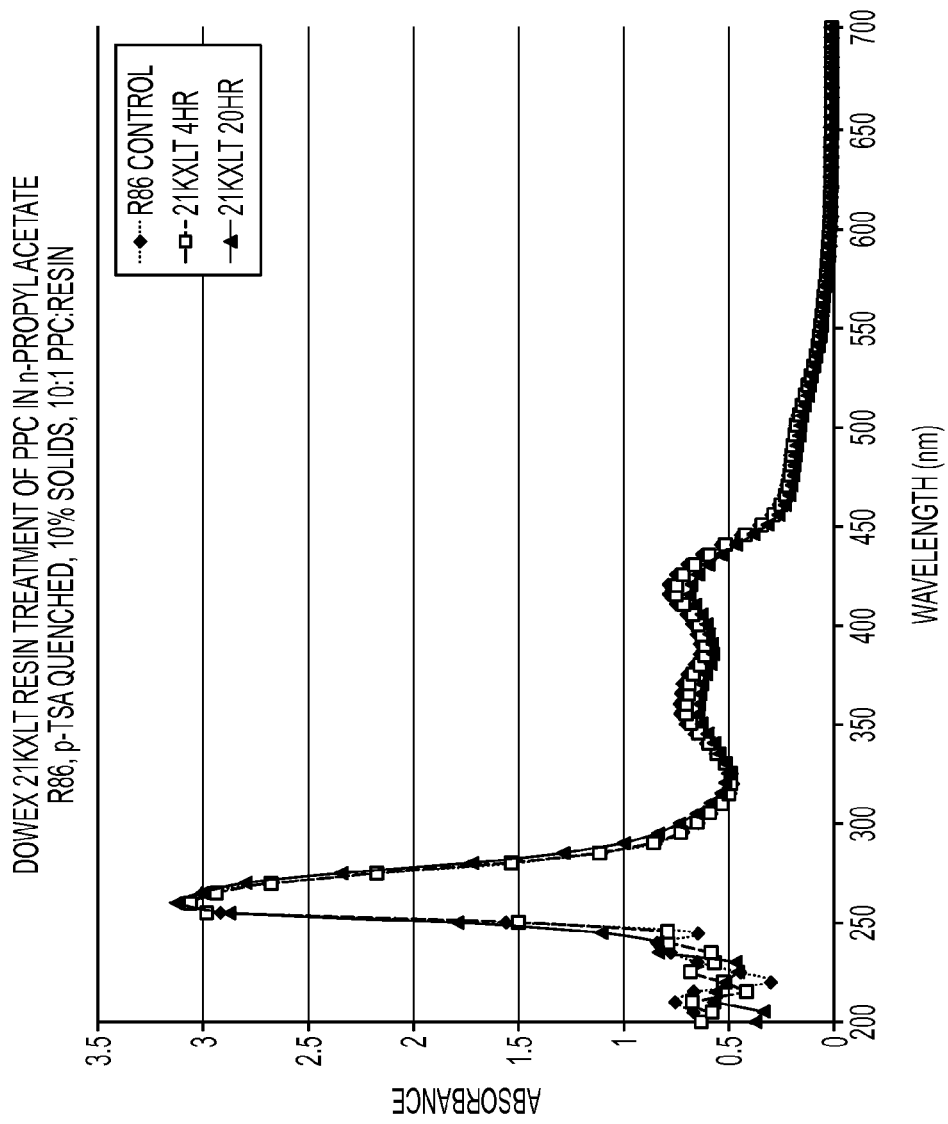
FIG. 11 depicts UV/Vis absorption curves of PPC solution after treatment with a strong acid cation ion exchange resin, DOWEX™ 21K XLT (available from Dow Chemical Corp. as of August 2008, see product information form no. 177-

Example 7 p-Toluene Sulfonic Acid Quenched PPC Solution Treated with Tosic Acid Derivatized Silica The purpose of this experiment is to establish the potential viability of polymer dope cleanup utilizing p-toluene sulfonic acid derivatized silica resin for a p-toluene sulfonic acid quenched polymer dope. To a 50 ml vial added 30.9133 g of PPC solution 10% solids in n-propyl acetate ('Run 86' Mn=221456, Mw=293000, PDI=1.322. This run was quenched with 1 molar equivalent of p-toluene sulfonic acid and the unreacted propylene oxide was removed by vacuum stripping.) Also added to the vial was 0.3118 g of Si-Tosic Acid derivatized silica (Silicycle Chemical Division, 40-63 um particle size, 0.59 mmol/g functionalized). The vial was placed on an orbital shaker at 200 RPM. After 20 hours 5 ml of the PPC solution was filtered through a 0.45 micron Pall syringe filter and a UV-VIS scan of the PPC solution was done in a quartz cuvette. The absorbance at 265 nm was 0.3128 for the treated sample and 3.00 for the PPC solution before treatment. The absorbance at 400 nm was 0.0028 for the treated sample and 0.6699 for the PPC solution before treatment (see FIG. 6).

TABLE 2

Summary of results from Experiments 4, 5, 6, and 7.

Absorbance of PPC, acetic acid quenched polymer dope, (800 molar equivalents AcOH relative to catalyst) after 20 hours of treatment with various resins

| Wavelength | untreated | Si-TA | Si + MSC | Si | MSC |
|---|---|---|---|---|---|
| 265 | 3.2903 | 0.9136 | 1.3785 | 2.1209 | 2.5358 |
| 400 | 0.4837 | 0.1311 | 0.2012 | 0.3497 | 0.4238 |

Example 8

Exemplary Resin Bed Treatment for Catalyst Removal and Decolorization

This example demonstrates a polymer dope cleanup process using two packed resin beds. The first resin bed contains a strong acid cation type resin (e.g., Dowex MSC-H) used to remove the catalyst and decolorize the polymer dope solution. The second resin is an acid scavenger resin (e.g., Dowex M-43) used to remove residual acid from the polymer dope solution (e.g., from the quench agent and/or from leachate of the first resin).

Procedure: The feed solution was prepared by removing residual epoxide (e.g., to levels of <1000 ppm) and filtering off large precipitates. Resin for the first column was measured out so as to afford approximately 40 ml of resin bed per gram of catalyst. This resin was then washed with water until the washes were no longer colored, drained of residual water, and suspended in acetone. The resin-acetone slurry was then poured into a first column prefilled halfway with acetone. Once loaded, the column was topped off with acetone to fill the free space above the resin. This procedure was then repeated to prepare a second column containing the M-43 resin. The columns were set up as indicated in FIG. 23 with the outlet of the strong acid resin column feeding the input of the acid scavenging resin column. Fresh acetone was pumped through the beds at a rate of 20 bed volumes/hr for 1 hour with solvent flow restricted and released as necessary to build pressure and pack the beds. Once the acetone flush was complete, the flow rate was lowered to 2 bed volumes per hour and the feed line was transferred to the polymer/catalyst/solvent feed stream. The effluent was collected as waste for the first hour (2 bed volumes) after which time collection of product stream began. Once the feed solution was exhausted the system was flushed with 2 bed volumes of acetone and the polymer was recovered from the clear, mostly colorless product solution.

The foregoing has been a description of certain non-limiting preferred embodiments of the disclosure. Those of ordinary skill in the art will appreciate that various changes and modifications to this description may be made without departing from the spirit or scope of the present disclosure, as defined in the following claims.

We claim:

1. A method of removing a catalyst from a product of an aliphatic polycarbonate polymerization reaction that was catalyzed by the catalyst, the method comprising contacting the product of the polymerization reaction with a solid phase comprising an ion exchanger, wherein the catalyst comprises a transition metal-ligand complex.

2. A method of claim 1, wherein the ion exchanger comprises an ion exchange resin.

3. The method of claim 2, wherein the ion exchange resin comprises a polymer selected from the group consisting of: polystyrene, divinylbenzene, polystyrene cross-linked with divinylbenzene, polyvinylpyridine, polymethylmethacrylate, polyolefins, and polytetrafluoroethylene.

4. The method of claim 2, wherein the ion exchange resin comprises polystyrene cross-linked with divinylbenzene.

5. The method of claim 2, wherein the ion exchange resin comprises a cation exchange resin.

6. The method of claim 5, wherein the cation exchange resin comprises an acid.

7. The method of claim 5, wherein the cation exchange resin comprises a sulfonic acid resin.

8. The method of claim 1, wherein the ion exchanger comprises an inorganic solid phase.

9. The method of claim 8, wherein the inorganic solid phase is selected from the group consisting of: silica, alumina, zirconia, molecular sieves, zeolites, and clays.

10. The method of claim 1, wherein the polymerization reaction further comprises a co-catalyst.

11. The method according to claim 10, wherein the co-catalyst is a Lewis base.

12. The method according to claim 11, wherein the Lewis base is N-methylimidazole (N-MeIm), dimethylaminopyridine (DMAP) or 1,4-diazabicyclo[2.2.2]octane (DABCO).

13. The method according to claim 10, wherein the co-catalyst is a salt.

14. The method according to claim 13, wherein the salt is an ammonium, phosphonium, or arsonium salt.

15. The method according to claim 14, wherein the ammonium salt is tetra-n-butylammonium chloride, tetra-n-butylammonium bromide, tetra-n-butylammonium azide, bis(triphenylphosphine)iminium chloride, bis(triphenylphosphine)iminium bromide or bis(triphenylphosphine)iminium acetate.

16. The method according to claim 14, wherein the phosphonium salt is tetraphenyl phosphonium acetate.

17. The method of claim 1, wherein the metal is a Group 6 transition metal.

18. The method of claim 17, wherein the transition metal is chromium or molybdenum.

19. The method of claim 1, wherein the transition metal is a Group 7 transition metal.

20. The method of claim 19, wherein the transition metal is manganese.

21. The method of claim 1, wherein the transition metal is a Group 9 transition metal.

22. The method of claim 21, wherein the transition metal is cobalt.

23. The method of claim 1, wherein the transition metal is a Group 12 transition metal.

24. The method of claim 23, wherein the transition metal is cadmium.

25. The method of claim 1, wherein the transition metal-ligand complex comprises a salen ligand.

26. The method of claim 25, wherein the salen ligand is selected from the group consisting of:

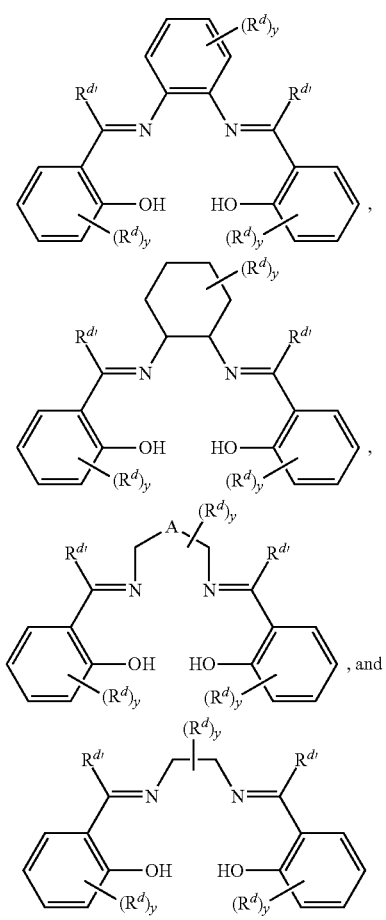

wherein:

$R^d$ at each occurrence is independently selected from the group consisting of a —ww—$(Z')_m$ group, optionally substituted $C_1$-$C_{20}$ aliphatic, optionally substituted $C_1$-$C_{20}$ heteroaliphatic, optionally substituted 6- to 14-membered aryl, optionally substituted 5- to 14-membered heteroaryl, halogen, —$OR^{10}$, —$OC(O)R^{13}$, —$OC(O)OR^{13}$, —$OC(O)NR^{11}R^{12}$, —CN, —CNO, —$C(O)R^{13}$, —$C(R^{13})_zH_{(3-z)}$, —$C(O)OR^{13}$, —$C(O)NR^{11}R^{12}$, —$NR^{11}R^{12}$, —$N^+(R^{11})_3$, —$NR^{11}C(O)R^{10}$, —$NR^{11}C(O)OR^{13}$, —$NR^{11}SO_2R^{13}$, —NCO, —$N_3$, —$NO_2$, —$S(O)_xR^{13}$m —$SO_2NR^{11}R^{12}$, —$NO_2$, —$C(R^{13})_zH_{(3-z)}$, —$(CH_2)_kR^{14}$, —$(CH_2)_k$—Z—$R^{16}$—, and —$(CH_2)_k$-Z—$(CH_2)_m$—$R^{14}$, where two or more suitable $R^d$ groups can be taken along with intervening atoms to form one or more rings;

$R^{d'}$ at each occurrence is independently selected from the group consisting of —H, $C_1$-$C_{12}$ alkyl, $C_2$-$C_{12}$ alkenyl, $C_2$-$C_{12}$ alkynyl, —CN, —CNO, —$C(O)R^{13}$, —$C(R^{13})_zH_{(3-z)}$, —$C(O)OR^{13}$, —$C(O)NR^{11}R^{12}$, —$C(R^{13})_zH_{(3-z)}$, —$(CH_2)_kR^{14}$, —$(CH_2)_k$—Z—$R^{16}$—, —$(CH_2)_k$—Z—$(CH_2)_m$—$R^{14}$, where two or more suitable $R^{d'}$ groups can be taken along with intervening atoms to form one or more rings;

A is a divalent linker selected from the group consisting of —O—, —$S(O)_x$—, —$(CH_2)$—, —$C(O)$—, —$C(=NOR^{10})$—, —$(C(R^{14})_xH_{(2-x)})_k$—, a $C_3$ to $C_8$ substituted or unsubstituted carbocycle, and a $C_1$-$C_8$ substituted or unsubstituted heterocycle;

$R^{10}$ at each occurrence is independently selected from the group consisting of —H, —$C(R^{13})_zH_{(3-z)}$, $C_1$-$C_{12}$ alkyl, $C_2$-$C_{12}$ alkenyl, $C_2$-$C_{12}$ alkynyl, up to a $C_{12}$ carbocycle, up to a $C_{12}$ heterocycle, —$S(O)_2R^{13}$; —$Si(R^{15})_3$, and a hydroxyl protecting group;

$R^{11}$ and $R^{12}$ at each occurrence are independently selected from the group consisting of —H, optionally substituted $C_1$-$C_{20}$ aliphatic, optionally substituted $C_1$-$C_{20}$ heteroaliphatic, optionally substituted 6- to 14-membered aryl, optionally substituted 5- to 14-membered heteroaryl, and —$C(R^{13})_zH_{(3-z)}$; wherein $R^{11}$ and $R^{12}$ when both present can optionally be taken together with the atom to which they are attached to form a 3-10-membered ring;

$R^{13}$ at each occurrence is an optionally substituted moiety independently selected from the group consisting of: —H, optionally substituted $C_1$-$C_{20}$ aliphatic, optionally substituted $C_1$-$C_{20}$ heteroaliphatic, optionally substituted 6-14-membered aryl, optionally substituted 5-14-membered heteroaryl;

$R^{14}$ at each occurrence is independently selected from the group consisting of halogen, —$OR^{10}$, —$OC(O)R^{13}$, —$OC(O)OR^{13}$, —$OC(O)NR^{11}R^{12}$, —CN, —CNO, —$C(R^{13})_zH_{(3-z)}$, —$C(O)R^{13}$, —$C(O)OR^{13}$, —$C(O)NR^{11}R^{12}$, —$NR^{11}R^{12}$, —$NR^{11}C(O)R^{13}$, —$NR^{11}C(O)OR^{10}$, —$NR^{11}SO_2R^{13}$, —NCO, —$N_3$, —$NO_2$, —$S(O)_xR^{13}$, —$SO_2NR^{11}R^{12}$, up to a $C_{12}$ heterocycle; and up to a $C_{12}$ carbocycle;

$R^{15}$ at each occurrence is independently selected from the group consisting of $C_1$-$C_6$ alkyl, $C_2$-$C_6$ alkenyl, $C_2$-$C_6$ alkynyl, and up to $C_{12}$ substituted or unsubstituted carbocyclic;

$R^{16}$ at each occurrence is independently selected from the group consisting of $C_1$-$C_{12}$ alkyl, $C_2$-$C_{12}$ alkenyl, $C_2$-$C_{12}$ alkynyl, up to $C_{12}$ heterocylic, up to $C_{12}$ carbocyclic, and —$C(R^{13})_zH_{(3-z)}$;

Z is a divalent linker selected from the group consisting of —(CH=CH)$_a$—, —(CH=CH)$_a$—, —C(O)—, —$C(=NOR^{11})$—, —$C(=NNR^{11}R^{12})$—, —O—, —$N(R^{11})$—, —$N(C(O)R^{13})$—, —$S(O)_x$—, a polyether, and a polyamine;

a is 1, 2, 3, or 4;

—ww— $(Z')_m$ represents one or more independently-defined co-catalyst moieties linked to the ligand via a covalent tether, wherein:

each Z' independently represents any moiety capable of acting as a co-catalyst in the polymerization reactions described herein. Suitable co-catalyst moieties include but are not limited to ammonium salts, phosphonium salts, arsonium salts, guanidinium salts, azonium salts, amino groups, phosphine groups, guanidine groups, amidine groups, heterocyclic groups and heteroaryl groups;

m is an integer from 1 to 4, inclusive and represents the number of Z' groups present on the tether; and —ww— represents a covalent tether consisting of one or more atoms;

k is an integer from 1 to 8 inclusive;

m is an integer from 1 to 8 inclusive;

x is 0, 1, or 2;

y is 0, 1, 2, 3, or 4; and z is 1, 2, or 3.

27. The method of claim 26, wherein the catalytic transition metal complex is selected from the group consisting of:

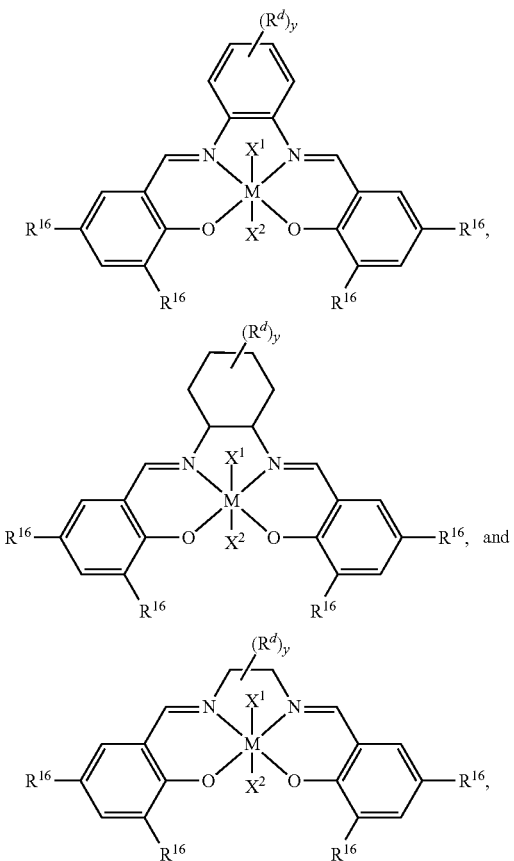

wherein M is a transition metal.

28. The method of claim 27, wherein the catalytic transition metal complex is selected from the group consisting of:

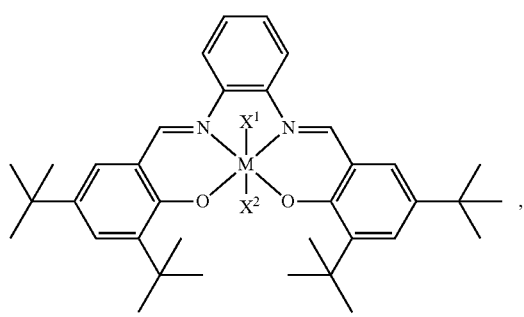

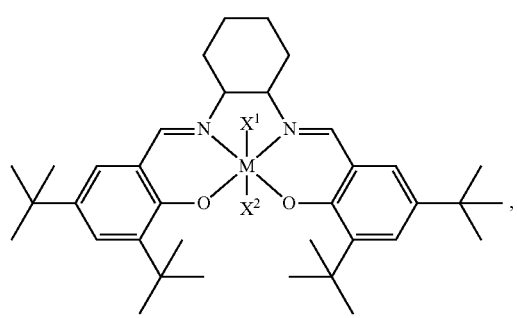

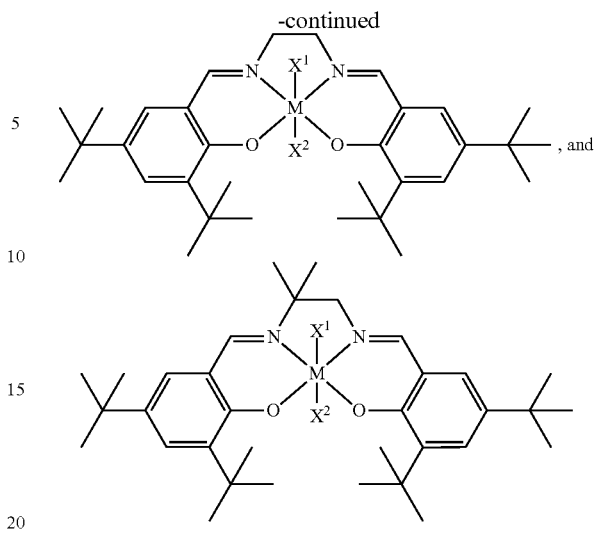

wherein M is a transition metal.

29. The method of claim 1, wherein the transition metal-ligand complex comprises a porphyrin ligand.

30. The method of claim 1, wherein the transition metal-ligand complex comprises a polymerization initiator.

31. The method of claim 1, wherein the aliphatic polycarbonate is selected from the group consisting of: poly(propylene carbonate), poly(ethylene carbonate), poly(cyclohexene carbonate), poly(butylene carbonate), poly(cyclopentene carbonate), poly(cyclooctene carbonate), poly(limonene carbonate), and poly(norbornene carbonate).

32. The method of claim 1, wherein the product comprises a solvent.

33. The method of claim 32, wherein the solvent is selected from the group consisting of ethyl acetate, n-propyl acetate, isopropyl acetate, n-butylacetate, acetone, butanone, tetrahydrofuran, and combinations thereof.

34. The method of claim 1, wherein the product is substantially free of epoxides.

35. The method of claim 1, wherein the catalyzed aliphatic polymerization reaction was quenched with an acid before the contacting step.

36. The method of claim 35, wherein the acid contains a non-nucleophilic anion.

37. The method of claim 35, wherein the acid is p-toluene sulfonic acid.

38. The method of claim 1, wherein the solid phase comprises a plurality of beads and the contacting step comprises contacting the product with the plurality of beads.

39. The method of claim 38, wherein the plurality of beads are arranged in a column and the contacting step comprises flowing the product through the column.

40. The method of claim 39, wherein the contacting step comprises recirculating the product through the column.

41. The method of claim 38, wherein the plurality of beads are arranged in a vessel and the contacting step comprises mixing the product with the plurality of beads.

42. The method of claim 1, wherein the solid phase comprises a porous material and the contacting step comprises contacting the product with the porous material.

43. The method of claim 42, wherein the contacting step comprises flowing the product through at least a portion of the porous material.

44. The method of claim 1, wherein the solid phase comprises a polymer selected from the group consisting of polystyrene, divinylbenzene, and combinations thereof.

45. The method of claim 1, wherein the solid phase comprises silica.

46. The method of claim 1, wherein the solid phase comprises a sulfonic acid derivatized polystyrene-divinylbenzene copolymer.

47. The method of claim 1, wherein the solid phase comprises sulfonic acid derivatized silica.

48. The method of claim 1, further comprising a step of contacting the polymer solution with a second solid phase.

49. The method of claim 48, wherein the second solid phase is an acid-absorbing resin.

50. The method of claim 49, wherein the acid-absorbing resin is an anion exchange resin.

51. The method of claim 1, wherein the product comprises an aliphatic polycarbonate selected from the group consisting of: poly(propylene carbonate); poly(ethylene carbonate); poly(butylene carbonate); poly(cyclohexene carbonate); poly(3-vinyl cyclohexene carbonate); poly(limonene carbonate); poly(norbornene carbonate); poly(cyclopentene carbonate); poly(cyclooctene carbonate); and copolymers of any two or more of these.

52. The method of claim 1, wherein the product comprises poly(propylene carbonate).

53. The method of claim 1, wherein the product comprises poly(ethylene carbonate).

54. The method of claim 1, wherein the product comprises a polymer of propylene oxide, carbon dioxide and one or more epoxides selected from the group consisting of: ethylene oxide, epichlorohydrin, glycidyl ethers, glycidyl esters, 1,2-butylene oxide, 2,3-butylene oxide, cyclopentene oxide, cyclohexene oxide, 3-vinyl cyclohexene oxide, cyclooctene oxide, norbornene oxide and limonene oxide.

55. The method of claim 1, wherein the product comprises poly(ethylene-co-propylene carbonate).

56. The method of claim 1, wherein the transition metal ligand complex is selected from the group consisting of:

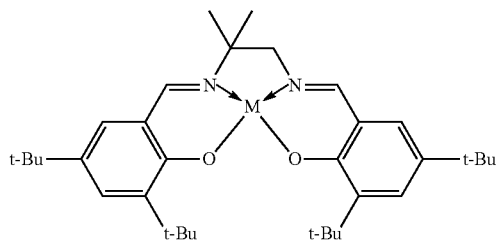

VI

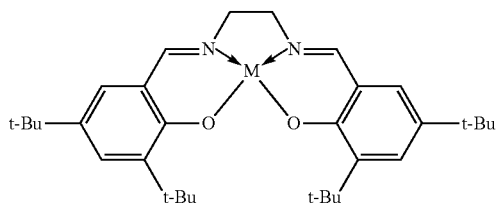

VII

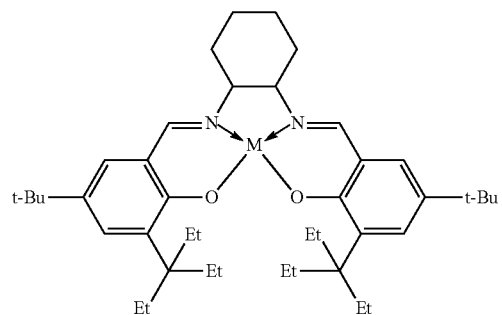

VIII

IX

X

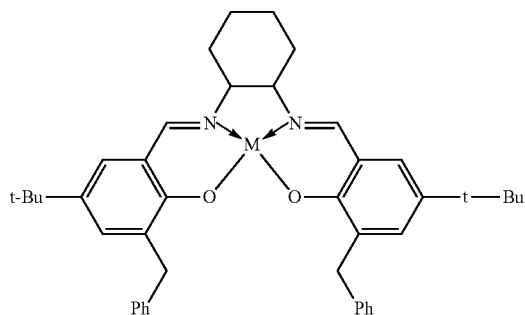

XI

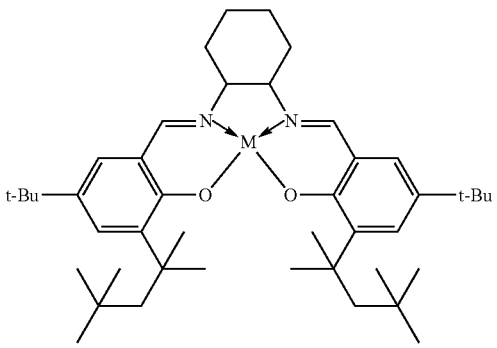

XII

-continued
XIII
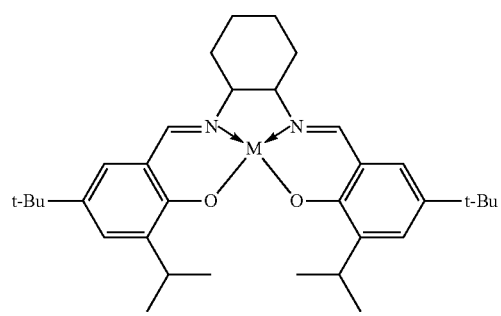
XIV
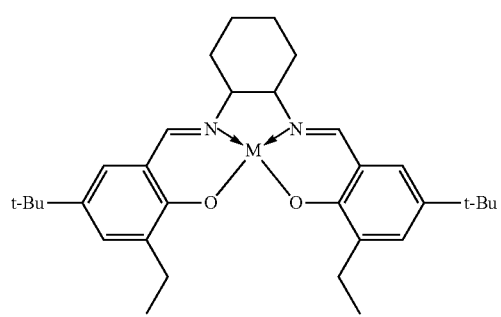
XV
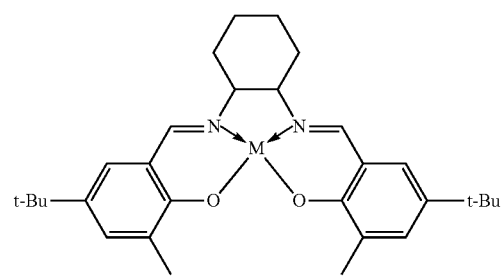
XVI
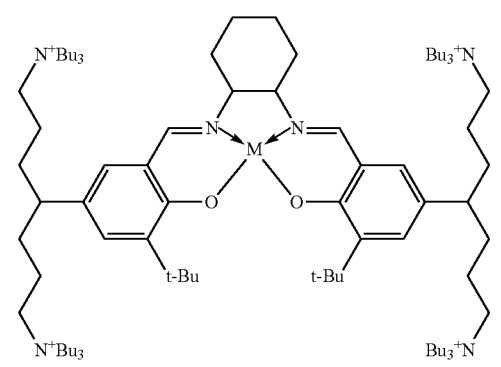
-continued
XVII
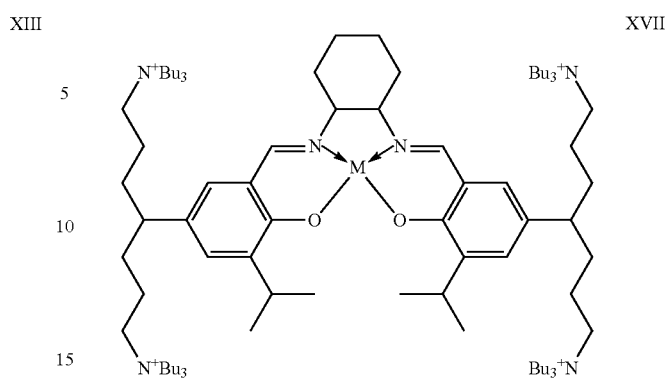
XVIII
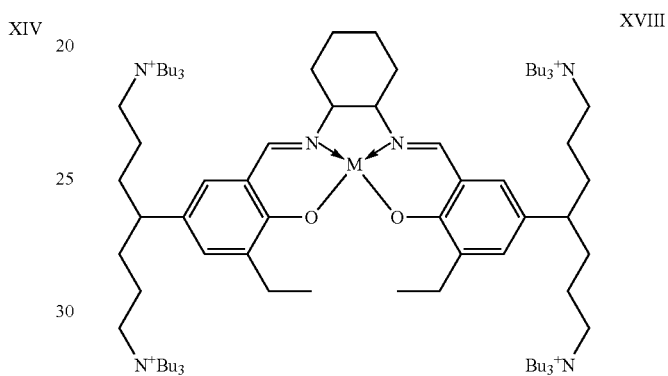
XIV
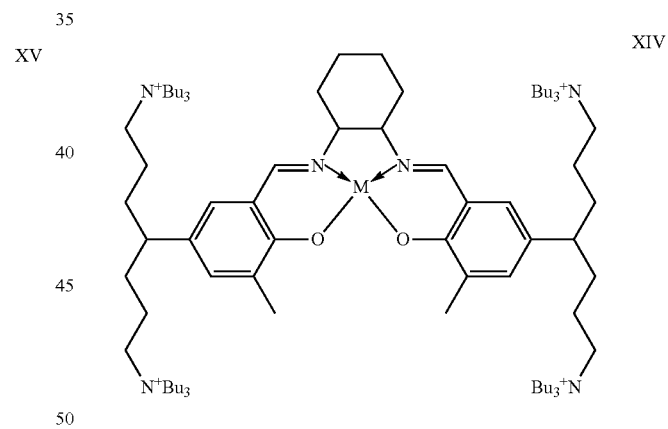
XX
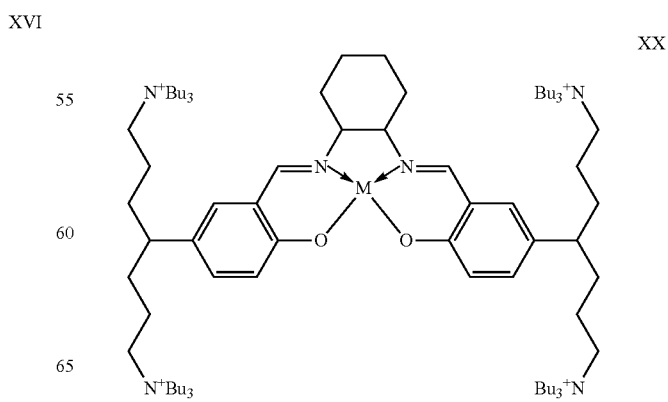

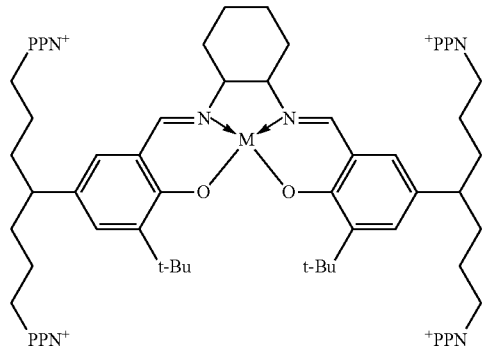
XXI
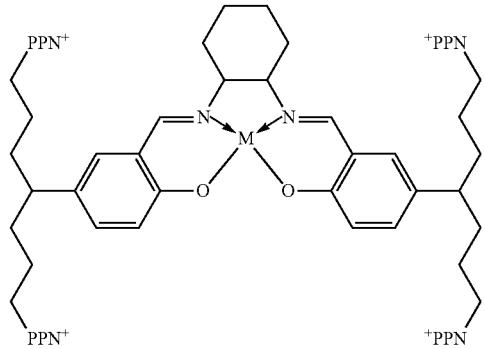
XXV
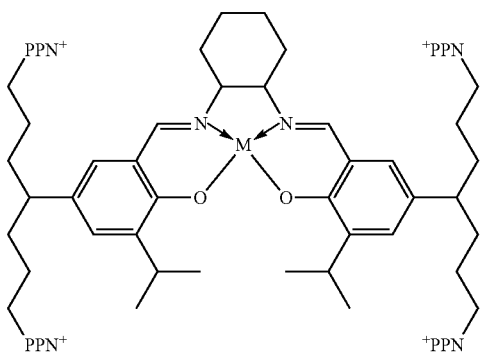
XXII
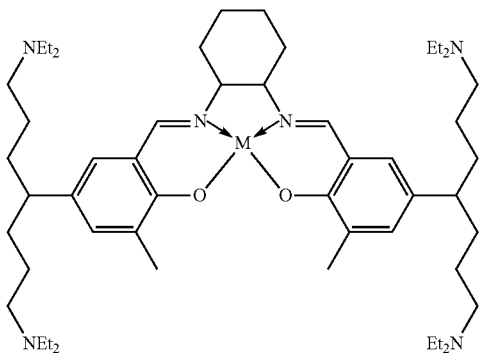
XXVI
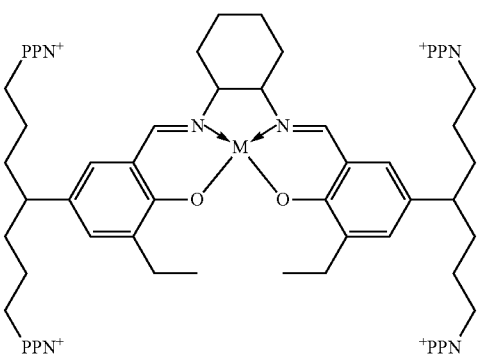
XXIII
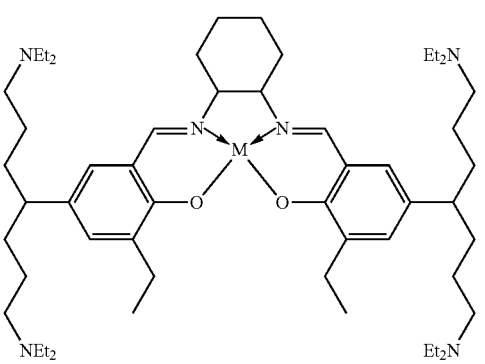
XXVII
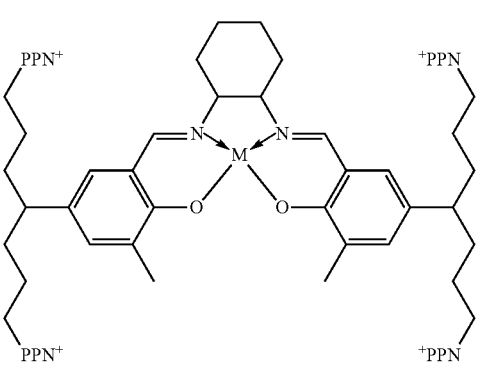
XXIV
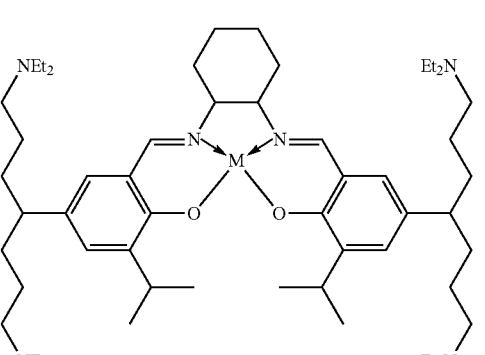
XXVIII

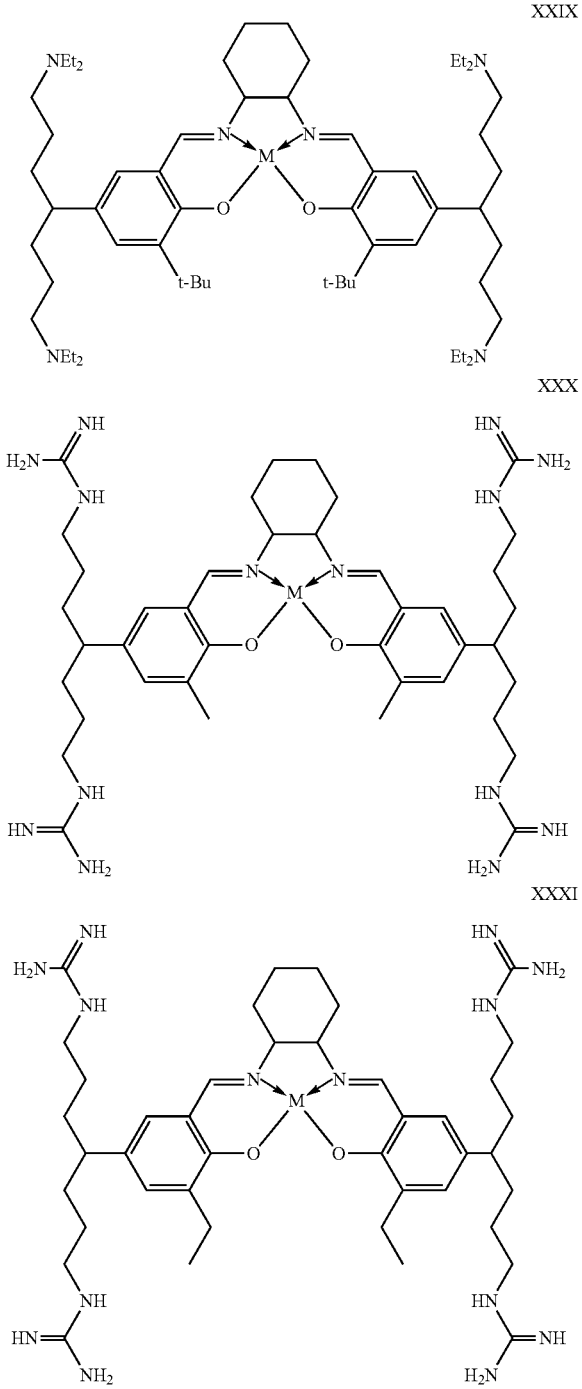

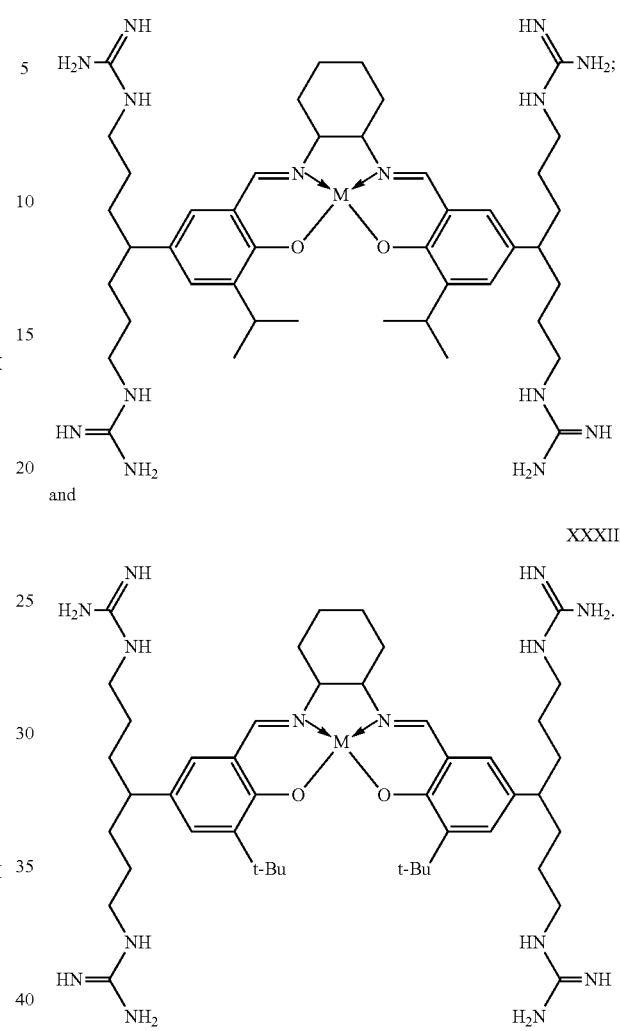

57. The method of claim 56, wherein M is Co(III).

58. A method of purifying a product of an aliphatic polycarbonate polymerization reaction, the method comprising steps of:
1. contacting the product of the polymerization reaction with a first solid phase comprising an acidic ion exchanger; and
2. subsequently contacting the product of the polymerization reaction with a second solid phase comprising a basic ion exchanger.

* * * * *